United States Patent [19]

Brickman et al.

[11] 4,315,330
[45] Feb. 9, 1982

[54] MULTIPLE DATA RATE TESTING OF COMMUNICATION EQUIPMENT

[75] Inventors: Norman F. Brickman, Potomac; Bruno R. Graziano, Damascus, both of Md.

[73] Assignee: IBM Corporation, Armonk, N.Y.

[21] Appl. No.: 128,057

[22] Filed: Mar. 7, 1980

[51] Int. Cl.³ .............................................. H04J 3/14
[52] U.S. Cl. ............................ 370/104; 179/175.2 R; 364/481; 364/514; 370/15; 455/67
[58] Field of Search ................................ 370/104, 15; 179/175.2 C, 175.2 R; 364/481, 514; 455/67, 115

[56] References Cited

U.S. PATENT DOCUMENTS

| | | | |
|---|---|---|---|
| 3,930,146 | 12/1975 | Bogacz | 179/175.2 R |
| 4,059,729 | 11/1977 | Eddy | 370/15 |
| 4,071,704 | 1/1978 | Moed | 370/15 |
| 4,172,963 | 10/1979 | Belcher | 179/175.2 R |

*Primary Examiner*—Howard Britton
*Attorney, Agent, or Firm*—John E. Hoel

[57] ABSTRACT

The invention finds application in a TDMA communications controller having a plurality of i input/output ports. The input/output ports transfer data from respective, local data users to a transmit bus and transfer data from a receive bus to respective local users on a time interleaved basis during periodic TDMA frames. Each port operates at its own data rate $R_i$, with data ports having different data rates in the controller. The invention includes a test card which has a read-only memory (ROM) for storing test patterns for each of the data rates $R_i$. The test card further includes a random access memory (RAM) having an input connected to the ROM, for storing one of the test patterns from the ROM. The test card further includes a processor having control outputs to the RAM and the ROM for controlling the transfer of one of the test patterns from the ROM to the RAM for the data rate $R_j$ of the data port under test. The test card further includes a direct memory access (DMA) control connected between a data output from the RAM and the transmit bus and connected between a data input to the RAM and the receive bus.

7 Claims, 35 Drawing Figures

SCM ORGANIZATION

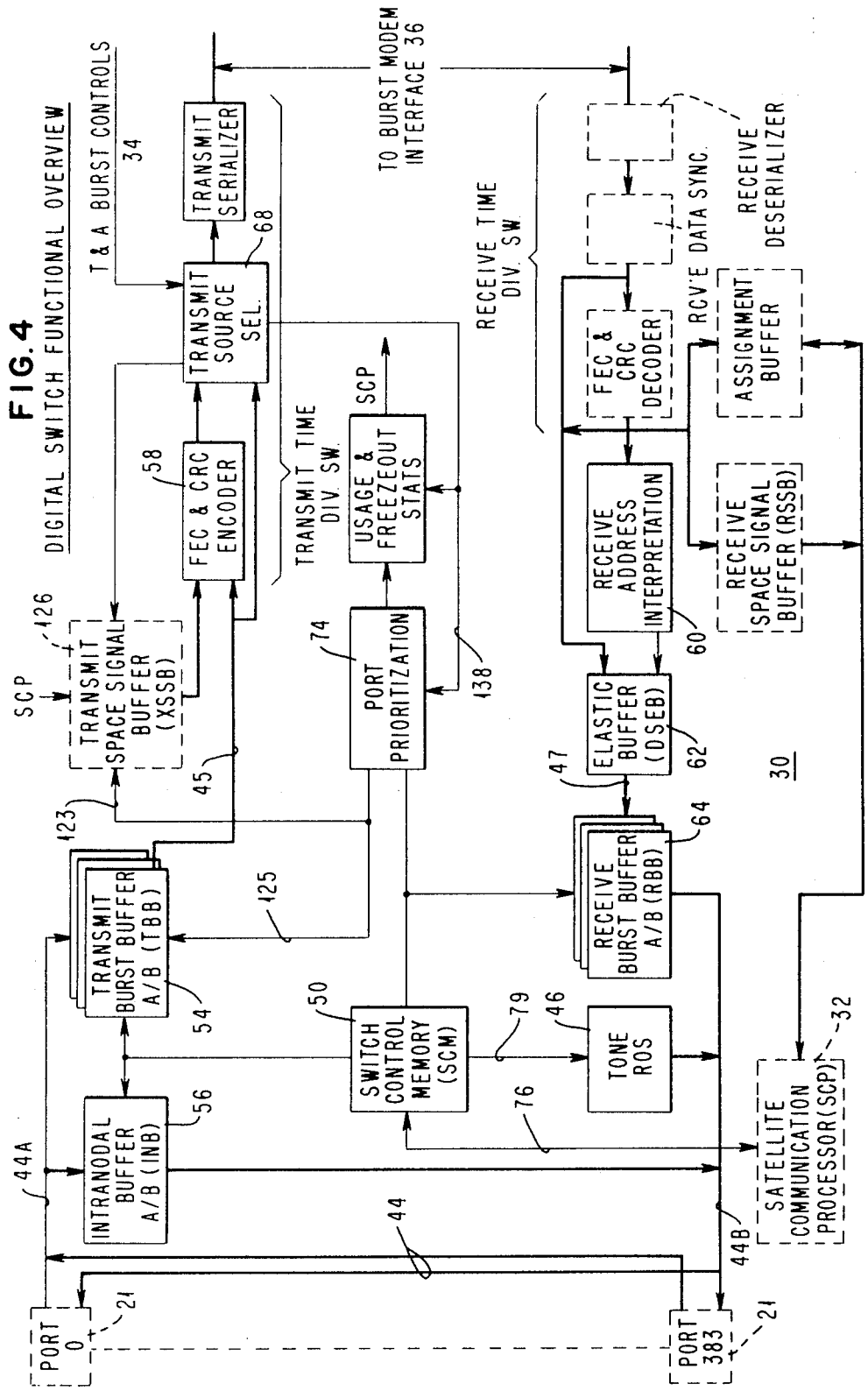

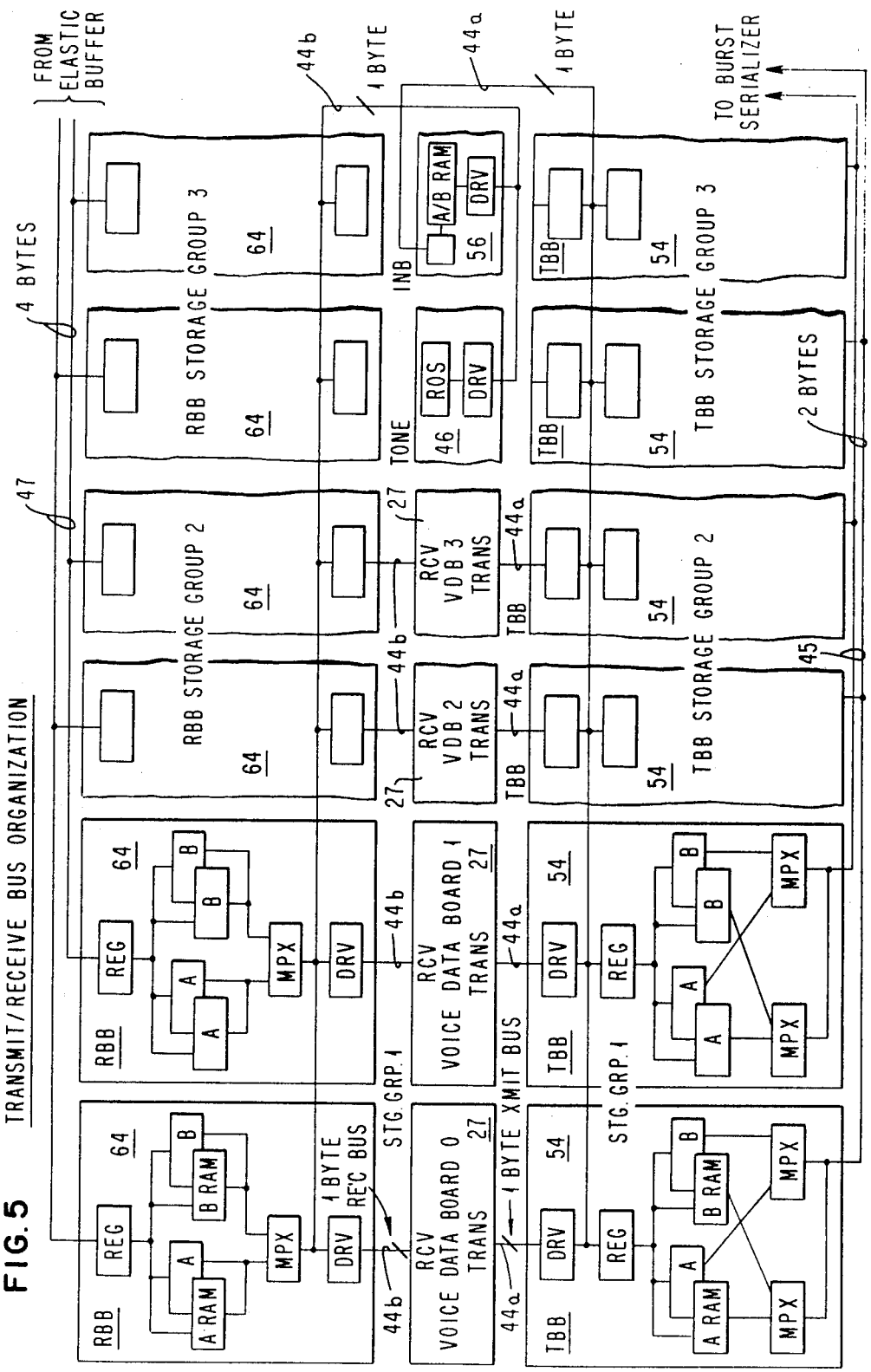
FIG. 5 TRANSMIT/RECEIVE BUS ORGANIZATION

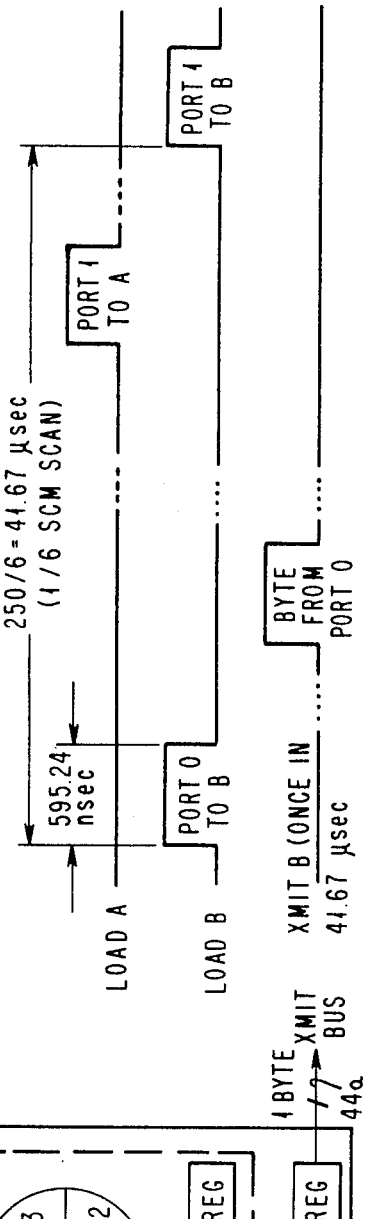
FIG. 7 VOICE PORT TRANSMIT OPERATIONS
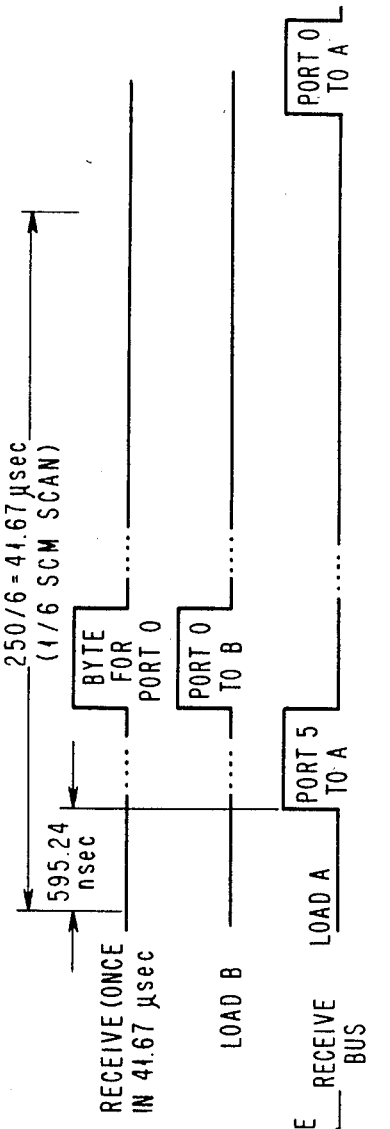
FIG. 8 VOICE PORT RECEIVE OPERATIONS

PORT OPERATING POINT TO POINT VIA SATELLITE

PORT CHANNELS SENT (ASSUMING NO DAC) FOR 56 Kbps PORT

PORTS X & Y COMMUNICATING INTRANODALLY

OPERATION ON EVEN SCM SCANS

PORTS X & Y COMMUNICATING INTRANODALLY

OPERATION ON ODD SCM SCANS

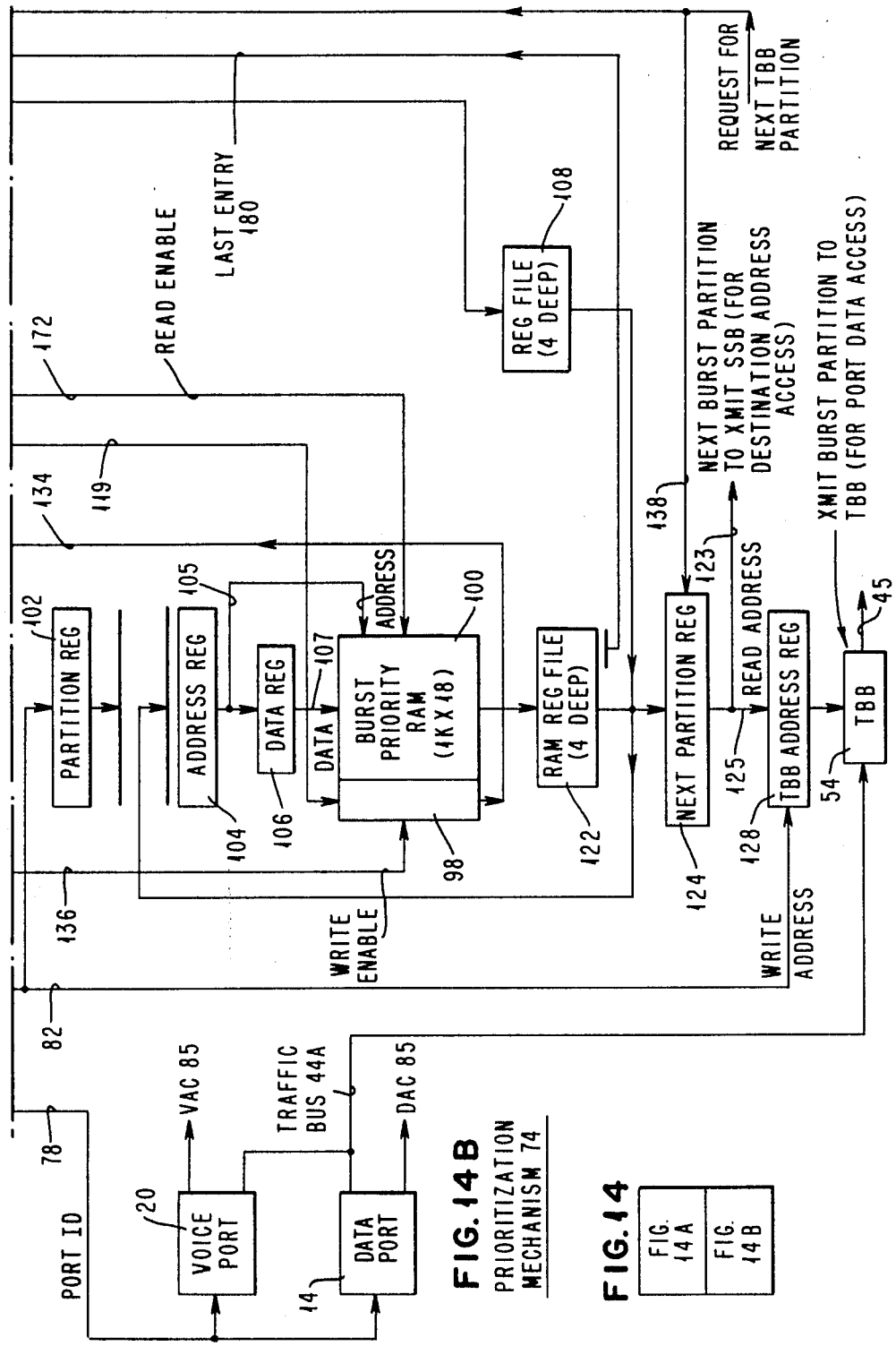

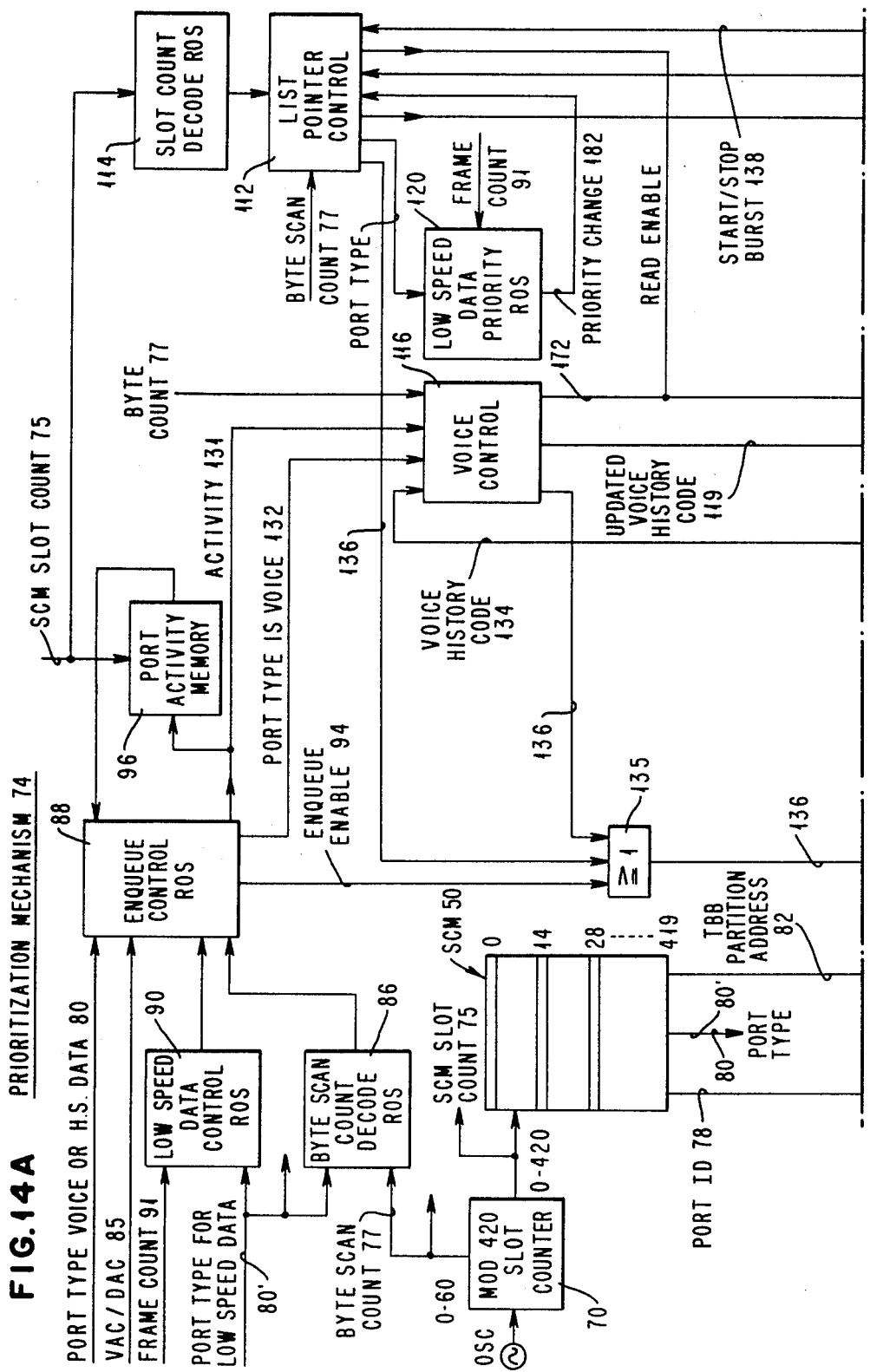
FIG. 14A   PRIORITIZATION MECHANISM 74

FIG. 15    BURST PRIORITY RAM 100
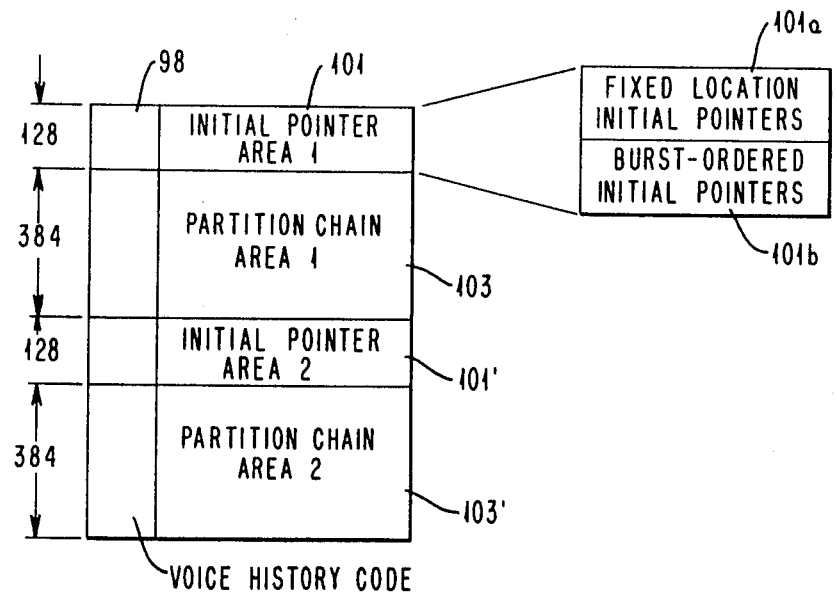
FIG. 16    TRANSMIT LIST STRUCTURE IN BURST PRIORITY RAM
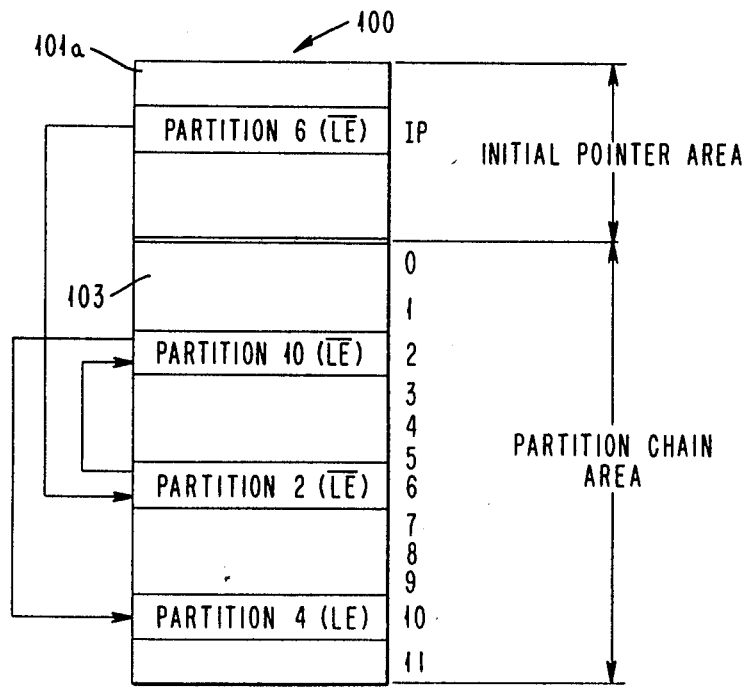

FIG. 17A TIMING DIAGRAM FOR BURST LIST FORMATION & TRANSMISSION
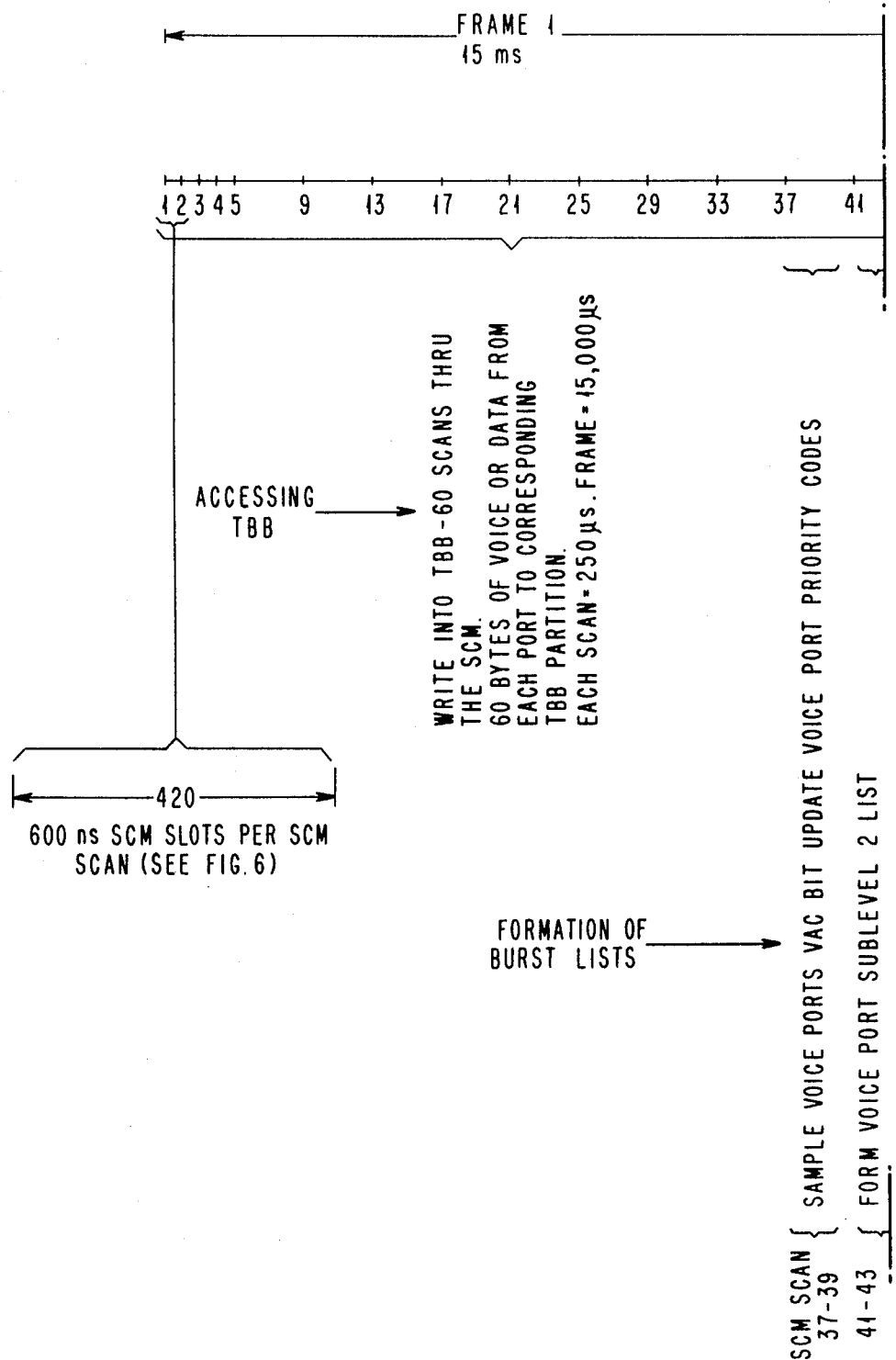

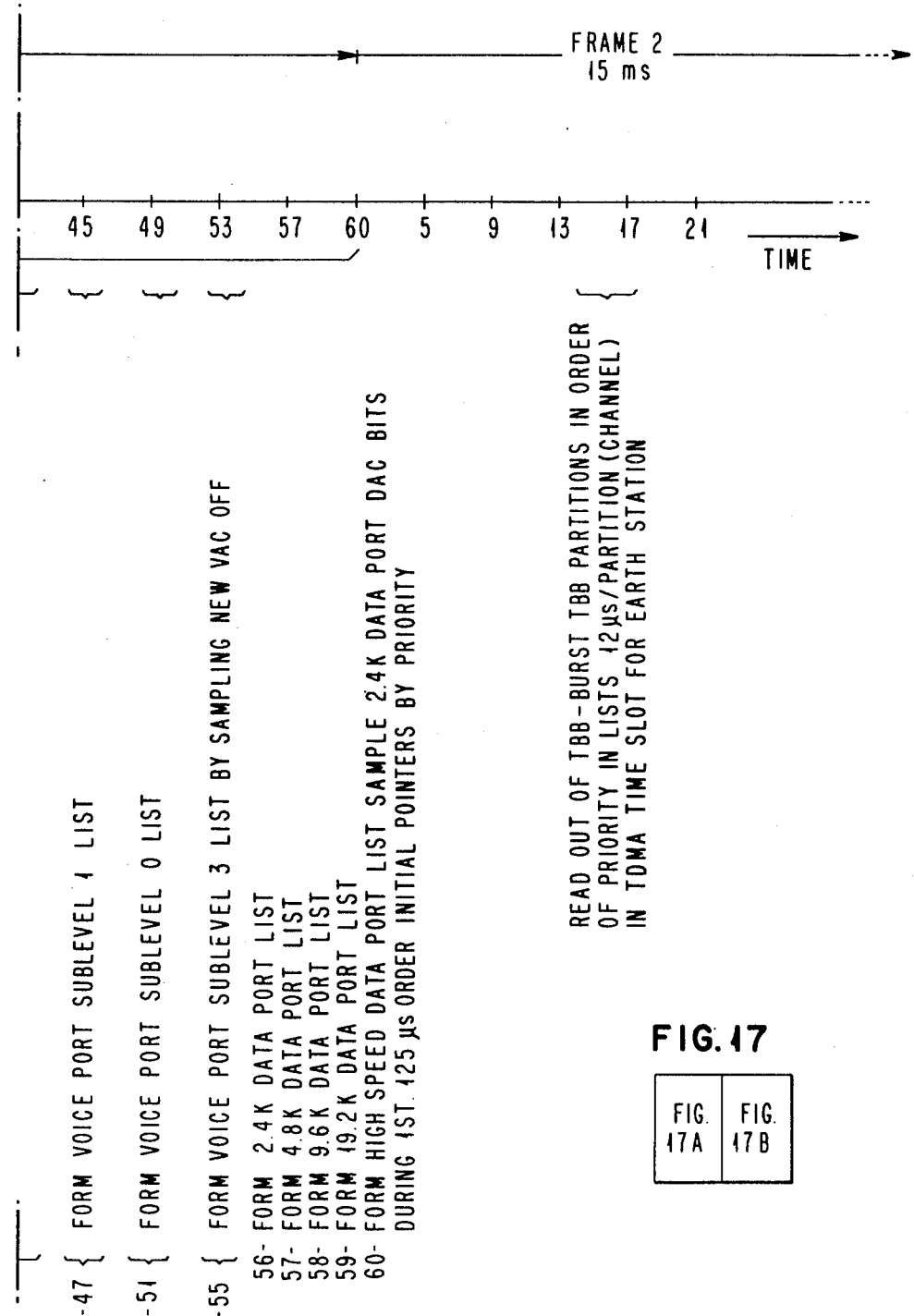

DATA PORT 14, 16 OR 18

DATA PORT TRANSMIT BUFFER

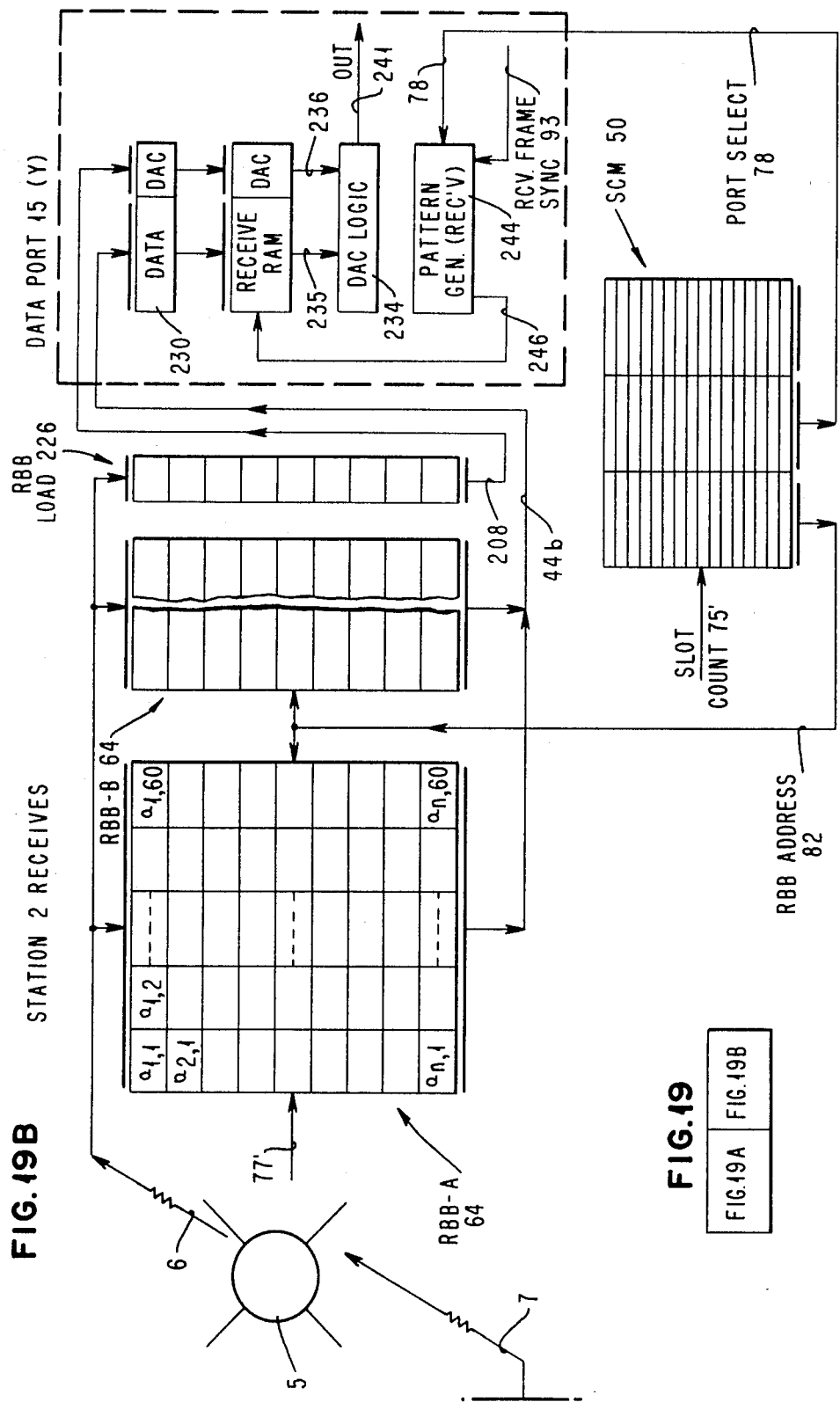

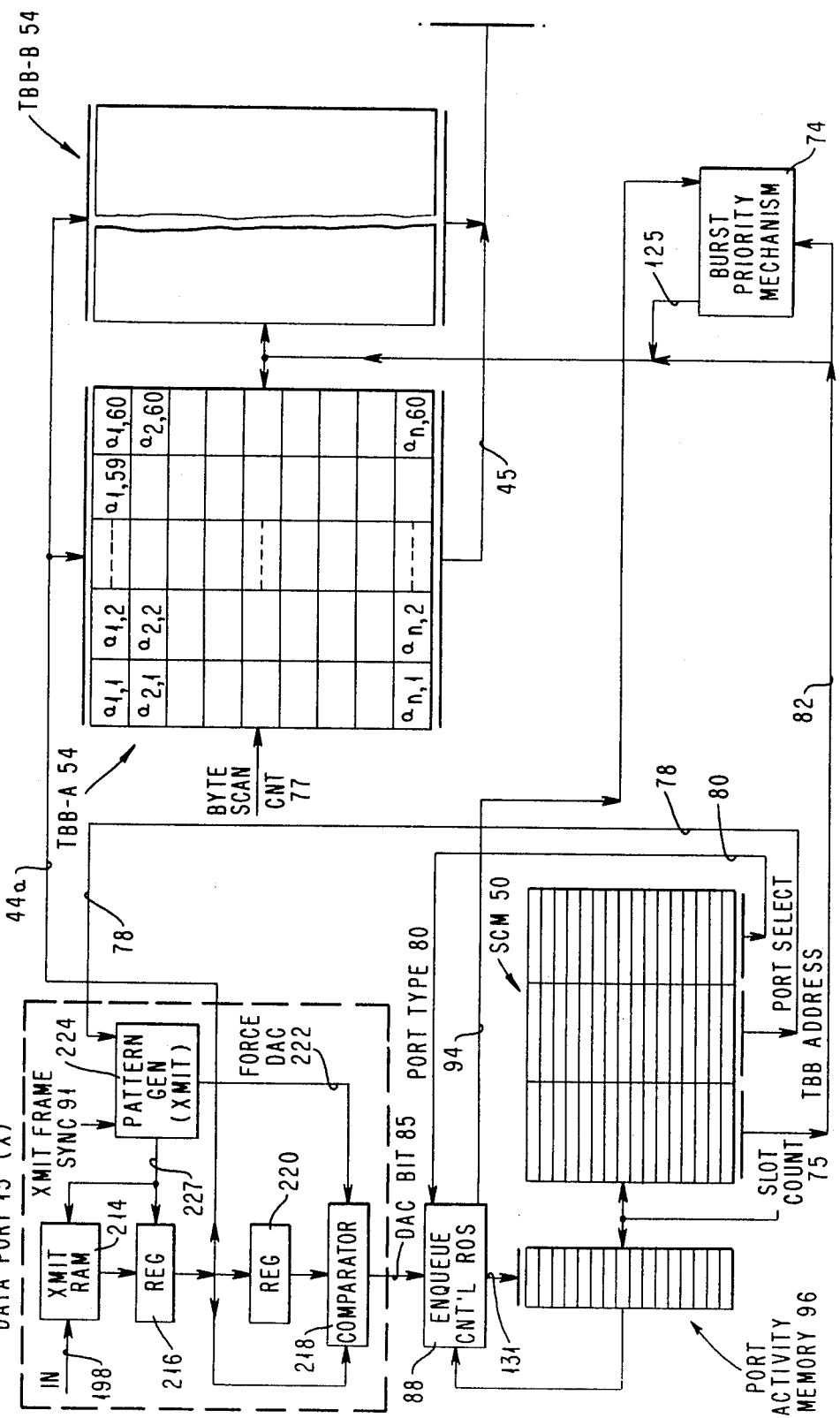

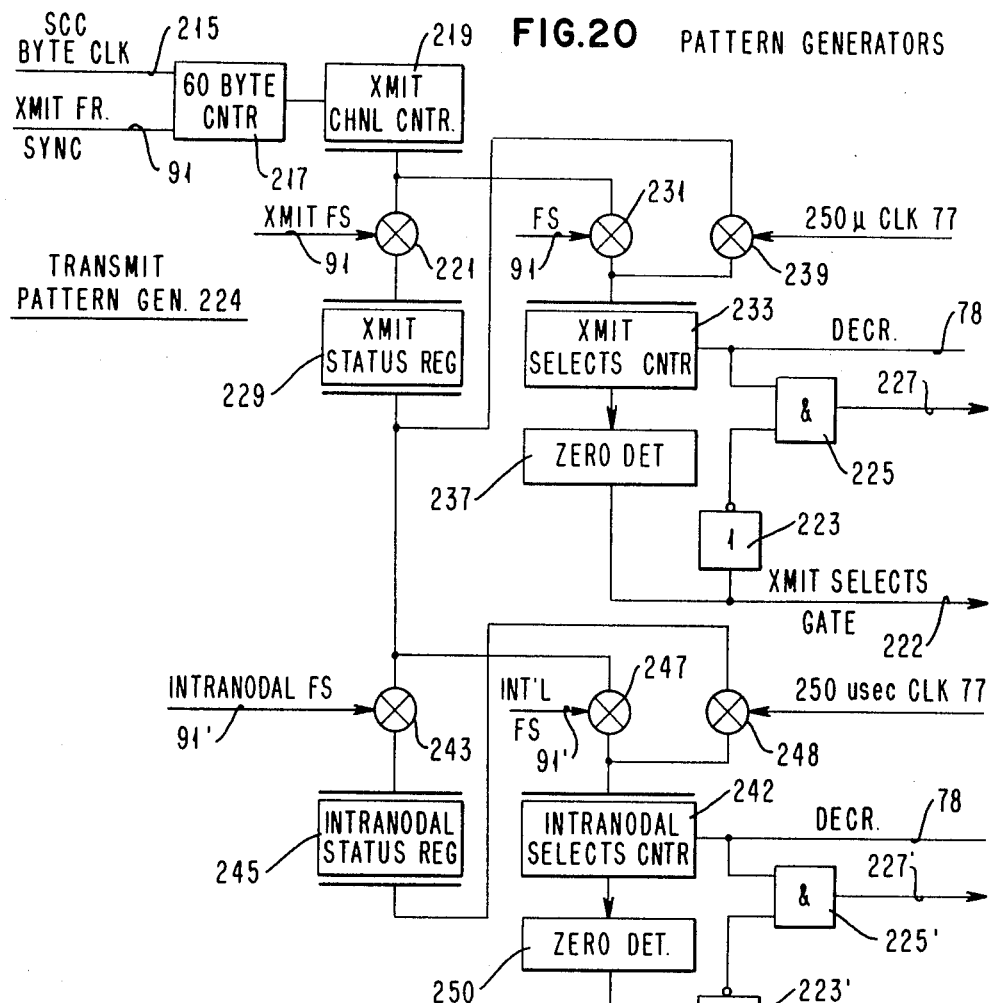
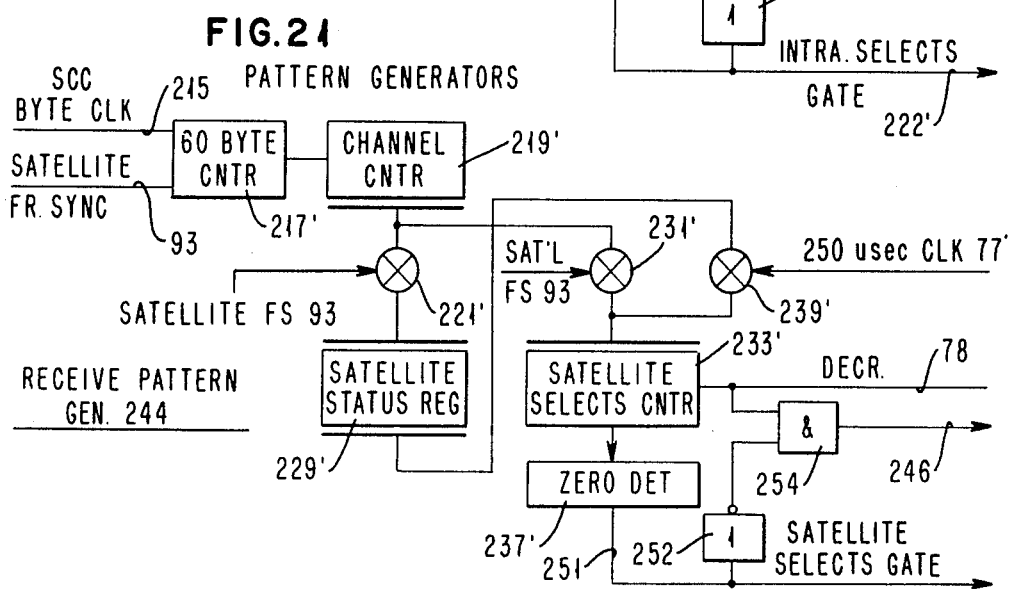

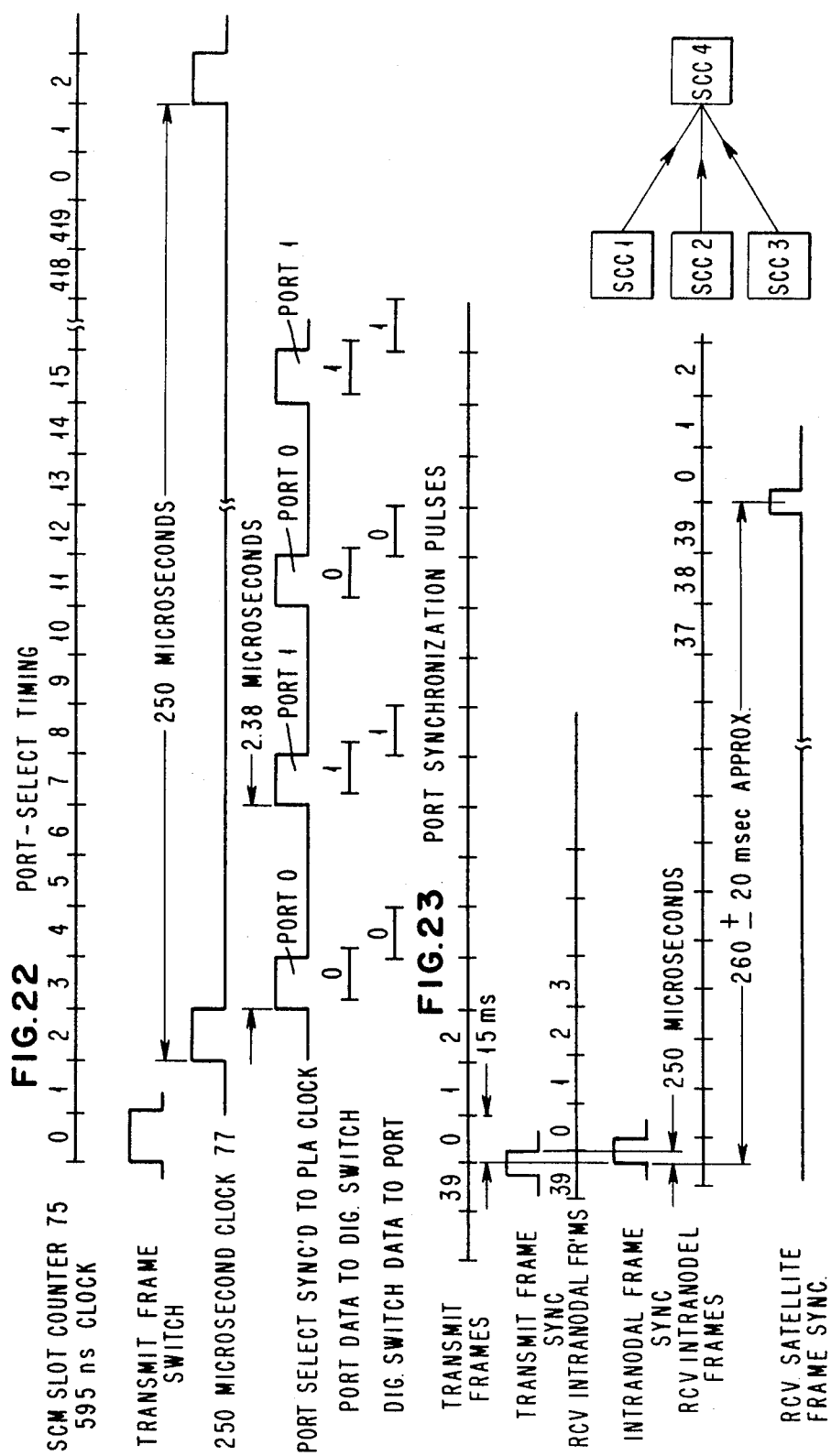

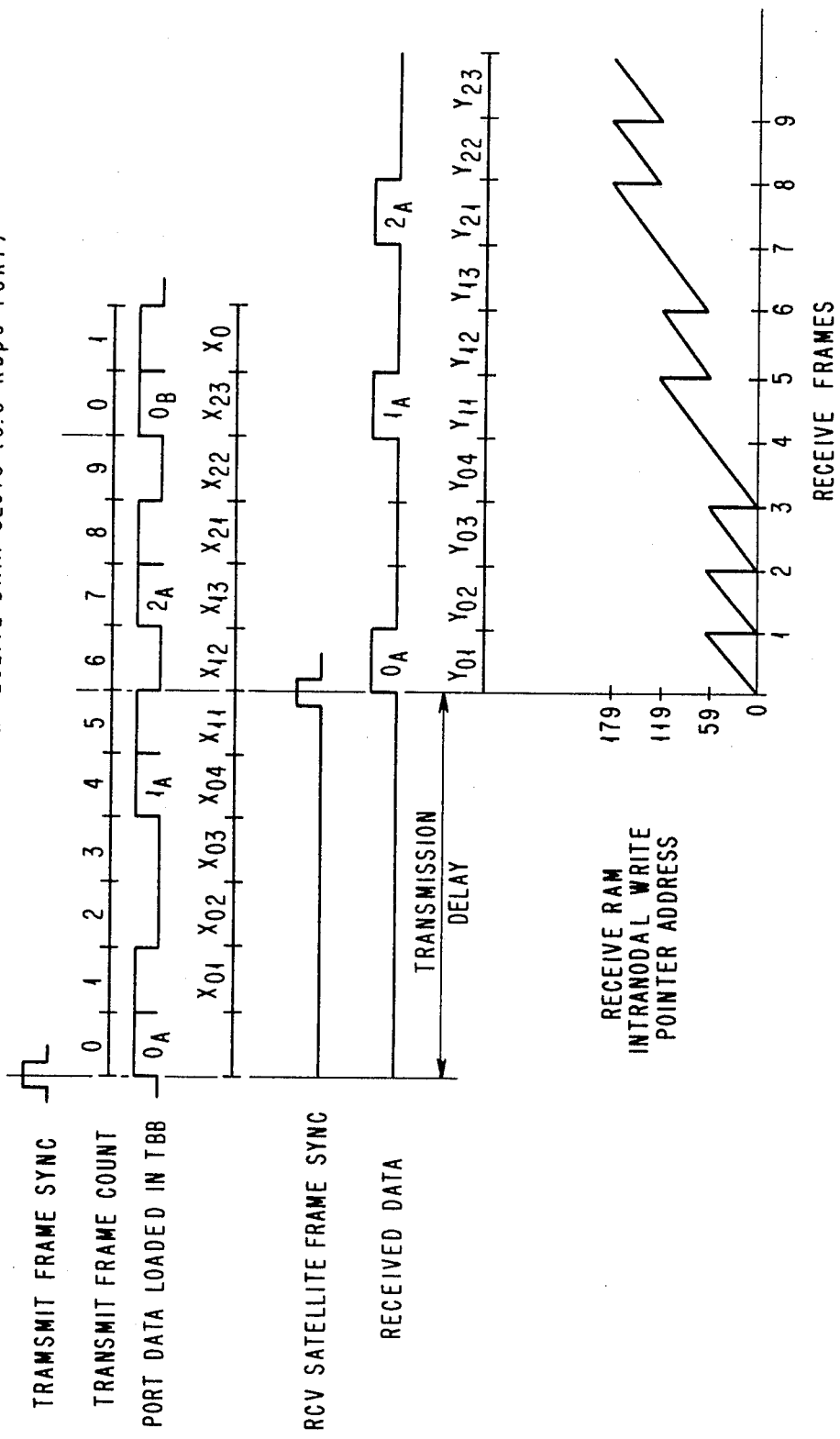

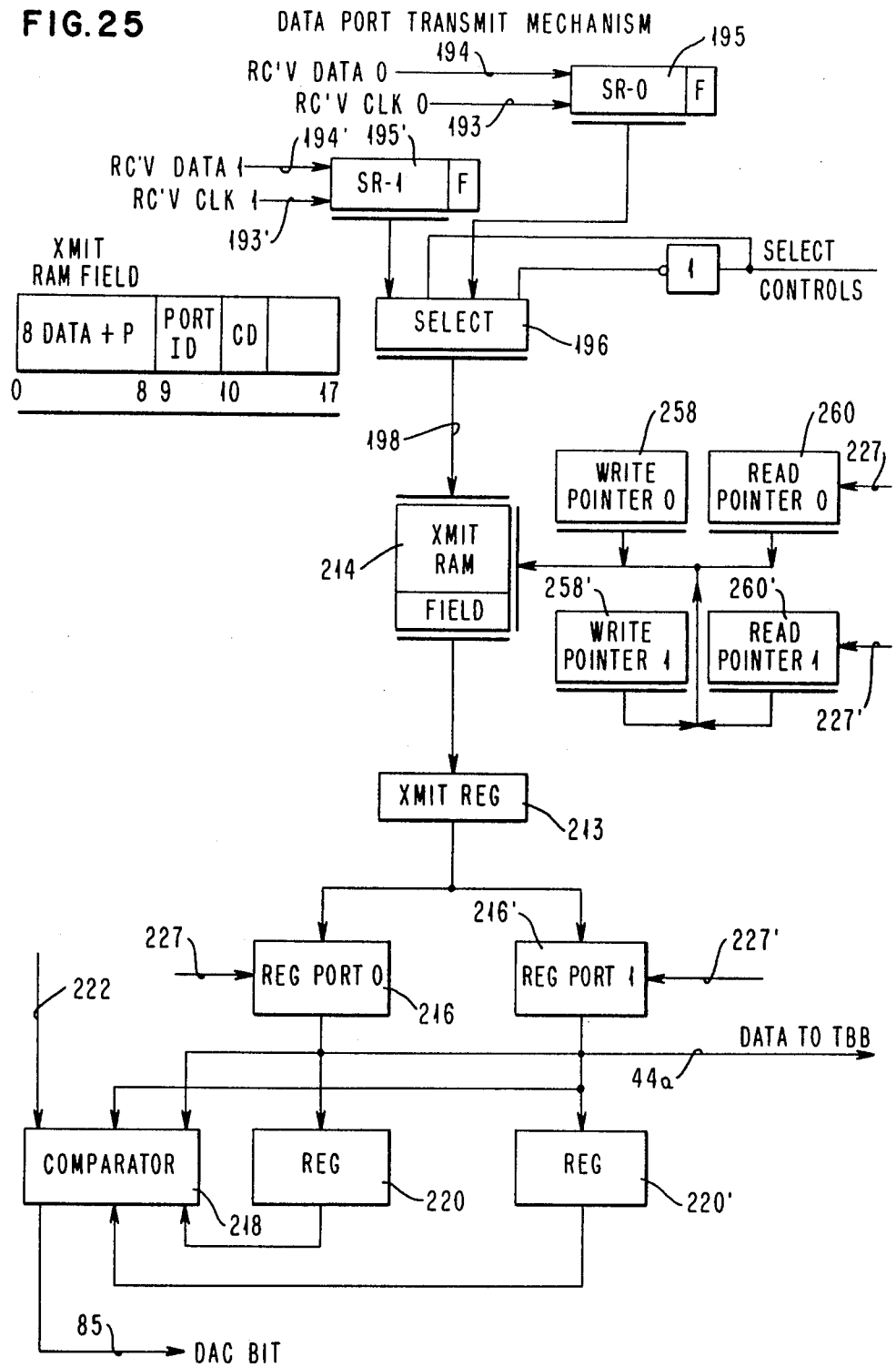
FIG. 25 DATA PORT TRANSMIT MECHANISM

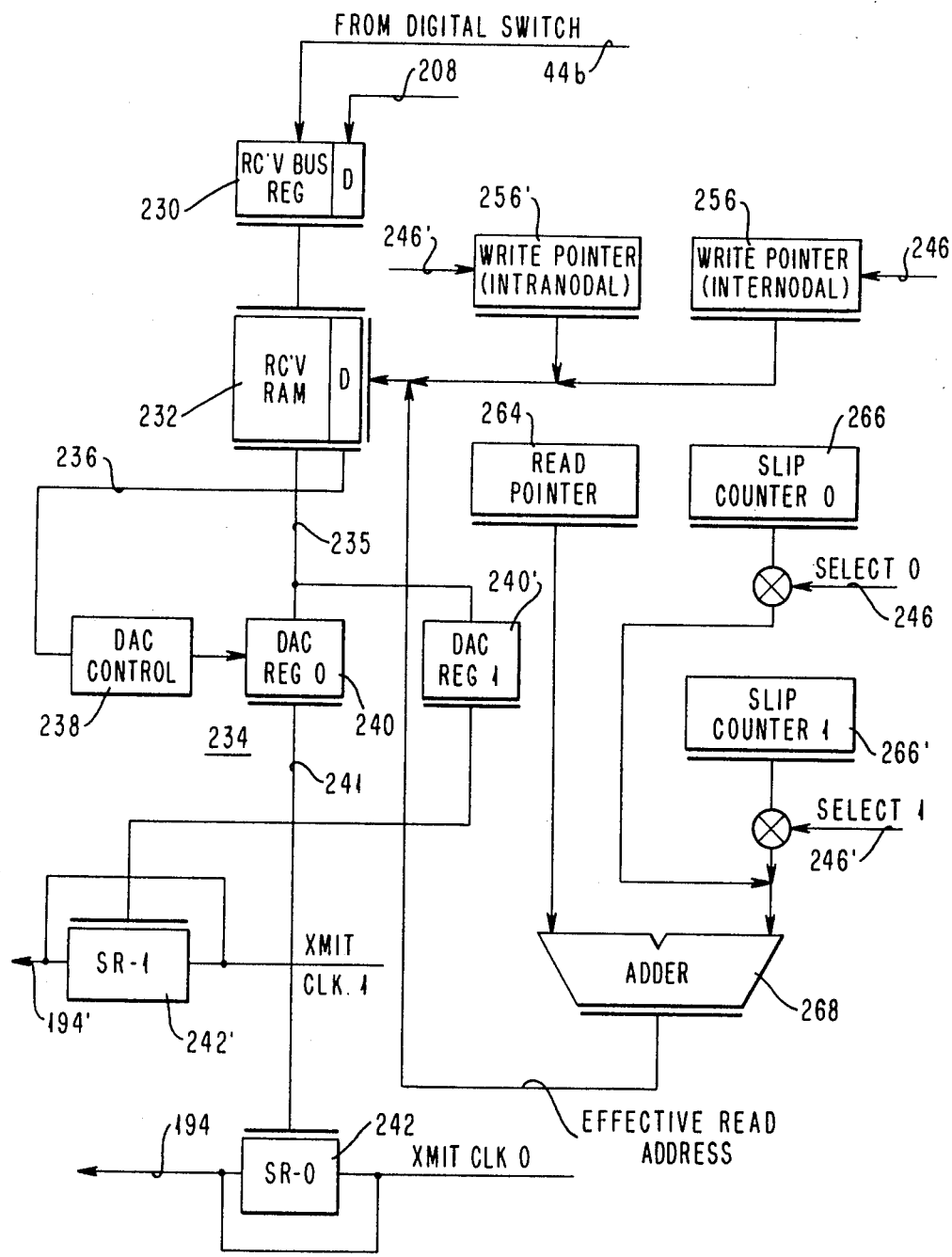
FIG. 27  DATA PORT RECEIVE MECHANISM

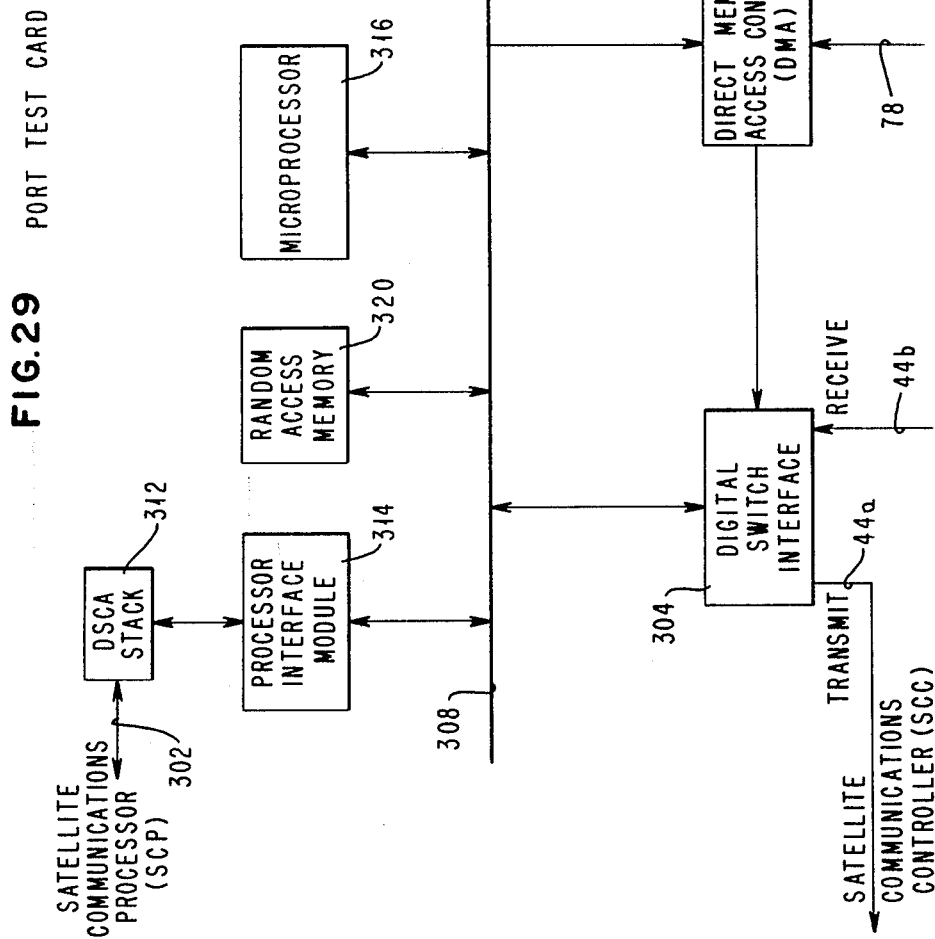
FIG.29  PORT TEST CARD

MULTIPLE DATA RATE TESTING OF COMMUNICATION EQUIPMENT

CROSS-REFERENCES TO RELATED APPLICATIONS

U.S. patent application Ser. No. 971,587, by R. J. Hallett, et al., entitled "Logarithmic Companded Delta Modulation System," filed Dec. 20, 1978.

U.S. patent application Ser. No. 079,928, by J. W. Fennel, Jr. et al., entitled "Demand Assignment Technique for Distribution of Bandwidth in a TDMA Satellite Communications System," filed Sept. 28, 1979.

U.S. patent application Ser. No. 085,555, by J. W. Fennel, Jr., et al., entitled "Baton Passing Method and Apparatus for Maintaining Synchronization in a TDMA Satellite Communications System," filed Oct. 19, 1979.

U.S. patent application Ser. No. 126,080, by J. A. Alvarez, et al., entitled "Priority Threaded Message Burst Mechanism for a TDMA Communication," filed Feb. 29, 1980.

U.S. patent application Ser. No. 126,076, by J. A. Alvarez, et al., entitled "Dynamically Variable Priority, Variable Position Channels in a TDMA Burst," filed Feb. 29, 1980.

U.S. patent application Ser. No. 128,321, by J. A. Alvarez, et al., entitled "Mechanism for Synchronization of Data Ports in TDMA Communication," filed Mar. 7, 1980.

U.S. patent application Ser. No. 132,708, by J. A. Alvarez, et al., entitled "Initial Acquisition of Synchronization for a Station in a TDMA Satellite Communication Network," filed Mar. 21, 1980.

U.S. patent application Ser. No. 128,058, by L. C. Queen, entitled "Byte Data Activity Compression," filed Mar. 7, 1980.

U.S. patent application Ser. No. 130,498, by J. A. Alvarez, et al., entitled "Time Domain Multiple Access Broadcasting, Multipoint, and Conferencing Communication Apparatus and Method," filed Mar. 14, 1980.

U.S. patent application Ser. No. 128,322, by J. A. Alvarez, et al., entitled "Multiple Data Rate Digital Switch for a TDMA Communications Controller," filed Mar. 7, 1980.

U.S. patent application Ser. No. 133,733, by N. F. Brickman, et al., entitled "A Call Processor for a Satellite Communications Controller," filed Mar. 25, 1980.

U.S. patent application Ser. No. 133,734, by N. F. Brickman, et al., entitled "Control Architecture for a Satellite Communications Controller," filed Mar. 25, 1980.

FIELD OF THE INVENTION

The invention disclosed broadly relates to telecommunications technology and more particularly relates to the testing of telecommunications equipment.

BACKGROUND OF THE INVENTION

Conventional time domain multiple access (TDMA) satellite communication networks employ multiple radio stations which communicate through an earth satellite repeater by transmitting time-synchronized bursts of radio energy relative to the repeater and which receive a time multiplex composite of bursts containing corresponding modulated information from the repeater. In TDMA operations, multiple ground stations associated with radio signaling nodes transmit bursts of time-concentrated information signals on a shared carrier frequency spectrum and receive the same information signals after repetition by the satellite repeater on a shifted carrier frequency spectrum. Each ground station is assigned a particular time slot in a continuum of recurrent frames for transmission of its bursts and for the reception of its own bursts and the bursts of other stations. The bursts interleave at the satellite in close time formation without overlapping. Each earth station includes connections to incoming digital lines originating from terrestrial sources. These input lines are respectively connected to digital data ports on a satellite communications controller (SCC) at the station.

Prior art techniques for testing the operation of communications controllers typically employ complex, large scale equipment having specialized components dedicated to each data rate element of the communications controller which must be tested. In addition, the communications controller must be taken off line from handling ordinary traffic in order to carry out component testing, in the prior art. One example, of the prior art discloses a service generator checking apparatus in a telephone system operating in time division multiple access mode. The apparatus sends a tone sample signal in one frame through a system interface having an input portion and an output portion, and compares the sent tone sample signal with a stored sample in a subsequent frame, thereby verifying that the interface is operational. However, the system does not maintain a continuous flow of communication while the test is being performed and the tester cannot accommodate a system having several different communication rates.

OBJECTS OF THE INVENTION

It is therefore an object of the invention to carry out multiple data rate testing of communication equipment in an improved manner.

It is another object of the invention to carry out multiple data rate testing of communication equipment with a more simplified testing mechanism than has been available in the prior art.

It is still a further object of the invention to carry out multiple data rate testing of communication equipment without removing large portions of the equipment from regular service.

SUMMARY OF THE INVENTION

These and other objects, features and advantages of the invention are accomplished by the multiple data rate testing apparatus disclosed herein. The invention finds application in a TDMA communications controller having a plurality of i input/output ports. The input/output ports transfer data from respective, local data users to a transmit bus and transfer data from a receive bus to respective local users on a time interleaved basis during periodic TDMA frames. Each port operates at its own data rate $R_i$, with data ports having different data rates in the controller. The invention includes a test card which has a read-only memory (ROM) for storing test patterns for each of the data rates $R_i$. The test card further includes a random access memory (RAM) having an input connected to the ROM, for storing one of the test patterns from the ROM. The test card further includes a processor having control outputs to the RAM and the ROM for controlling the transfer of one of the test patterns from the ROM to the RAM for the data rate $R_j$ of the data port under test. The test card further includes a direct memory access (DMA) control connected between a data output from the RAM and the transmit bus and connected between a data input to the RAM and the receive bus.

The test card is connected to an intranodal buffer having a data input connected to the transmit bus and the data output connected to the receive bus, the intranodal buffer having a plurality of addressable storage locations for transferring data between the data ports. The controller includes a scanner having a periodic cycle of m scans per TDMA frame, there being a frame rate of f frames per second. A switch control memory (SCM) has an address input connected to the output of the scanner, a port select output connected to a control input to each of the data ports and a control input to the DMA controller in the test card. The switch control memory also has a stored address output connected to an address input to the intranodal buffer. The switch control memory stores a plurality of 2n slots of SCM control words. A first subplurality of n slots will, when scanned by the scanner, issue a port select signal to the port under test and will issue n addresses to the intranodal buffer. A second subplurality of n slots will, when scanned by the scanner, issue a port select signal to the DMA controller in the port test card and will issue n addresses to the intranodal buffer, n equals $R_j$ divided by n times f.

The DMA controller transfers a plurality of test patterns from the RAM in the test card through the accessed storage locations in the intranodal buffer to the port under test at the data rate $R_j$, in response to the outputs from the switch control memory. The data port under test has its user output connected to its user input to transfer the test patterns received on the receive bus to the transmit bus and through the accessed storage locations in the intranodal buffer to the DMA controller in the port test card at the data rate $R_j$, in response to the outputs from the switch control memory.

The test patterns which have been circulated through the port under test can then be compared by the processor on the port test card with the original test patterns transmitted from the RAM so as to determine the data transmission integrity of the data port under test. In this manner, ports of any data rate $R_j$ in the communications controller can be tested.

DESCRIPTION OF THE FIGURES

These and other objects, features and advantages of the invention will be more fully appreciated with reference to the accompanying figures.

FIG. 4 is a functional block diagram of the digital switch architecture in the satellite communications controller.

FIG. 5 is a functional block diagram of the organization for the transmit and receive burst buffers.

FIG. 7 is an illustration of the voice port transmit operation.

FIG. 8 is an illustration of the voice port receive operation.

FIG. 13 is a schematic illustration of the switch control memory.

FIGS. 14, 14A and 14B are a functional block diagram of the burst prioritization mechanism.

FIG. 15 is an illustration of the organization of the burst priority RAM.

FIG. 16 is an illustration of the transmit list structure in the burst priority RAM.

FIGS. 17, 17A and 17B are a timing diagram of the operation of the burst prioritization mechanism.

FIGS. 19, 19A and 19B are a functional block diagram showing the signal path from a transmitting data port to a receiving data port via the satellite transponder.

FIG. 20 shows the transmission pattern generators in a data port.

FIG. 21 shows the receive pattern generator in a data port.

FIG. 22 is a timing diagram of the data port selection by the digital switch.

FIG. 23 is a timing diagram of the data port synchronization pulses.

FIG. 24 is a timing diagram of the transmit and receive data slots for a 9.6 Kbps port.

FIG. 25 is a functional block diagram of the transmit side of the data port.

FIG. 27 is a functional block diagram of the receive side of the data port.

FIG. 29 is a more detailed functional block diagram of the port test card.

DISCUSSION OF THE PREFERRED EMBODIMENT

TDMA System Overview

Figure 1:
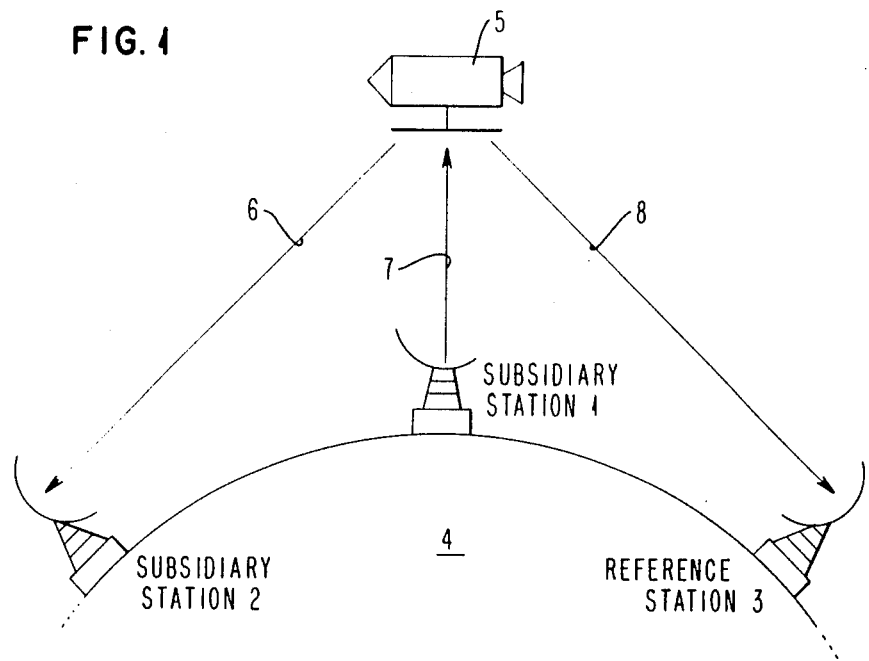
FIG. 1 shows a transponder relative to the earth.
Figure 2:
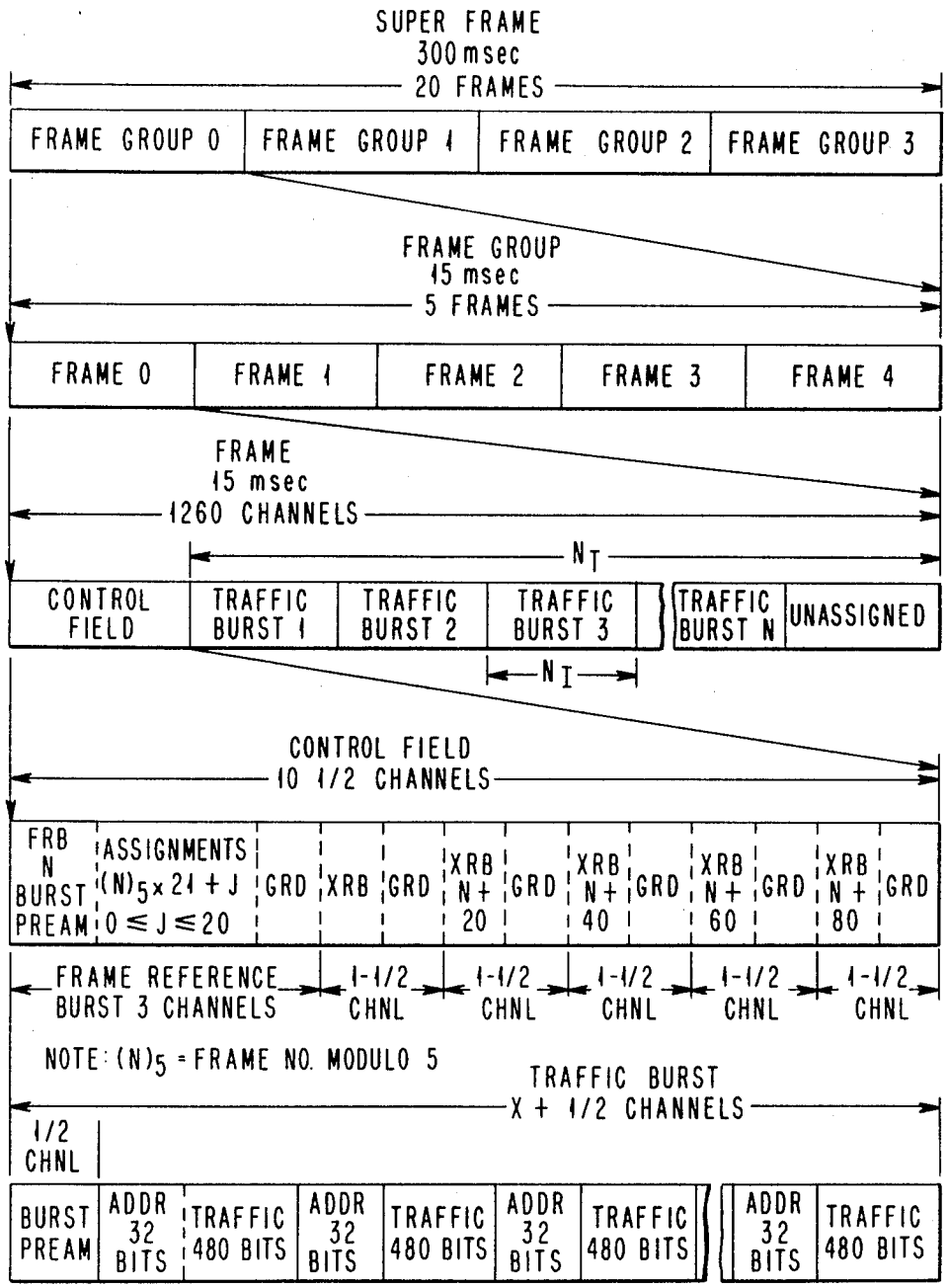
FIG. 2 illustrates the TDMA superframe format.

A schematic illustration of the relative position of the earth stations and the transponder satellite for the time domain multiple access (TDMA) satellite communications system is illustrated in FIG. 1. Subsidiary earth stations 1 and 2 and the reference station 3 on the surface of the earth 4 communicate via the synchronous satellite transponder 5 which orbits at approximately 22,500 miles above the surface of the earth 4, in a geosynchronous orbit. The reference station 3 maintains a uniform timing for the subsidiary stations 1 and 2 and assigns the traffic channel allocations to the subsidiary stations 1 and 2 as is described in the Fennel, et al. patent application Ser. No. 079,928 cited above. The TDMA communication between the earth stations 1, 2 and 3 is carried out employing a format such as is shown in FIG. 2. Each earth station includes connections to incoming digital lines 10 and voice lines 12 originating from terrestrial sources. These input lines are respectively connected to digital data ports 14, 16 and 18 and voice ports 20 on a satellite communications controller (SCC) 22, shown in functional block diagram in FIG. 3. The SCC 22 is a computer controlled satellite communications switching system which employs digital transmission techniques in the time division multiple access format shown in FIG. 2, which is output to a burst modem 24. On a real time basis, the burst modem 24 encodes the baseband signals received from the satellite communications controller 22 and interfaces with radio frequency equipment 26 at an intermediate frequency. During reception, the burst modem 24 decodes the signals received from the RF equipment 26 and interfaces with the SCC 22 at a baseband frequency. The burst modem 24 is gated on and off during transmission by the SCC 22. The burst modem 24 has a low duty cycle with the on period burst being interleaved with that of the other earth stations on a time sharing basis with the same carrier frequency, consistent with the TDMA mode of operation.

As is shown in the format of FIG. 2, time at the satellite is divided into 15 millisecond units called frames. Each earth station 1, 2 and 3 communicating with the transponder 5 is assigned, by the reference station 3, a portion of the frame in which to transmit its traffic burst. For example, subsidiary station 1 will transmit its traffic burst 7 to the satellite transponder 5 on a first frequency and the satellite transponder 5 will retransmit that traffic burst at a second, noninterfering frequency over the paths 6 and 8 to the other earth stations 2 and 3, respectively, in the network. Each traffic burst is received by all earth stations in communicating on the same transponder frequencies. The amount of time assigned for each earth station's traffic burst may be different for each earth station and also may vary over time. The length of time assigned to each earth station is determined by a demand assignment mechanism disclosed in the above-cited Fennel, et al. patent application. That demand assignment mechanism considers the traffic requirements of each earth station and of the total network to determine on a statistical basis the amount of time each earth station will be assigned in a frame.

As is shown in FIG. 2, a frame consists of a fixed time period allocated for transmission of network control and synchronization information and for transmission of traffic, from the active earth stations in the network to one or more other earth stations in the network. The 15 millisecond frame is divided into two segments, the control and the traffic fields. Bursts of information from each of the ground stations are transmitted on a time division multiple access basis in each frame. Each burst contains units of information called channels which consists of 512 binary bits each.

The first part of the frame is the control field. The control field is 10.5 channels in length. The frame control field consists of the frame reference burst (FRB) and five transmit reference bursts (XRB). The FRB is a 2.5 channel burst plus one-half channel of guard time, transmitted once each frame by the reference station. It contains assignment information for 21 earth stations and marks the beginning of each frame. The FRB is used by the SCC 22 at each ground station to maintain frame synchronization.

The transmit reference burst is one channel burst plus a one-half channel of guard time transmitted by each ground station once every 20 frames, called a superframe, as is shown in FIG. 2. Each ground station is assigned a fixed position in one of the frame control fields into which it bursts its transmit reference burst.

Each SCC 22 at each ground station uses its transmit reference burst to maintain the transmit clock synchronization. Each SCC 22 also used its transmit reference burst to transmit demand requests for a transponder capacity, to the reference station 3.

With reference to the format of FIG. 2, the remainder of the frame after the control field is the traffic segment. The traffic segment consists of a single traffic burst from each station 1, 2 and 3. The length of a traffic burst is variable. Its length and position are assigned in the frame reference burst by the reference station 3. The traffic bursts are used by the earth stations 1, 2 and 3 to transmit traffic and signaling information. During initial transmit acquisition, the transmit reference signal is sent by a local earth station in the traffic field to determine the range to the satellite. That part of the traffic field which remains after all of the subsidiary stations have burst is called the unassigned field.

A frame group consists of five frames and has a period of 75 milliseconds. A frame group is the timing basis for the transmission of the burst assignments to all subsidiary stations in the transponder. The frame group consists of five frame reference bursts with each containing 105 burst assignments. The frame group also contains slots for 25 transmit reference bursts from the respective 25 subsidiary stations to the reference station.

As is shown in FIG. 2, a superframe consists of four frame groups and has a period of 300 milliseconds. The superframe is used as the timing basis for the transmit reference bursts and for changes in the traffic burst assignments. Each earth station transmits its transmit reference burst once every superframe. The reference station 3 transmits a complete set of assignments which is repeated four times in a superframe. New assignments become effective on a superframe boundary, two superframes after the transmission thereof.

Satellite Communication Controller Overview

Figure 3:
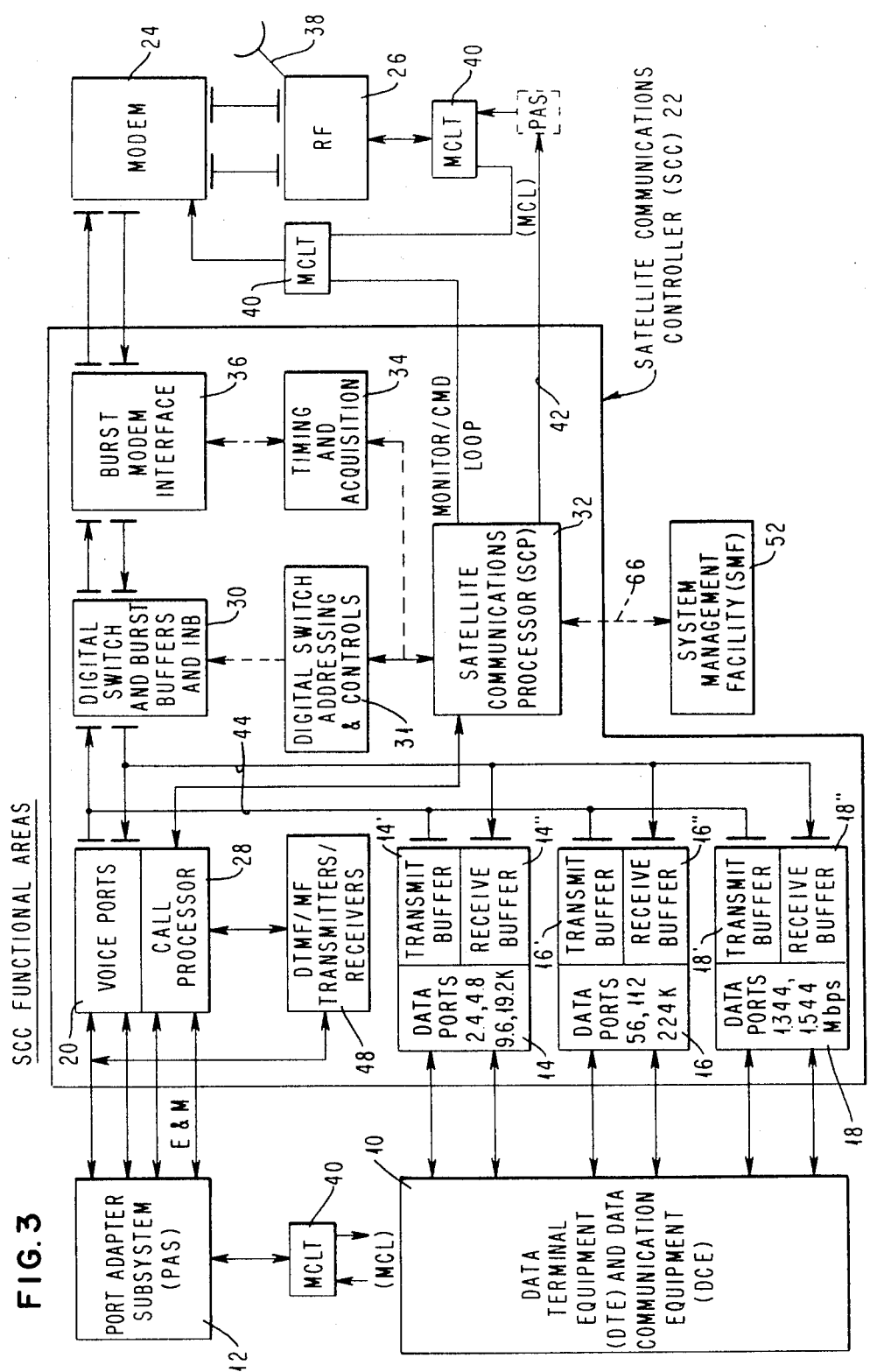
FIG. 3 is an overall block diagram of a satellite communications controller station in the TDMA network.

The satellite communications controller (SCC) 22 of FIG. 3 has five major functional areas, the voice ports 20 which include the associated call processor 28, the data ports 14, 16 and 18, the digital switch 30, the satellite communications processor 32 and the timing and acquisition mechanism 34 and its associated burst modem interface circuit 36.

As is shown in FIG. 3, the SCC 22 interconnects with telephone facilities via the port adapter subsystem 12. In addition, digital data lines 10 from modems, terminals, and business machines may be directly connected to the data ports 14, 16 and 18. The burst modem interface 36 is provided to enable transmission of information to the burst modem 24 directed to an intended destination earth station and its SCC via the radio frequency terminal 26 and its antenna 38. The monitor and command loop 42 provides a communication path to the other subsystems in the earth station from the satellite communications processor 32 and the monitor and command loop terminals (MCLT) 40 permit the other subsystems to attach to the loop 42.

The voice ports 20 are combined into six voice ports per voice processing unit (VPU) 25 or voice card which converts the analog voice signals to digital form using a delta modulation technique at 32 kilobits per second (Kbps) sampling rate. Conversely, the VPU 25 converts a received digital signal to the corresponding analog voice signal for each voice port. An example of the capacity of an SCC 22 is the servicing of 63 VPUs 25 or 378 voice ports 20.

The data ports 14, 16 and 18 are of three basic types depending on the interface and speed of the data source. The data ports are packaged on one of three digital data processing unit (DDPU) types depending upon the interface and speed. For rates less than 1.344 megabits per second (Mbps), each DDPU provides two data ports which must operate at the same rate. The rate is selected under program control. For 1.344 and 1.544 Mbps, each DDPU supports one data port. As an example, the SCC 22 can support as many as 126 data ports or 63 DDPUs and the mix of VPUs and DDPUs, providing the aggregate bandwidth is less than the total SCC bandwidth of 12.288 Mbps.

The voice ports 20 and data ports 14, 16 and 18 share a common bus 44 to the digital switch 30. The digital switch 30 synchronously samples each port 14, 16, 18 and 20 periodically in a rotating fashion buffering information to be transmitted and routing buffered received information to the appropriate port. The common bus 44 is one eight-bit byte wide and full duplex permitting simultaneous reception and transmission between the ports and the digital switch 30.

For a convenience, the basic bit rate for the ports in the SCC 22 is defined as the 32 Kbps sampling rate of the voice ports 20, so that all data ports 14, 16 and 18 will be generally referred to herein as being comprised of as many voice-equivalent ports as the magnitude of their respective data rates is related to the magnitude of the voice port sampling rate. For example, a data port having a data rate of 1.280 Mbps which is 40 times the basic voice port sampling rate of 32 Kbps would be considered as being equivalent to 40 voice-equivalent ports. A generalized voice-equivalent port will be designated by the number 21 in FIG. 4 but it is to be recognized that higher speed data ports are equivalent to combinations of the number of voice-equivalent ports 21 having an aggregate data rate which is an integral multiple of that for the basic voice-equivalent port 21.

The digital switch 30 is shown in more detail in the functional block diagram of FIG. 4. The digital switch 30 is under the control of the satellite communications processor (SCP) 32. The SCP 32 is a stored program general purpose digital computer and controls a connection matrix within the digital switch 30, called the switch control memory (SCM) 50. The SCM 50 establishes a correspondence between a particular port 14, 16, 18 or 20 and the address of a connected port at the destination earth station's SCC 22. The SCP 32 control over the SCM 50 is generally indicated by the digital switch addressing and controls 31 shown in FIG. 3. The digital switch 30 appends the port address to transmitted information and directs received information to the addressed port. By appropriately loading and unloading the SCM 50, the SCP 32 can establish point-to-point, multipoint, conference, and broadcast connections and route information to other ports 21 intranodally within the local SCC or internodally to any other SCC 22 in the TDMA network. The SCP 32 can also direct busy and dial audible tones from a read-only storage 46 to any voice port 20.

Signaling information derived from the E and M leads for voice is routed to the SCP 32 via the call processor 28. The SCP 32 accumulates the signaling information and establishes a connection with the destination SCC 22 using a software protocol.

Provision may also be made within the SCC 22 of FIG. 3 to permit dual tone multifrequency and multifrequency (DTMF and MF) converters 48 to be connected between dedicated voice ports 20 and the call processor 28. The coverters 48 which are transmitters and receivers, permit the conversion of DTMF/MF tones to a digit and, conversely, a digit to corresponding tone. The digit is processed by the call processor 28 in the same way as a normal rotary dial digit. By intranodally connecting the DTMF/MF trunk voice port to a voice port dedicated to a converter 48, converted DTMF/MF digits can be routed between the trunk and the SCP 32 via the call processor 28.

The timing and acquisition mechanism 34 in FIG. 3 controls the transmission and reception of information between the burst modem 24 and the digital switch 30 via the burst modem interface 36. The timing and acquisition mechanism 34 also provides clocks for digital data ports 14, 16 and 18 and internal clocks for all areas of the SCC 22 which are synchronized with the node designated as the reference station 3. The timing and acquisition mechanism 34 also provides the initial acquisition of the satellite under program control by the SCP 32 and insures proper burst synchronization to the satellite 5.

The monitor and command loop 42 is driven and terminated by the SCP 32 and used to gather status, monitor and control the other subsystems in the earth station. The monitor and command loop terminals (MCLT) 40 permit the subsystems to attach to the loop 42.

The system management facility 52, shown in FIG. 3, which controls the network, is connected to each SCC 22 via the satellite 5 through a dedicated data port and, as an alternate path, through the public switched telephone network to an auto-answer modem connected to the SCP 32.

Flow of Voice Traffic in the SCC

The voice ports 20 are combined six at a time into voice processing units 25 which convert incoming analog signals for each voice port to a 32 Kbps digital bit stream in a manner similar to that described in the copending U.S. patent application by Hallett, et al., Ser. No. 971,587, that patent application being entitled "Logarithmic Companded Delta Modulator," filed Dec. 20, 1978, and assigned to the instant assignee. The voice processing unit 25 will format this resultant bit stream into eight-bit bytes which are sent to the digital switch 30 once an analog connection has been established. If the connection is internodal, that is to another voice port 20 at another earth station's SCC 22 via the satellite transponder 5, the byte from the voice port 20 at the transmitting location enters the transmit burst buffer 54 shown in FIG. 4, which is located in the digital switch 30, where 60 bytes from the voice ports 20 are accumulated, plus a 32 bit destination address. The complete block of 512 bits, 32 bits for the destination address and 480 bits representing the voice signal, will be transferred from the transmit burst buffer 54 to the burst modem 24. Alternately, if the connection is intranodal, that is to another voice port 20 within the same SCC 22, the byte goes to the intranodal buffer 56 of FIG. 4 in the digital switch 30 for transmission to the local destination voice port 20.

The above process is reversed for voice signals being transferred to the port adapter subsystem 12 from the SCC 22. The voice processing unit 25 will receive the bytes, representing voice signals from a distant earth station's SCC 22 or alternately from another voice port 20 within the same SCC 22, via the digital switch 30. These bytes are processed at a 32 Kbps rate and converted back to an analog signal in the voice processing unit, representing the original analog signal. The voice processing unit 25 has the capability of simultaneously processing the receive signals for six voice ports 20. When a voice port 20 is idle in an on-hook condition, an alternating one/zero pattern will be injected into the voice port unit demodulator which will result in an idle noise level.

The voice processing unit 25 also provides for a voice activity compression (VAC) function for each voice port 20. The purpose of the VAC function is to minimize the required satellite link channel capacity between different SCCs 22, by not sending the resultant digital blocks when the lack of voice activity is detected on the incoming analog voice signals. The voice processing unit 25 receiving the digital blocks will fill in the bit stream for conversion to analog signals, with digital blocks representing background noise, when the VAC function occurs at the sending end voice processing unit. The normal receiving rate is 480 bits every 15 milliseconds, that is every TDMA frame, without any VAC function.

Flow of Digital Data Traffic in the SCC

The digital data ports 14, 16 and 18 are capable of communicating with business machines and modems. The digital data processing units (DDPU) supports a variety of data rates and have a modularity of either one of two data ports per DDPU. A first type of digital data processing unit 14 can serve as a data port for data rates of 2.4, 4.8, 9.6 or 19.2 Kbps. A second type digital data processing unit 16 can serve as the data port for 56, 112, or 224 Kbps data rate. A third type digital data processing unit 18 can serve as the data port for 448, 1,344 and 1,544 Kbps data rates. The selection of a data rate is programmably set by the SCP 32. The first and second type digital data processing units 14 and 16 can serve as two data ports each. The third type digital data processing unit 18 can serve as a single data port. The SCC 22 can support as many as 126 data ports, for example, provided that the aggregate data rate does not exceed the 12.288 Mbps total digital switch bandwidth of the SCC. A data buffer in each data port provides elasticity to compensate for the differences between the external interface timing and the internal SCC timing and also accumulates information in 480 bit blocks between the port and the digital switch 30. Information is transferred between the port and the digital switch 30 via the byte wide transmit receive common bus 44. Forward error correcting codes can be applied selectively to the data ports under the SCP program control.

Data activity compression (DAC) is provided for each data port 14, 16 and 18. DAC is analogous to VAC, since information is not transmitted if each byte in the frame is identical to the last byte transmitted in the previous frame. When the destination SCC fails to receive a block as expected, it repeats the last byte previously received for the duration of that block. In this way, the satellite link channel capacity is conserved by not transmitting idle characters and repetitive information.

Overview of the Digital Switch

The principal function of the digital switch 30 is to support the transfer of traffic among the ports 21 both intranodally within a single SCC and internodally between separate earth station's SCCs. The digital switch 30 interfaces with the ports 21 via the byte wide full duplex transmit/receive bus 44 which is capable of supporting 384×32 Kbps full duplex. A byte of transmitted information acquired from a port 21 over the transmit bus 44a is retained in the intranodal buffer (INB) 56 of FIG. 4. This byte can subsequently be delivered via the receive bus 44b to another port 21 connected intranodally to the first port. The byte of transmit information is also retained in the transmit burst buffer (TBB) 54, where transmit bytes from the same port 21 are accumulated into 60 byte blocks which is equivalent to a channel, prior to transmission to the satellite 5.

In a given TDMA frame, not all active ports 21 require the transmission of a channel or channels of information due to voice activity compression (VAC) and data activity compression (DAC). Advantage is taken of this fact and, as a result, the SCC 22 will have fewer channels allocated to it than would be required if the ports 21 operated without VAC and DAC. It is therefore possible that the number of channels to be sent may exceed the number allocated to the SCC 22 at a particular earth station. Those ports 21 with channels which require transmission but which were not sent or referred to as being "frozen-out." Because freeze-out is a possibility, the ports 21 are assigned a relative priority to assure that information with the highest requirement for integrity is sent first.

Traffic to be sent to the satellite 5 can be error protected using the forward error correction (FEC) and cyclic redundancy code (CRC) encoder 58 of FIG. 4, the encoding of which is a selectible option for each port 21.

All traffic channels to be sent to the satellite 5 are appended with a destination address and serialized by symbol to the burst modem interface 36. Upon receipt of a traffic channel and subsequent to its error correction, the destination address is examined by the receive address interpretation mechanism 60 to determine if the associated channel of information is destined for this SCC. If the channel of information is in fact destined for this SCC, the channel is placed in an elastic buffer 62 of FIG. 4. The elastic buffer 62 is employed to decouple the receive path from variations in receive timing due to eccentricities and variations in the inclination of the orbit of the satellite 5.

Received channels which have passed through the elastic buffer 62 are moved into the receive burst buffer (RBB) 64. The contents of the RBB 64, the INB 56 and the tone ROS 46 which contains specific audible tones, are the potential sources of receive information for each port 21 in FIG. 4.

The satellite communications processor (SCP) 32 contains a control program which accepts call messages and allocates satellite transmission resources locally. Call information is received from a local trunk via E and M signaling, and from a distant SCC via the common signaling channel from the satellite 5. Connections are made by passing control information to the digital switch 30 via the digital switch addressing and controls 31. The SCP control program also continuously collects hardware status information and call activity information for transmission to the system mangement facility (SMF) 52.

The system mangement facility (SMF) 52 has indirect monitoring and control capability over the SCC hardware. An SMF communications controller is the primary station in the data link 66 connecting it to each respective SCC 22, and periodically polls each SCC 22. The data link 66 is a dedicated, multidrop satellite circuit.

Detailed Description of the Digital Switch

Turning now to a more detailed description of the operation of the digital switch, the digital switch 30, shown in FIG. 4, supports the functions of moving information from the voice and digital data ports to the burst modem and vice versa, supports intranodal connections between ports, supports conferencing and multipoint data connections, and delivers audible tones to the voice ports. All of these operations are controlled indirectly by the SCP 32 via parameters which are specified by the SCP and retained in the switch control memory (SCM) 50. These parameters identify a specific local port 21, where information from that port is to be retained prior to transfer (to either a local port via the intranodal buffer 56 or to the burst modem via the transmit burst buffer 54), and the source of information which will be going back to the local port (that is the intranodal buffer 56, the receive burst buffer 64, or the tones ROS 46).

The VPUs 25, each with six voice ports 20, and the data ports 14, 16 and 18 are mounted on voice/data boards labeled 27 in FIG. 5, within the SCC 22. FIG. 5 illustrates the bus connection between the voice/data boards 27 and the transmit burst buffer 54, intranodal buffer 56 and receive burst buffer 64. A transmit bus 44a connects the voice/data boards 27 to the transmit burst buffers 54 and the intranodal buffer 56. The output of the transmit burst buffers 54 is connected through the output bus 45 to the FEC encoder 58 and transmit source selection mechanism 68.

The receive bus 44b connects the inputs of the voice/data boards 27 to the output of the tone ROS 46, the output of the intranodal buffer 56, and the outputs of the receive burst buffer 64. The inputs of the receive burst buffer 64 are connected by means of the bus 47 to the elastic buffer 62.

The switch control memory (SCM) 50 has as the contents of each of its RAM locations, the identity of a local port, the type of port identified, the buffer location (intranodal buffer or transmit burst buffer partition) in which data from a port is retained prior to transmission, and the buffer location (intanodal buffer or receive burst buffer partition) in which receive data is held prior to delivery to the port, the identity of an audible tone to be delivered to the port and additional controls. Each SCM RAM location is six bytes long with the bytes labeled zero through five. Table I indicates the significance of each byte in the SCM word format.

TABLE I

| | | SCM Word Format | | | |
|---|---|---|---|---|---|
| Byte 0 | Byte 1 | Byte 2 | Byte 3 | Byte 4 | Byte 5 |
| Local Port ID | Program Message | Port Type | RBB/INB | Buffer Address | Tone Address |

Each of the SCM bytes in the SCM word contain eight bits. There are 420 RAM locations or entries in the SCM 50. An entry is accessed in the SCM once every 595 nanoseconds. The entire SCM 50 is scanned in 420×595 nanoseconds or 250 microseconds. This is referred to as the SCM scan time. All 420 SCM entries are selected independent of the actual number of ports 21 installed on a particular SCC.

Figure 6:
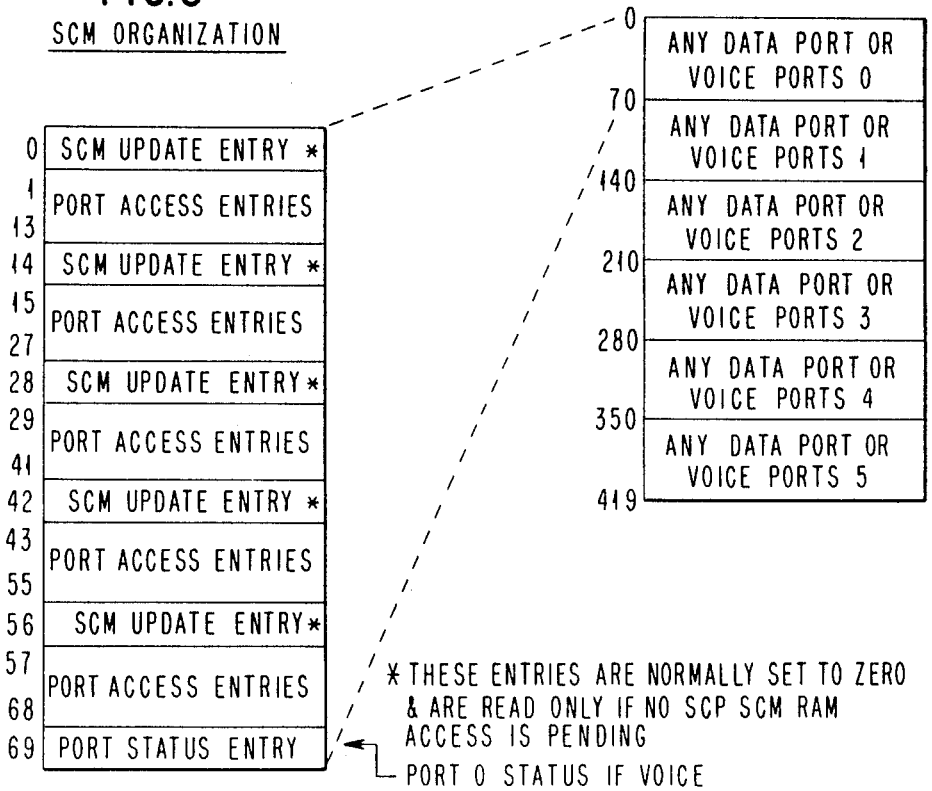
FIG. 6 is a schematic representation of the switch control memory organization.

The ordering of the SCM entries is shown in FIG. 6. There are 384 SCM entires which are used to transfer data to/from the ports 21. Each of these port access entries accpet a byte of information from a specific port 21 and delivers a byte of information to that port 21 every 250 microseconds. Therefore, an SCM entry accpets/delivers data from/to a port 21 at eight bits/250 microseconds which is equivalent to a 32 Kbps data rate. The data bandwidth of the bus 44 is therefore 384×32 Kbps which is 12.288 Mbps. The times on the transmit/receive bus 44 associated with these SCM entries are referred to as port access slots.

The remaining 36 SCM entries are set aside to provide the SCP 32 with an opportunity to pass control information to the ports 21 or to update the SCM 50. Six of these 36 SCM entries are set aside in order that the SCP 32 can transfer a byte of control information (referred to as status) to a specific port 21. Six of these status entries are required in order to assure the SCP access to any of the six voice ports 20 associated with a voice processing unit card 25. The times on the transmit/receive bus 44 associated with these six SCM entries are referred to as port status slots. The other 30 of the 36 SCM entries are set aside in order that the SCP 32 can update the SCM 50. Any six byte SCM entry can be updated during any one of these 595 nanosecond slots. The times on the transmit/receive bus 44 associated with these 30 SCM entries are referred to as the SCM update slots. These entries are normally set to zero and are not used. However when the SCM 50 is configured with six SCM update slots, the 24 update slots which are not adjacent to status slots can be used as port access slots. The SCM hardware can treat all 30 of these entries as port access entries if no SCM update is pending, to increase overall bandwidth. Table II shows the SCM entry format for the SCM byte zero through five, each byte containing eight bits of control information.

TABLE II

SCM ENTRY FORMAT

SCM BYTE 0

When Bit 0 = 1, bits 1 through 7 identify a port to be selected

Voice or Data Port Selection

When Bit 0 = 1, then
    Bits 1-2: port board address
    3-6: port card address
    7: digital data port address (i.e. port 0 or 1)

(The Digital Switch is structured to support 384 × 32 Kbps ports. The ports to be selected and the order in which they are to be selected are specified in the SCM. The seven bit port address is decoded to select a board and one of 16 cards within that board. The seventh bit is used to identify one of two ports associated with a digital data card).

When Bit 0 = 0, bits 1 through 7 identify alternate functions to be performed by the SCM Alternate Decodes of Byte 0

When Bit 0 = 0, then
a.     0 > 3 > 4: test card select
    Bits 1-2: identify the board containing the test card.
    Bits 5-6: must equal 0 0
    Bit 7: reserved
b.     0 > 3 > 4: Mode Set Command (this command is valid only in a port status entry).
    Bit 5 = 0: SCM supports 30 "SCM update slots"
    Bit 5 = 1: SCM supports 6 "SCM update slots"
c.     0 > 3 > 4: force errors
d.     0 > 3 > 4: SCM invalid

SCM BYTE 1

Reserved for program

SCM BYTE 2

Bit 0: Satellite active
1: apply FEC
2-4: port type code defined as follows:
000: 2.4K deferrable data port TABLE II-continued

SCM ENTRY FORMAT

| | | |
|---|---|---|
| | 001: | 4.8K deferrable data port |
| | 010: | 9.6K deferrable data port |
| | 011: | 19.2K deferrable data port |
| | 100: | diagnostic code |
| | 101: | unused |
| | 110: | voice port |
| | 111: | non-deferrable data port |
| | 5-7: | reserved (must be zero) |
| SCM BYTE 3 | | |
| | Bit 0: | port wrap |
| | 1: | reserved |
| | 2: | use RBB |
| | 3: | use INB |
| | 4: | intranodal conference |
| | 5: | not last partition user |
| | 6-7: | INB/TBB/RBB partition address (2 most significant bits) |
| SCM BYTE 4 | | |
| | Bit 0-6: | INB/TBB/RBB partition address (7 least significant bits) |
| | 7: | conditional write |
| | Note: | For status entries, byte 4 is loaded with the status to be sent to the port. (See SCM ORGANIZATION below.) |
| SCM BYTE 5 | | |
| When SCM byte 0 indicates some state other than mode set, then SCM byte 5 is defined as follows: | | |
| | Bit 0-2: | reserved |
| | 3-7: | tone address field |
| When SCM byte 0 indicates the mode set state, then SCM byte 5 is defined as follows: | | |
| | Bit 0: | ignore tone error |
| | Bit 1: | ignore RBB error |
| | Bit 2-7: | identifies the 250 usec boundry of the transmit clock on which the receive frame sync should be raised. |

The operation of the SCM 50 in carrying out voice port selection can be explained as follows. Each voice card 25 supports one encode/decode module (CODEC), which in turn supports six voice ports 20. Each CODEC multiplexes the output of six voice ports 20 onto the transmission bus 44a, as is shown in FIG. 7. A new byte of information from a given voice port 20 is available for transmission every 250 microseconds. A byte of information from one of the six voice ports 20 associated with a given voice card 25 is available every 250/6 or 41 microseconds. Operations on the receive bus 44b are similarly multiplexed. FIG. 7 is a representation of the voice card 25 and the operations that occur during one 41 microsecond period when, for example, voice port zero is capable of placing a byte on the transmit bus 44a and accepting a byte from the receive bus 44b, shown in FIG. 8.

All of the voice cards 25 are in frame synchronization; that is, transmit frame synchronization causes all voice cards 25 to make port zero available to the bus 44 simultaneously. All voice ports labeled 1 will be available to the bus 41 microseconds later, and etc. A specific voice port 20 can be selected in any one of the sixty-four 595 nanosecond port access slots that occur during the 41 microsecond period when that voice port is accessible.

The SCM 50 is also in frame synchronization. The bus slot counter 70 of FIG. 13, which addresses entries in the SCM 50, is returned to 0 at transmit frame sync time, thereby selecting the 0-th entry of the SCM 50. This 0-th entry will be selected again, 250 microseconds later after a complete scan of the SCM 50. The receive timing will be adjusted via the digital switch elastic buffer 62 in such a manner that the receive frame sync timing, as seen by the voice ports 20, will occur on a 250 microsecond boundary of the transmit clock. This will be coincident with access to the location zero of the SCM 50.

Therefore, the first sixty-four port access entries of the SCM 50 will control transmit/receive operations for all of the voice ports labeled as 0. The second set of sixty-four port access entries of the SCM 50 will control operations for all voice ports labeled 1, and etc.

A voice port 20 is selected 60 times in one 15 millisecond frame. The 60 bytes presented to the bus 44 as a result of these selects are accumulated in a partition of the transmit burst buffer (TBB) 54. Selected partitions of the TBB 54 will subsequently be transmitted to the satellite 5 in the form of traffic channels. Therefore, each entry of the SCM 50 must be thought of as developing one channel (referred to as a port channel) of information per TDMA frame. Each byte presented to the bus 44 by a voice port 20 is accompanied by an indication as to whether or not the byte exceeded the voice activity compression (VAC) threshold. Signals below the VAC threshold contain so little information that they can be ignored. A channel in which the VAC threshold was never exceeded contains no useful information and is not transmitted from the TBB 54.

The receive burst buffer (RBB) 64 performs a buffering function for reception of information from the satellite 5 in a manner analogous to that performed by the TBB 54 for transmit operations. A received channel of information destined for a local voice port 20 is buffered in a partition of the RBB 64. The 60 bytes so buffered will be subsequently delivered to the voice ports 20 during one 15 millisecond frame. If no channel is received, the missing channel is assumed to have been subjected to voice activity compression and background noise is then delivered to the local voice port 20.

The operation of the SCM 50 in selecting digital data ports will now be described. A digital data port 14, 16 or 18 may operate at one of several rates such as is shown in Table III. Table III illustrates the average port rate achieved by varying the number of 32 Kbps channels sent per frame.

TABLE III

Average Port Rate Achieved by Varying the Number of 32 Kbps Channels Sent Per Frame

| User Data Rate (Kbps) | Data Rate as a Function of FEC Option Invoked ¼ FEC Applied by Port ½ FEC Applied by Digital Sw (Kbps) | Average Channels Developed per Frame as a Funct. of FEC Opt. Invoked | Voice Equiv. Ports (N) Equal to the Number of SCM Entries Required | Number of Channels Sent/Received in Each Frame Until Pattern Repeats **(2.4 Kbps Pattern is Shown Folded at 20 Frames) | | | | | | | | | | | | | | | | | | | |
|---|---|---|---|---|---|---|---|---|---|---|---|---|---|---|---|---|---|---|---|---|---|---|---|
| | | | | 0 | 1 | 2 | 3 | 4 | 5 | 6 | 7 | 8 | 9 | 10 | 11 | 12 | 13 | 14 | 15 | 16 | 17 | 18 | 19 |
| 2.4* | 2.4 (w/o FEC) | 3/40 | 1 | **1 | 0 | 0 | 0 | 0 | 0 | 0 | 0 | 0 | 0 | 0 | 0 | 0 | 0 | 1 | 0 | 0 | 0 | 0 | 0 |
| | | | | 0 | 0 | 0 | 0 | 0 | 0 | 0 | 1 | 0 | 0 | 0 | 0 | 0 | 0 | 0 | 0 | 0 | 0 | 0 | 0 |
| | 4.8 | 3/20 | 1 | **2 | 0 | 0 | 0 | 0 | 0 | 0 | 0 | 0 | 0 | 0 | 0 | 0 | 2 | 0 | 0 | 0 | 0 | 0 |

TABLE III-continued

Average Port Rate Achieved by Varying the Number of 32 Kbps Channels Sent Per Frame

| User Data Rate (Kbps) | Data Rate as a Function of FEC Option Invoked ½ FEC Applied by Port ¼ FEC Applied by Digital Sw (Kbps) | Average Channels Developed per Frame as a Funct. of FEC Opt. Invoked | Voice Equiv. Ports (N) Equal to the Number of SCM Entries Required | Number of Channels Sent/Received in Each Frame Until Pattern Repeats **(2.4 Kbps Pattern is Shown Folded at 20 Frames) | | | | | | | | | | | | | | | | | | | |
|---|---|---|---|---|---|---|---|---|---|---|---|---|---|---|---|---|---|---|---|---|---|---|---|
| | | | | 0 | 1 | 2 | 3 | 4 | 5 | 6 | 7 | 8 | 9 | 10 | 11 | 12 | 13 | 14 | 15 | 16 | 17 | 18 | 19 |
| 4.8* | (w ½ Rate FEC) 4.8 (w/o FEC) 9.6 | 3/20 3/10 | 1 1 | 0 1 2 | 0 0 0 | 0 0 0 | 0 0 0 | 0 0 0 | 0 0 0 | 0 0 0 | 2 1 2 | 0 0 0 | 0 0 0 | 0 0 0 | 0 0 0 | 0 0 0 | 0 0 0 | 0 1 2 | 0 0 0 | 0 0 0 | 0 0 0 | 0 0 0 | 0 0 0 |
| 9.6* | (w ½ Rate FEC) 9.6 (w/o FEC) 19.2 | 3/10 3/5 | 1 1 | 1 2 | 0 0 | 0 0 | 0 0 | 1 2 | 0 0 | 0 0 | 1 2 | 0 0 | 0 0 | | | | | | | | | | |
| 19.2* | (w ½ Rate FEC) 19.2 (w/o FEC) 38.4 | 3/5 1-1/5 | 1 1 | 1 2 | 0 0 | 1 2 | 0 0 | 1 2 | 0 | 2 | 0 | 2 | | | | | | | | | | | |
| 56 | (w ½ Rate FEC) 56 (w/o FEC) 112 | 1¾ 3½ | 2 2 | 2 4 | 1 2 | 2 4 | 2 4 | | | | | | | | | | | | | | | | |
| 112 | (w ½ Rate FEC) 112 (w/o FEC) 224 | 3½ 7 | 4 4 | 4 8 | 3 6 | | | | | | | | | | | | | | | | | | |
| 224 | (w ½ Rate FEC) 224 (w/o FEC) 448 | 7 14 | 7 7 | 7 14 | | | | | | | | | | | | | | | | | | | |
| 1344 | (w ½ Rate FEC) 1344 (w/o FEC) 1536 | 42 48 | 42 48 | 42 48 | | | | | | | | | | | | | | | | | | | |
| | (w ½ Rate FEC) 2688 | 84 | 42 | 84 | | | | | | | | | | | | | | | | | | | |
| 1544 | (w ½ Rate FEC) 1544 (w/o FEC) 1764 4/7 (w ¼ Rate FEC) 3088 (w ½ Rate FEC) | 48¼ 55-1/7 96¼ | 49 56 49 | 48 55 96 | 48 55 96 | 48 55 96 | 49 55 98 | 55 | 55 | 56 | | | | | | | | | | | | | |

*Can Operate in Deferrable Mode

An entry from the SCM 50 will support a 32 Kbps full duplex data rate. It follows that a digital data port will require a magnitude of N such entries in the SCM 50 where N is the data port rate as seen at the bus 44 divided by the basic 32 Kbps data rate, with N being rounded up to the next whole integer. The data port 14, 16 or 18 is selected N times every 250 microseconds, once for each associated entry in the SCM 50. The data port transmits/receives a byte as a result of each select by the SCM 50. These data bytes are accumulated in/retrieved from the TBB 54/RBB 64 partition identified by each entry of the SCM 50. No relationship exists among these N partitions in the TBB 54 (or RBB 64). Every N-th byte transmitted/received by the data port 14, 16 or 18 will be associated with the same partition in the TBB 54/RBB 64.

Each byte transmitted from a digital data port 14, 16 or 18 is accompanied by an indication as to whether the byte currently being transferred is equal to the last byte of the immediately preceding frame. This is referred to as the data activity compression (DAC) indication. Each byte transmitted by a digital data port is also accompanied by an indication as to whether the data port detected a carrier from its terrestrial source when the byte was acquired at the port interface. This is referred to as the carrier detect indication. This bit is a reflection of the state of the receive line signal detector located in the data port.

If all bytes of the channel have been accompanied by a DAC indication, the channel contains no new information beyond that contained in the last byte of the preceding frame, and is therefore not transmitted from the partition within which it is stored in the TBB 54. This channel can then be reconstructed at the destination digital data port at the receiving earth station by the receiving data port remembering the last byte received in the last frame.

As can be seen with reference to Table III, not all data speeds result in an integral number of channels per frame. Of those data speeds which do not, the data port 14, 16 or 18 varies the number of channels developed per frame, in order to achieve the desired average data rate. The digital data port accomplishes this by sending data in only N−1 of the N channels associated with a particular data speed for a specific number of frames. The N-th channel select is subjected to data activity compression and, therefore, the N-th channel is not transmitted from the data port to the TBB 54 or from the TBB 54 to the satellite 5. In the next frame, all N channels are transferred from the data port to the TBB 54. Table III shows the number of channels associated with each frame over the number of frames the digital data port must average the data rate of that data port.

Digital data port speeds of greater than 32 Kbps are referred to as non-deferrable data. At these data speeds, a digital data port develops at least one channel's worth of information per TDMA frame. The variation in the number of channels developed per frame is never greater than one for a specific digital data port. That is, it develops either N or N−1 channels per frame. Several digital data ports, for example P ports, operating at the same speed will amplify this variation in channels developed, since they are in synchronization. For P ports, the variation would be P channels.

Digital data ports 14 having data speeds less than or equal to 32 Kbps are referred to as deferrable data. At these relatively slower data rates, a digital data port does not develop a channel's worth of information every TDMA frame. Several digital data ports operating at the same speed can each develop a channel's worth of information for transmission in the same frame. Thus, a possible surge in traffic channel demand might occur. This demand can be smoothed by carrying out the transmission of the channel's worth of information accumulated in the associated partition of the TBB 54 in some frame preceding the frame in which the digital data port presents still another channel's worth of information for transmission by the TBB 54. Thus, the average data rate of such a relatively slow digital data port 14 is sustained although the frame in which a channel may be transmitted/received may vary. Digital data ports managed in this manner are referred to as deferrable data ports.

A channel of information developed by a digital data port operating in this deferrable mode is placed in an associated partition of the TBB 54. As is seen with reference to FIG. 5, the TBB 54 is an A/B buffer with sufficient buffering to retain one channel in the A side and one channel in the B side for a number of voice-equivalent ports. During one frame, the A side of the TBB accumulates channels from a number of voice-equivalent ports. During the same frame, the B side of the TBB is available for transmission to the burst modem 24. In the next frame, the roles of the A side and the B side of the TBB are reversed. Thus for illustrating the operation of the deferrable data mode for relatively low speed data ports 14, it is assumed that a channel of information developed by the data port is placed in the partition location X of the A side of the TBB 54 during one frame and in the corresponding partition location X of the B side of the TBB 54 during the following frame. In this manner, it is certain that the channel of information will be available for transmission during any frame. This channel of information is serviced at the lowest priority level until the frame occurs in which the deferrable data port 14 develops a new channel's worth of information and places it in the B side of the TBB 54. If the old channel's worth of information has not yet been sent by the A side of the TBB 54, the old channel of information is serviced at the highest data port priority level to assure that the channel is transmitted from the TBB over the burst modem 24 so that the integrity of the communications is maintained.

By deferring low speed data transmission in this manner, the demand for transmitted channels can typically be smoothed across many frames by using unoccupied channels in the TDMA burst which would otherwise be unused. A number of such unoccupied channels in the TDMA burst will normally be available to low priority ports due to variations in the number of transmit channels required per frame for data speeds greater than 32 Kbps and those channels not required as a result of voice activity compression and data activity compression generating unoccupied channels in the TDMA burst.

Information buffering in the transmit operations is explained as follows. A port 21 selected by the SCM 50 will place a byte of information on the transmit bus 44a. If the selected port 21 is a voice port 20, the information byte is accompanied by an appropriate VAC indication.

If the selected port is a digital data port 14, 16 or 18, the information byte will be accompanied by an appropriate DAC and carrier detect indications. The contents of the transmit bus 44a are written into the intranodal buffer (INB) 56 and the transmit burst buffer (TBB) 54 partition identified by the entry in the SCM 50 which selected the ports 21.

Figure 9:
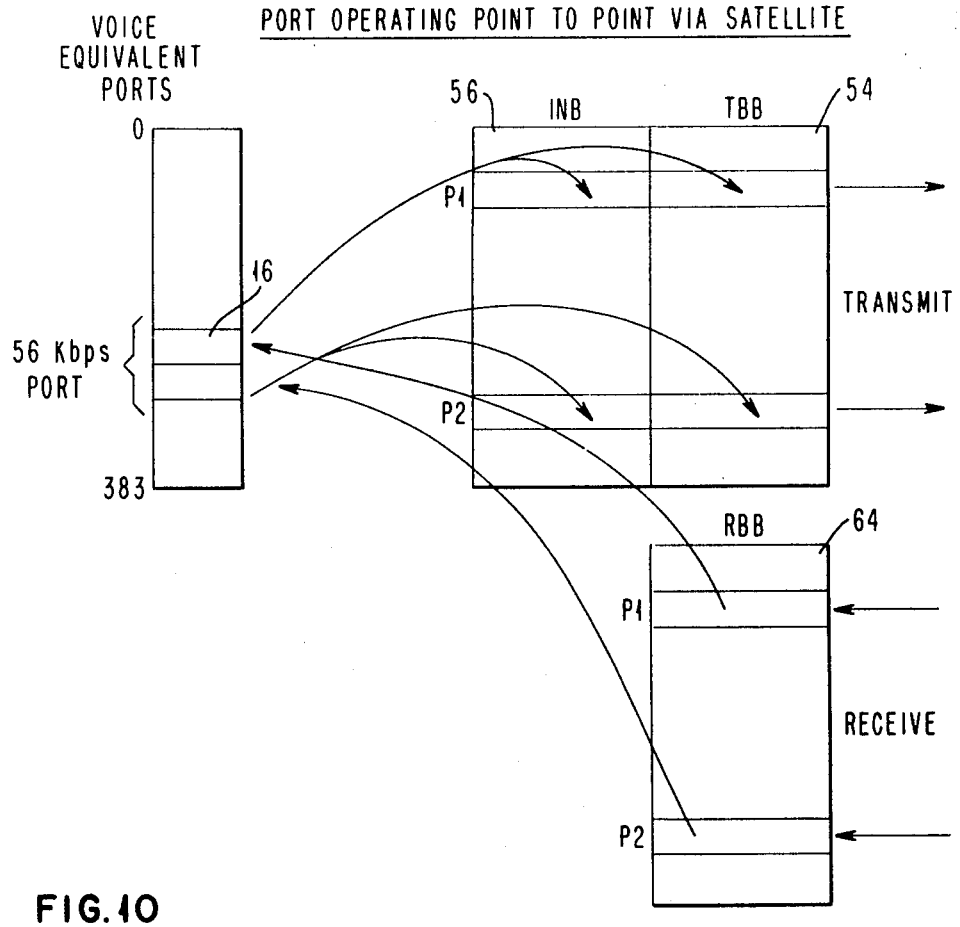
FIG. 9 is a schematic illustration of message routing for a 56 Kbps data port operating point-to-point.
Figure 10:
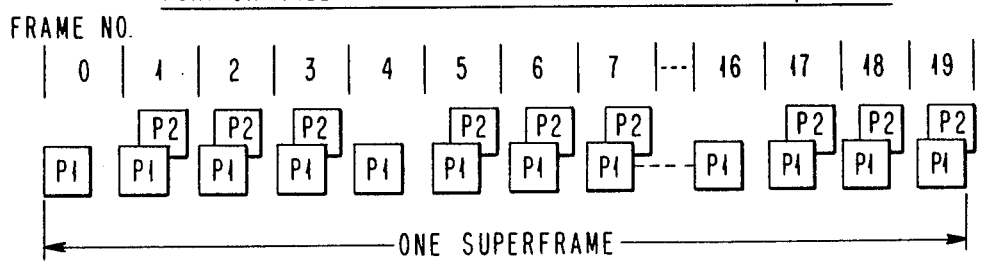
FIG. 10 is an illustration of the format during one superframe for the port channels sent for the 56 Kbps port of FIG. 9.

FIG. 9 is a schematic representation of the message routing for an example 56 Kbps data port 16 and FIG. 10 illustrates how a channel's worth of information developed by the digital data port 16 is formatted during one TDMA superframe, when the 56 Kbps digital data port 16 operates point-to-point via the satellite 5. A 56 Kbps digital data port represents two voice equivalent ports 21 (that is N=2). For FIGS. 9 and 10, P1 and P2 represent the partitions in the intranodal buffer 56 and the transmit burst buffer 54 identified by the two entries in the SCM 50 associated with this particular port. The port 16 will transfer one channel's worth of information to the digital switch 30 in the first TDMA frame of the superframe and two channels' worth of information in the next three TDMA frames, as is shown in Table III. The pattern will then be repeated. The resultant average data rate is then 56 Kbps. In those TDMA frames in which the port 16 is transferring one channel's worth of information, the select generated by the second entry of the SCM 50 is responded to by the port 16 with a DAC indication. Thus, the INB/TBB partition P2 will be interpreted to contain no useful information and will not be transmitted. The select associated with the first entry of the SCM 50 is responded to by presenting information received from the terrestrial interface to the port 16. As a result, the INB/TBB partition P1 will contain port information and will be transmitted (assuming it is not subjected to DAC). The receiving port at the destination earth station is in synchronization with the transmitting port 16 and expects only one channel of information.

In those TDMA frames in which the 56 Kbps port 16 is transferring two channels' worth of information, the selects associated with the first/second entries of the SCM 50 result in data being retained in the P1/P2 TBB partitions, respectively. Again, the receiving port at the destination location is in synchronization with the transmitting port 16 and expects two channels' worth of information. A destination port which does not receive the anticipated two channels' worth of information will assume those two channels to have been subjected to DAC.

In summary, it is the data port 16 which manages the presentation of the channel's worth of information to the digital switch 30 in order to achieve the desired average data rate.

The intranodal buffer (INB) 56 buffers all information passing among ports 21 associated with the same SCC 22. The INB 56 is an A/B buffer with sufficient buffering to retain one byte in the A side and one byte in the B side for each of the 384 voice equivalent ports selected by the SCM 50. During one 250 microsecond scan of the SCM 50, one side of the INB 56, for example the A side, is loaded with one byte from each of the 384 voice equivalent ports selected by the SCM 50. The other half of the INB 56, that is the B side, is available as a source of receive information (along with the tone ROS 46 and the RBB 64) for the ports 21. In the next scan of the SCM 50, the roles of the A side and B side of the INB 56 are reversed. The VAC or carrier detect indication accompanying each transmit byte from ports 21, is retained in an array referred to as the INB-loaded array 72. The INB-loaded array 72 is an A/B buffer with 384 partitions such that a VAC or carrier detect indication is retained for each byte in the INB 56. The contents of this array influences the choice of the source of receive information for the port 21.

Figure 11:
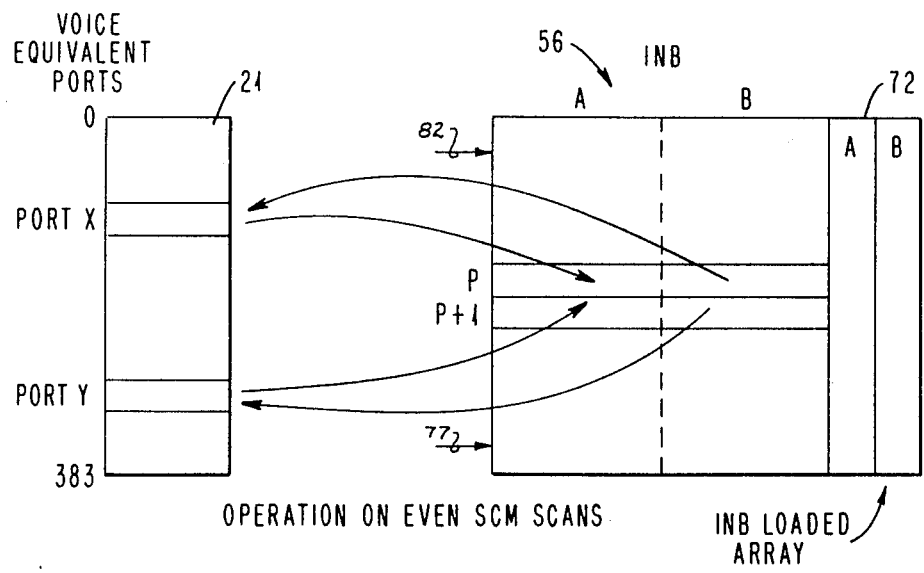
FIG. 11 is a schematic representation of the message routing for intranodal communication on an even SCM scan.
Figure 12:
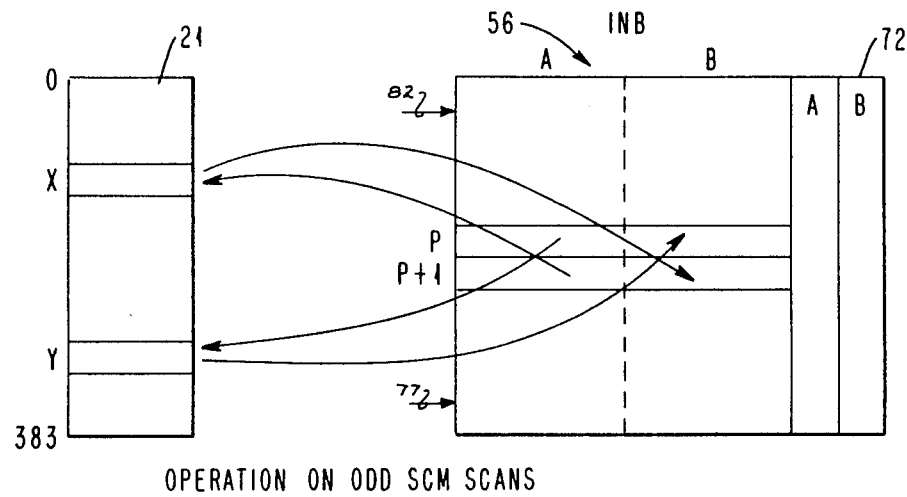
FIG. 12 is a schematic illustration of the message routing for intranodal communication during an odd SCM scan.
Figure 43:
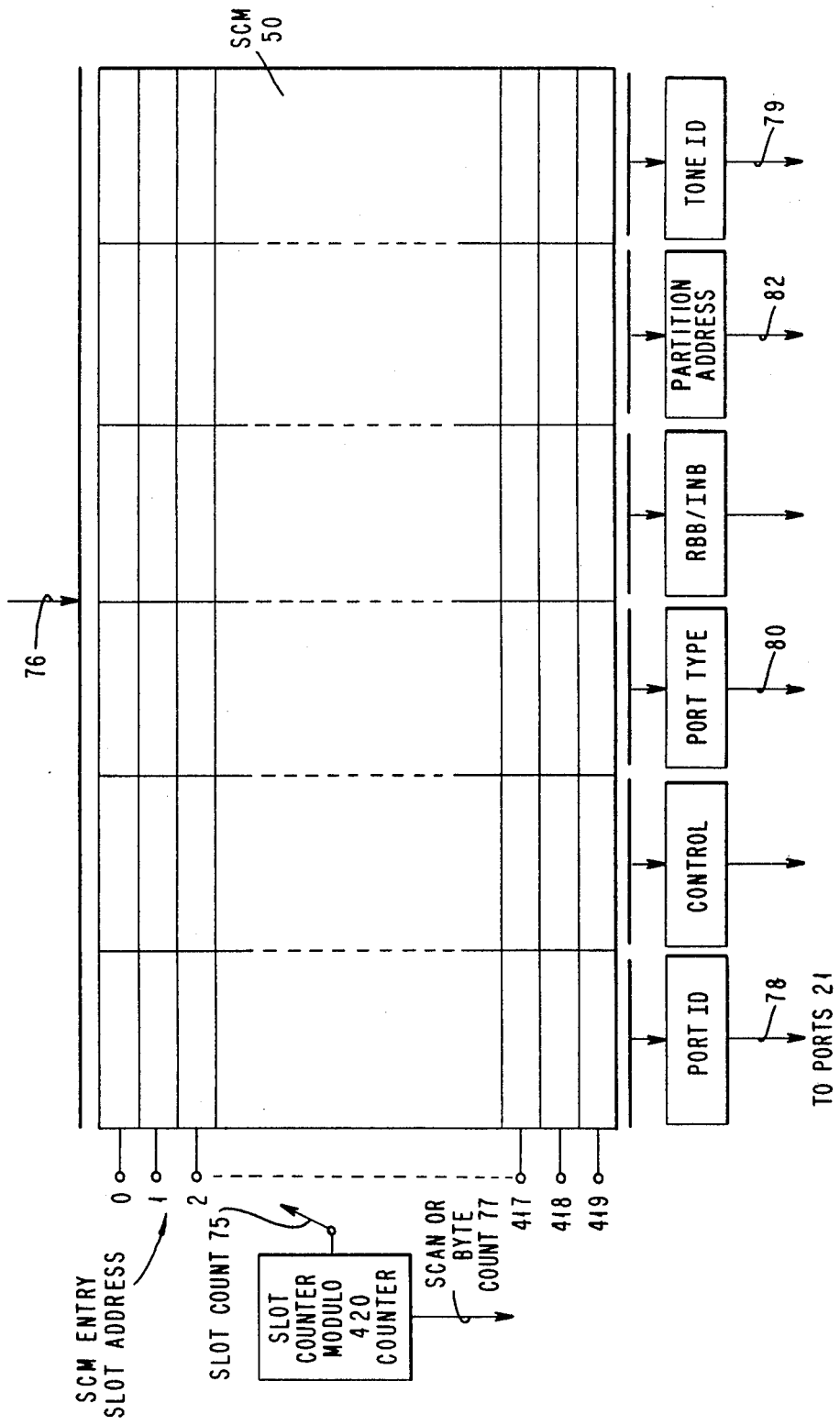

The SCM 50 associates a voice equivalent port 21 with a single partition of the TBB 54, the RBB 64, and the INB 56. The partition of the INB 56 with which the voice equivalent ports 21 is associated is alternated between two partitions by inverting the low order bit of the partition address on odd scans of the SCM 50, that is every first, third, . . . 59th, scan of the SCM 50. Two ports 21 communicating intranodally within the same SCC 22, are assigned N even/odd pair of partitions (for a voice port, N equals one). Therefore, in one 250 microsecond scan of the SCM 50, a port 21 writes N bytes into the INB 56 (which will be read by the other port in the following SCM scan) and it reads N bytes (which were written by the other port into the INB in the preceding SCM scan). FIGS. 11 and 12 are a representation of two voice ports, X and Y, communicating intranodally. The ports X and Y are assigned partitions P (which is of even value) and P+1 (which is of odd value), respectively. In even numbered scans of the SCM 50, the port X writes into the location P on the A side of the INB 56 and reads from location P of the B side of the INB 56. Similarly, the port Y writes into the P+1 location of the A side of the INB 56 and reads from the P+1 location on the B side of the INB 56. In the following scan of the SCM, the port X writes into the P+1 location on the B side of the INB 56 and reads from the P+1 location on the A side of the INB 56. Similarly, the port Y writes into the P location on the B side of the INB port 56 and reads from the P location on the A side of the INB 56. This alternation between a pair of partitions, as is illustrated in FIGS. 11 and 12, occurs only in the INB 56 and not in the TBB 54 or the RBB 64. In this manner, a local port has access to information placed into the INB 56 in the preceding SCM scan by another local port with which it is communicating. Thus, a single partition address in the SCM 50 indicates where information is to be buffered for transmission either in the INB 56 or the TBB 54 and also where information is to be obtained from either the INB 56 or the RBB 64.

The operation of the transmit burst buffer 54 is as follows. All information generated by the ports 21 which is to be sent to the burst modem 24 is accumulated in the TBB 54. The TBB 54 is an A/B buffer with sufficient buffering to retain one channel in the A side and one channel in the B side for a number of voice equivalent ports 21. During one TDMA frame, the A side of the TBB 54 accumulates a channel's worth of information from a number of voice equivalent ports 21. During the same TDMA frame, the B side of the TBB 54 is available for transmission of a channel's worth of information to the burst modem 24. In the next TDMA frame, the roles of the A side and the B side of the TBB 54 are reversed.

As is shown in FIG. 5, the design of the TBB 54 is modular with two TBB units referred to as a storage group, required to support 128 voice-equivalent ports 21 which are destined for transmission to the satellite 5.

An ancillary task performed by the TBB 54 is that of logically ORing together the one byte transmit bus 44a coming from each of the four voice/data boards 27 shown in FIG. 5. A TBB storage group (TBB pair) as is shown in FIG. 5 supports a pair of port boards 27 also shown in FIG. 5.

Overview of Port Burst Prioritization

Port burst prioritization for a satellite transmission can be described as follows. For a given number of active ports 21, if the port speed were the only consideration, the demand for satellite capacity would determine which channels would be transmitted. However, an additional consideration must be the imposition of voice activity compression (VAC) and data activity compression (DAC) which are employed to identify and preclude from transmission activity which appears to be either unintelligible or redundant in order to minimize the demand for a satellite channel capacity. It should be recognized that the need to compress information only pertains to the satellite traffic since the digital switch 30 is capable of supporting all 384 voice equivalent ports when they operate intranodally. The results of VAC and DAC are only statistically predictive. It is possible, therefore, that at times the number of channels to be sent exceeds the number which have been allocated to the SCC 22. Those voice equivalent ports 21 whose channels of information require satellite transmission but which are not sent, are referred to as having been frozen-out. Because freeze-out is a possibility, the ports 21 are assigned a relative priority in order to assure that information with the highest requirement for integrity is sent first in the TDMA burst.

The SCM 50 identifies a voice-equivalent port 21 and associates it with a particular partition in the TBB 54. A voice-equivalent port 21 is associated with one of three priority levels by means of the port type code stored in byte 2 of the SCM entry corresponding to that port. The SCM 50 scans each of the 384 voice-equivalent ports 60 times in one 15 millisecond TDMA frame. For each port type, particular scans are employed through the SCM to review the activity of that port type and to form threaded lists of associated partitions in the TBB 54 which contain channels of information to be transmitted to the satellite 5. The order in which the partitions of the TBB 54 appear within a transmit list associated with a particular port type is a function of the order in which the voice-equivalent ports 21 were scanned for activity in the SCM 50.

The order of bursting within a particular transmit list is last in/first out (LIFO). The order of bursting among transmit lists is a function of the port type, that is the relative priority.

Transmit priority levels are denominated 0, 1, 2 and 3. Priority level 0 is the highest priority level and is the level with which signaling information channels which are originated by the SCP 32 are associated.

Priority level 1 is the highest port traffic priority level and follows level 0 in the TDMA burst order. Level 1 is the level with which digital data from data ports 16 and 18 having data rates greater than 32 Kbps is associated. It can be appreciated, however, that any port type, voice or digital data, could be placed at the level 1 priority.

An entry is placed in the level 1 transmit list if the level 1 voice-equivalent port has been active any time during the TDMA frame. In order to accomplish this, the activity indication (VAC/DAC) associated with each byte transmitted by each voice equivalent port 21 is logically ANDed with its previous value throughout the frame. (DAC/off is used by digital ports to indicate activity.) This accumulated VAC/DAC indication is examined during the last scan of the TDMA frame (that is scan 60 of the SCM 50). If the VAC/DAC indicator is on (that is no activity indication), no action is taken. If the VAC/DAC indication is off, the identity of the partition in the TBB 54 with which the voice equivalent port 21 is associated is placed in the level 1 transmit list.

The level 2 priority follows the level 1 in burst order and is the level with which voice ports are normally associated. There is evidence which indicates that the loss of speech as the result of freeze-outs early in a talkspurt is subjectively less objectionable to the listener than loss of speech later in a talkspurt. As a result, the level 2 priority contains four priority sublevels based on talkspurt duration. Talkspurts whose durations have exceeded 45 milliseconds are given a higher priority than newer talkspurts in order to bias freeze-outs such that, if they occur, they tend to occur at the beginning of a talkspurt.

The priority sublevels for voice messages is organized so that sublevel 0 is the highest priority within the level 2 priority group. Sublevel 0 corresponds to a talkspurt duration of 45 milliseconds or longer, sublevel 1 corresponds to a talkspurt duration of 30 to 45 milliseconds, sublevel 2 corresponds to a talkspurt duration of 15 to 30 milliseconds and sublevel 3 corresponds to a talkspurt duration shorter than 15 milliseconds.

The level 2 sublevel 0 is referred to as "old voice." The other sublevels are collectively referred to as "new voice." A new talkspurt will progress up through the voice sublevels until it enters the old list where it will remain until the end of the talkspurt.

Priority level 3 is the lowest priority level and is the level to which deferrable data is assigned. Only data ports 14 operating below a 32 Kbps rate can be deferrable. Level 3 is actually composed of four priority sublevels, one for each data speed below 32 Kbps. The sublevel 0 is the highest of the level 3 priority group. Sublevel 0 corresponds to the 19.2 Kbps data port, sublevel 1 corresponds to the 9.6 Kbps data port, sublevel 2 corresponds to the 4.8 Kbps data port, and sublevel 3 corresponds to the 2.4 Kbps data port.

An entry is placed in the appropriate level 3 sublist if the port 14 has been active any time during the TDMA frame. The accumulated VAC/DAC indication provided by the port 14 is used to determine port activity during the last SCM scan of the frame.

A level 3 demand is serviced during that portion of the TDMA burst where surplus channel capacity is available after having serviced priority levels 0, 1 and 2. A level 3 port whose channel has not been transmitted before the beginning of the TDMA frame in which another channel's worth of information is to be developed, is serviced at the level 1 priority. That is, the priority of the channel's worth of information is raised in order to assure that the information is transmitted and the integrity of the communications is maintained.

Port Burst Prioritization Mechanism

FIG. 14 shows a detailed functional block diagram of the burst prioritization mechanism 74 in conjunction with the SCM 50 and the TBB 54. To gain a better appreciation of the part played by the SCM 50 in the formation of burst lists and the transmission of burst lists, the diagram of the SCM organization in FIG. 6 has been redrawn in FIG. 13 to incorporate the function of the six respective bytes in each SCM entry as was described in Tables I and II. The outputs labeled port identification (ID) 78, port type 80, and partition address 82 from the SCM 50 will be employed in the discussion of the operation of the burst prioritization mechanism of FIG. 14. In addition, the slot counter 70, which is a modulo 420 counter, has a first slot count output 75 which goes from 0 to 419 and accesses the correspondingly numbered 0 through 419 entries of the SCM 50. The slot counter 70 has a second output which is the byte scan count 77, which is incremented every time the slot count 75 reaches 419. The byte scan count goes from 1 to 60 and counts the number of bytes per channel's worth of traffic transferred from a given voice-equivalent port 21 to its corresponding TBB partition 54. These outputs will be connected to the burst prioritization mechanism as will now be explained.

The TBB partition addresses from the SCM 50 over line 82 pass through the partition register 102 and into the address register 104 where they are used to address the burst priority RAM 100. Partition addresses which are to be included in a transmit list are transferred from the address register 104 to the data register 106 and from there are written into the burst priority RAM 100 where the ordered lists of partition addresses are formed for use in bursting port traffic to the satellite.

The organization of the burst priority RAM 100 is shown in FIG. 15. It is divided into two identical regions to permit bursting from a transmit list in one region while simultaneously forming a transmit list of the same type in the other region. Each region contains a partition chain area 103 and 103' and an initial pointer area 101 or 101'. The initial pointer area 101, 101' consists of a fixed location initial pointer section 101a and a burst-ordered initial pointer section 101b. Partition addresses are read from the burst priority RAM 100 during the traffic burst and written into the RAM register file 122. From there, they are transferred to the next partition register 124 which is fed to the transmit space signaling buffer 126 for the purpose of obtaining the destination address for the next TBB partition to be burst. The next partition register 124 feeds the TBB address register 128 which is used for addressing the TBB 54 while bursting port traffic over the line 45 to the burst modem interface 36.

Basic Transmit List Formation Sequence

Transmit list formation is done in the burst prioritization mechanism of FIG. 14, in synchronism with the scanning by the slot counter 70 of the SCM 50. Transmit lists related to data ports 14, 16 and 18 of a specific speed each require one pass through the SCM 50 for their formation. Transmit lists related to voice ports 20 require two passes through the SCM 50. The basic sequence of steps involved in forming transmit lists in one pass through the SCM 50 is as follows.

1. At the beginning of the scan of the SCM 50, the data register 106 is cleared to 0.

2. As each entry in the SCM 50 is accessed by the SCM slot count 75, the partition address 82 from that entry is loaded into the partition register 102.

3. Each partition address is then transferred from the partition register 102 to the address register 104 with a bit called the "last entry" turned on in the address register 104.

4. A decision is made based on the state of the VAC/DAC bits 85 received from the ports 14, 16, 18 and 20, whether to include this partition address on line 82 in the list being formed. If not, no further action is taken with regard to this partition address. If however the partition is to be included in the list, the contents of the data register 106 is written into the location 103 of the burst priority RAM 100 specified by the partition address in the address register 104, after which the contents of the address register 104 are transferred into the data register 106.

5. Steps 2, 3 and 4 are repeated for each access to the SCM 50 throughout the scan by the SCM slot count 75 from 0 through b 419. If a partition address is encountered that causes the burst priority RAM 100 to be written in step 4, then all subsequent transfers to the address register 104 in step 3 will be with the "last entry" bit off.

6. At the end of the scan of the SCM 50 when the SCM slot count 75 has reached a value of 419, the contents of the data register 106 is written into the burst priority RAM 100 in the fixed location initial pointer area 101a, at the appropriate location for the particular list being formed.

As a result of the above sequence, a linked list of partition addresses representing port activity is formed. The list header is contained in the fixed location initial pointer area 101a.

FIG. 16 shows a simple example of a transmit list formed as described above. Partition addresses which have satisfied the conditions for inclusion in the list are assumed to have been encountered during the scan of the SCM 50 in the order 4-10-2-6. When partition address 4 appeared in the address register 104, it caused the cleared data register 106 to be stored at location 4 in the partition chain area 103 of the burst priority RAM 100. This entry is not shown in FIG. 16 since it is not considered to be part of the transmit list. Partition address 4 was then transferred from the address register 104 into the data register 106 with the "last entry" bit on since no previous partition address had caused the burst priority RAM 100 to be written.

Sometime later, when partition address 10 appeared in the address register 104, it caused the contents of the data register 106, that is the partition address 4 with the "last entry" bit on, to be written into location 10 of the burst priority RAM 100. Partition 10 was then transferred from the address register 104 to the data register 106, but this time the "last entry" bit is off. In the same fashion, partition address 2 caused partition address 10 to be stored in location 2, and partition address 6 caused partition address 2 to be stored in location 6.

At the end of the scan of the SCM 50 when the SCM slot count 75 has the value of 419, the contents of the data register 106, containing the partition address 6 with the "last entry" bit off, is stored in the appropriate fixed address initial pointer location 101a of the burst priority RAM 100. That completes the transmit list formation sequence for this particular list.

If there had been only one partition address which satisfied the conditions for inclusion in the list, it would have been stored in the fixed address initial pointer location 101a with the "last entry" bit on. If there had been no such partition addresses, the cleared data register 106 would have been stored as the initial pointer. This corresponds to a partition address 0 in the TBB 54 which is an invalid partition address and is recognized as representing an empty list.

During bursting of the transmit list, the order of accessing is shown by the arrows in FIG. 16. The initial pointer serves as the entry point to the list. Each entry provides the address of a partition in a TBB 54 to be burst as well as the pointer to the next partition address in the list. An entry with the "last entry" bit on signifies that the end of the list has been reached.

The elements in the burst prioritization mechanism of FIG. 14 which carry out the decision as to whether a particular port is to be enqueued into a particular burst list will now be described. The operation can be more fully appreciated with reference to FIG. 17 which is a timing diagram for burst list formation and transmission. It will be recalled from the prior discussion of the SCM organization and the operation of the voice ports and digital ports, that each voice port operates at 32 Kbps which produces exactly one channel's worth of 60, eight-bit bytes of information per frame. The slot counter 70 scans through the SCM 50 at a rate of 60 times per frame, in synchronism with the sampling in the voice ports 20. As long as there is voice activity on a voice port 20 so that the VAC 85 is not on, the burst prioritization mechanism can continuously enqueue 60, eight-bit bytes of information per frame.

In a similar manner, high speed data ports having data rates greater than or equal to 32 Kbps, will be producing at least one channel's worth of 60 eight-bit bytes of data per frame. If the data rate for a particular high speed data port is not an integral multiple of 32 Kbps, it will be recalled that the data port 18 will transmit either N or N−1 channel's worth of information per frame to the digital switch 30 based upon a stored pattern in the data port 18. And that when N−1 channel's worth of information are to be transmitted, the N-th channel's worth of information which is omitted will have substituted for it a DAC bit indication. Thus, it can be seen that whenever a particular SCM entry is encountered wherein the port type 80 is indicated as being either voice or high speed data, in the absence of a VAC or DAC indication on line 85, the burst priority RAM 100 can be enabled to enter the partition address for that port into its corresponding burst list.

A different situation is encountered for those data ports which, as was previously described, are low speed, having a data rate which is less than 32 Kbps. These data ports do not develop a channel of information every frame but accumulate a channel's worth of data in the buffer 14' at the data port 14 over a predetermined number of frames and only after that predetermined number of frames will the channel's worth of data be transmitted to the digital switch 30. Thus it is necessary to known in which frame a particular type of low speed data port can be expected to transmit its channel's worth of information to the digital switch 30.

Reference should now be made to the SCM organization shown in FIG. 6 and the timing diagram shown in FIG. 17 to better understand the burst list formation operation. As was mentioned before in the discussion of the SCM organization, the SCM has 420 entries numbered from 0 through 419, which are accessed by the slot counter 70 over the SCM slot count line 75. Each one of the 60 scans of the SCM slot count 75 through the SCM 50 will enable each consecutive port 21, identified on line 78 from the SCM 50, to transmit one eight-bit byte of information to the partition address in the TBB 54 indicated on line 82 from the SCM 50. At this point there is no defined burst order for the information which is being stored in the TBB 54. However, the relative priority of the various types of information, that is high speed data, low speed data, voice, etc., which is being stored in the TBB, dictates that some order be imposed upon the bursting of this information to the satellite, so that higher priority information is more certain of being successfully transmitted and lower priority information can be sacrificed, if necessary. This is accomplished, starting with the 37th scan of the SCM slot count 75 through the SCM 50, that is, when the byte scan count 77 is equal to 37. Beginning with the 37th scan through the SCM 50, the port type indication stored in each entry in the SCM and output over line 80 is examined. Particular scans through the SCM 50 will concentrate on a particular type of port and will pick out those entries in the SCM 50 under examination in that particular scan, and examine those corresponding ports 21 for past and present activity. When voice ports 20 or high speed data ports 18 are being examined, only the past or present activity of that port during the frame will be examined and if activity is indicated, that particular port will have the corresponding TBB partition address enqueued in the burst priority RAM 100. If the particular SCM scan is examining a low speed data port 14, not only will the past or present activity of that port during the frame be examined, but recognition will be made of the frame count for the present frame to determine whether the data port's transmission pattern can be expected to enable the transmission of a channel's worth of data during this frame. The operation continues until the byte scan count 77 has reached 60 at which time the end of the frame has been reached and the burst prioritization mechanism 74 then prepares the heads of the respective burst lists for read-out during the assigned burst time in the next TDMA frame.

FIG. 14 shows the slot counter 70 connected by means of the SCM slot count output 75 to the SCM 50 so as to consecutively address the 420 SCM entries. As an example of burst list formation, assume that the SCM scan count 75 has progressed 41 times through the SCM 50 so that the byte scan count 77 has a value of 41. In accordance with the timing diagram of FIG. 17, during the 41st scan, voice ports 20 will be searched for on the port type output line 80 which is connected from the SCM 50 to the enqueue control read-only storage (ROS) 88. The VAC/DAC line 85 connected from the voice port 20 identified on the port ID line 78, is also input to the enqueue control ROS 88. If the VAC line 85 indicates that the port 20 is active, the enqueue control ROS 88 will output on line 94 an enqueue enable signal which is transmitted over line 136 as a write enable signal to the burst priority RAM 100. The corresponding TBB partition address output on line 82 from the SCM 50 is then input to the partition register 102 and will progress through the address register 104 and the data register 106 so as to be enqueued in a burst list being prepared for this type of voice port 20 in the burst priority RAM 100. After the slot counter 70 has counted through 419 on the SCM slot count 75 during this 41st scan for the byte scan count 77, during which the byte scan count decode ROS 88 has delivered an enabling signal to the burst priority RAM 100, the condition of having reached the end of the 41st scan in the SCM 50 will be indicated over the SCM slot count line 75 to the slot count decode ROS 114. At this juncture, the slot count decode ROS 114 will signal to the list pointer control 112 that the last voice port TBB partition address is to be stored in the burst priority RAM 100 in the fixed location initial pointer address 101a corresponding to this type of voice port, as is indicated by the byte scan count 77 line input to the list pointer control 112. The initial pointer address generated by the list pointer control 112 will be entered through the register file 108 to the address register 104 and the last voice port TBB partition will be stored at that address location in the fixed location initial pointer 101a. That completes the formation of that particular voice port list. If a voice port of that type were active during a portion of the frame but ceased activity or had intermittent activity during the frame, the voice activity memory 96 connected to the enqueue control ROS 88, will have stored the condition that there was activity for that particular voice port at least during some portion of the frame and that will satisfy the condition of port activity during the SCM scan when that type of port is being examined for activity.

A similar operation is carried out for high speed data ports 16 or 18.

When low speed data ports are being examined during the 56th, 57th, 58th or 59th SCM scan as indicated in FIG. 17, recognition must be taken of the particular frame count for the present frame since, as is shown in Table III, low speed data ports transmit their channel's worth of information only during certain predetermined frames in a 40 frame period of time. The frame count is input on line 91 to the low speed data control ROS 90 which also has an input on the line 80' for low speed data port types which comes from the SCM entry for that particular port 14. When the byte scan count 77 from the slot counter 70 indicates to the byte scan count decoder ROS 86 that the 57th through 59th SCM scan is presently underway, indicating that a particular type of low speed data port is under investigation, then the enqueue control ROS 88 will require that the output from the low speed data control ROS 90 indicate that the desired frame count for the particular port type under investigation, be present before an enqueue enable signal on line 94 will be issued. When this circumstance obtains, then the enqueuing of that particular low speed data port's TBB partition address in the burst priority RAM 100 will be carried out as has been previously described for voice ports 20 and high speed data ports 18.

At the end of the 60th scan through the SCM when the present frame has ended, the burst prioritization mechanism 74 will reorder the initial pointers from the fixed location area 101a into a new order stored in the burst ordered initial pointer area 101b. It will then fetch the highest priority initial pointer from the burst ordered initial pointer list 101b in the burst priority RAM 100 and load it into the RAM register file 122 and from this point on, every 14th SCM update entry slot shown in FIG. 6 will be used to access the burst priority RAM 100 to fetch the next list entry for bursting when the timing and acquisition controls 34 signal the burst prioritization mechanism 74 to commence the burst transmission to the satellite.

Voice Port Burst List Formation

A more detailed description of the particular operation of the burst prioritization mechanism for carrying out the formation of voice port transmit lists is disclosed in the copending U.S. patent application Ser. No. 126,080 entitled "Priority Threaded Message Burst Mechanism for TDMA Communication" by J. A. Alvarez, et al., filed and assigned to the IBM Corporation.

Low Speed Data Port Burst List Formation

Data ports 14 operating at 2.4 Kbps, 4.8 Kbps, 9.6 Kbps and 19.2 Kbps do not produce a channel's worth of information every frame, as can be seen from Table III and the previous discussion, and thus do not require transmission to the satellite every frame. Because of this characteristic, efficiency in the use of the assigned satellite bandwidth may be increased by placing these ports in a deferrable mode. Deferrable mode operation is basically as follows:

1. The data port 14 transfer a channel's worth of information to the TBB 54 during one of the frames so designated in Table III. If a DAC bit presented by the data port is turned off at any point in this frame, it will remain off until the end of the frame, indicating that some activity was present at the port during the frame.

2. The burst prioritization mechanism enters the data ports' partition address in the appropriate deferrable data transmit list in the burst priority RAM 100 if the DAC bit presented by the data port is off.

3. In the following frame the port retransfers the same channel's worth of information to the TBB 54, thus providing copies of the channel in both the A part of the TBB and the B part of the TBB, as was described above. An exception to this occurs every fifth frame for the 19.2 Kbps ports which transfer a new channel to the TBB 54 rather than a repeat of the channel transferred in the previous frame.

4. In this following frame also, the burst prioritization mechanism begins to use, at low priority, the transmit list formed in the previous frame for transmission to the satellite from the TBB loaded in the previous frame.

5. In all subsequent frames, until the last frame involving the transfer of a new channel to the TBB 54, the data port 14 prevents the TBB 54 from being written into at its corresponding partition address and the burst prioritization mechanism continues using the same transmit list at low priority.

6. During the next frame in which the data port 14 transfer a new channel of information to the corresponding partition address in the TBB 54, the burst prioritization mechanism elevates the old transmit list containing the remaining portion of the deferred data ports which have not yet been transmitted, to a higher priority, bursting from the opposite side of the TBB 54 to that side which is being loaded by the data port 14.

7. At the SCC 22 at the receiving earth station, the receiving data port 14 must be capable of handling the channel's worth of information whether it is transmitted at the earliest opportunity or at the latest. The receiving data port 14 accomplishes this by holding the channel's worth of information in a buffer 14'' at the time of its receipt until the occurrence of the frame after the latest one possible, at which time it starts unloading the buffer.

The dynamically variable priority feature for the low speed data ports is carried out by the elements shown in the detailed diagram of FIG. 14. In particular, the low speed data priority ROS 120 has as an input, the frame count 91 and the port type 81'. After burst list formation has taken place during a particular frame and the 60th SCM scan has been completed, the fixed location initial pointers in section 101a of the burst priority RAM 100 are updated based on the traffic burst in the previous frame, under the control of the list pointer control 112. As each deferred data port list is reviewed in this updating operation, the low speed data priority ROS 120 compares the frame count 91 to the latest frame during which the deferred must be burst before it is lost. If that latest frame has occurred, then the relative priority of the low speed data port list under examination is increased so as to be equivalent to the high speed data port priority and that list will be placed in the burst ordered initial pointer area 101b just behind the high speed data list for bursting during the next frame.

In particular, the 2.4 K deferrable data transmit list is formed during the 56th SCM scan at each frame in which 2.4 K data ports produce their channels. Entries in this list are partition addresses associated with the SCM entries wherein the data port type is 2.4 K deferrable data and the internodal bit is on and the DAC bit presented by the port during the 56th SCM scan is off.

During the 60th and last SCM scan of each of these frames, a bit in the port activity memory 96 is turned on for each 2.4 K data port presenting a DAC bit off but which was not included in the list formed in the 56th SCM scan. These bits then identify those 2.4 K partitions in the TBB 54 containing information that should be transmitted to the satellite, but for which the DAC-off activity was not detected until after the 56th byte of the channel. These partition addresses are included in a transmit list formed during the 56th SCM scan of the following frame, called the 2.4 K residual list. It is formed in the same manner as the 2.4 K primary list except the bit in the port activity memory 96 is used instead of the DAC bit from the port 14.

4.8 Kbps deferrable data transmit lists are formed in a fashion identical to that for the 2.4 K lists except that the 57th SCM scan is used to form the lists. Thus the 4.8 K residual list represents channels in which the DAC-off activity was not detected until after the 57th byte.

9.6 Kbps deferrable data transmit lists are formed in a fashion identical to that for the 2.4 K list except that the 58th SCM scan is used to form the list. Thus the 9.6 K residual list represents channels in which the DAC-off activity was not detected until after the 58th byte.

19.2 K deferrable data transmit lists are formed in each of the frames 0 and 2 in Table III. The list formed in frame 0 is used at low priority in frame 1 and at high priority in frame 2. The list formed in frame 2 is used at low priority in frame 3 and at high priority in frame 4.

The 59th SCM scan is used to form those lists of partition addresses wherein the data port type is 19.2 K deferrable data and the internodal bit is on, and the DAC bit presented by the data port is off. Ports not indicating DAC-off until the 60th SCM scan are flagged in the port activity memory 96 and included in the non-deferrable data transmit list in the following frame, since no deferring will be possible for these ports.

Similarly, in frame 4 of Table III, the channels produced by the 19.2K ports are not deferrable since a new channel is produced again in frame 5. Thus, in frame 4, a 19.2K deferrable data transmit list is not formed but rather, 19.2K ports indicating DAC-off for the 60th SCM scan are entered into the non-deferrable data transmit list along with the ports defined as nondeferrable or high speed data ports in the SCM.

High speed or non-deferrable data transmit lists are formed in the 60th and last SCM scan of each frame. Partition addresses associated with SCM entries wherein the port type is non-deferrable and the internodal bit is on, and the DAC bit presented by the port was off any time during the frame, are always included in this list. In addition, 19.2K partition addresses for which deferring is impossible are included in this list as discussed above.

Traffic Bursting from Transmit Lists

The following sequence of operations is performed by the burst prioritization mechanism each frame. The order given below is that actually used, starting at the beginning of the frame. The first two operations take place during the first 10½ channels of the frame during which no traffic bursting may occur.

1. Update fixed location initial pointers 101a based on traffic bursts in the previous frame under the control of the pointer control 112.

2. Order initial pointers by priority in burst ordered initial pointer lists 101b for traffic bursting in current frame under the control of the pointer control 112 and the low speed data priority ROS 120.

3. Count freeze-outs based on traffic bursting in previous frame.

Supply partition addresses from the burst priority RAM 100 under the control of the pointer control 112, as initiated by the request on line 138 from the timing and acquisition mechanism 34 to burst the next channel partition from the TBB 54. This initiates the bursting of traffic using the burst ordered initial pointers and their associated transmit lists in the burst priority RAM 100.

Each of these operations is discussed below, but in a different order than given for reasons of clarity.

The burst ordering of initial pointers occurs at the beginning of each frame, the set of initial pointers existing in the fixed location initial pointer area 101a of the burst priority RAM 100 which represents the transmit list which should be considered for use in bursting in the current frame. These initial pointers are examined for validity, and if valid, placed in the burst ordered initial pointer list 101b, according to their respective priorities in the frame, along with an identification of the initial pointer. An invalid initial pointer which is all zeros, is stored as the last entry in this list.

The ordering of which the initial pointers are examined and placed in the burst ordered initial pointer list 101b is as follows:

1. Non-deferrable data
2. Deferrable data when no longer deferrable
3. High priority voice
4. Low priority voice
5. Deferrable data when deferrable The deferrable data initial pointers are examined in the order of 19.2K, 9.6K, 4.8K and 4.2K. The primary list is examined before the residual list for each respective speed.

Traffic Bursting

In preparation for traffic bursting, the burst prioritization mechanism 74 fetches the highest priority initial pointer from the burst ordered initial pointer list 101b under control of the pointer control 112 and the register file 108, and loads the pointer in the address register 104. When the timing and acquisition mechanism 34 transmits a signal over the line 138 requesting the burst of the first channel partition from the TBB 54, the pointer control 112 responds by executing an access to the burst priority RAM 100 on every 14th SCM slot as determined by the slot count decode ROS 114. This corresponds to the location of the update slots as is seen in FIG. 6 for the SCM organization. This access fetches the next list entry from the burst priority RAM 100 for bursting and loads that list entry into the RAM register file 122. Two locations in the RAM register file 122 are used for this purpose with one holding the entry used to access the list and the other being loaded with the entry thus accessed. The roles of these file locations reverse as each entry is used for bursting.

During traffic bursting, the timing and acquisition mechanism 34 repeatedly issues a next partition request on line 138 to the burst prioritization mechanism 74. Each "next partition request" causes the appropriate RAM register file 122 location to be loaded into the next partition register 124 as well as a reversal of the roles of the RAM register file 122 locations. Thus, during the next SCM update slot, which is approximately 8 microseconds after the previous SCM update slot, the next element in the partition address list will be fetched and loaded into the RAM register file 122 in preparation for being transferred to the next partition register 124 when the next partition address is requested. The next partition address should be requested approximately 12 microseconds after the previous address, and it is therefore seen that the SCM scanning operation passes through SCM update entry points at a faster rate than the rate at which requests are received from the timing and acquisition area 34 for new TBB partitions to be transmitted.

When an entry is encountered in the burst priority RAM 100 having the "last entry" bit on, that entry is not used for accessing a next entry, but rather the next initial pointer in the burst ordered initial pointer list 101b is accessed. When an invalid initial pointer is encountered in the next partition register 124, as will occur when the transmit lists have been exhausted in the burst priority RAM 100, the next partition register 124 is locked in that state for the remainder of the frame. The burst control area in the timing and acquisition mechanism 34, in turn, causes no channels to be burst when it is presented with an invalid partition address.

At the end of each frame, the partition address in the RAM register file 122 that would have been used next for bursting, had the bursting continued, is stored as the new fixed location initial pointer in area 101a for the transmit list in use when the bursting stopped. Invalid partition addresses are stored as the fixed location initial pointers in area 101a for the transmit lists which were exhausted during the traffic burst.

Description of the List Pointer Control

A more complete understanding of the operation of manipulating the list pointers during the burst list formation stage, during the burst list reordering stage and during the burst list transmission stage can be had by referring to the copending U.S. patent application Ser. No. 126,076 entitled "Dynamically Variable Priority, Variable Position Channels in a TDMA Burst" by J. A. Alvarez, et al., filed and assigned to the IBM Corporation in which is described a detailed functional block diagram of the list pointer control 112.

Overview of the Mechanism for Synchronization of Data Ports

The SCC 22 is capable of interfacing with local, terrestrial data sources via the data ports 14, 16 and 18. As was previously mentioned, the data ports in the SCC can be conveniently packaged with either one or two data ports per digital data processing unit (DDPU) 15, as is indicated in Table IV. The control and data interface protocol for each type of data port is referred to in Table IV.

TABLE IV

| Type (Label) | Data Rate Kbps | Modularity Ports/DDPU | Interface |
|---|---|---|---|
| 1 (14) | 2.4,4.8,9.6,19.2 | 2 | RS-232-C (EIA) |
| 2 (16) | 56,112,224 | 2 | V.35 (CCITT) |
| 3 (18) | 1,344 and 1,544 | 1 | Bell 306 |

Figure 18:
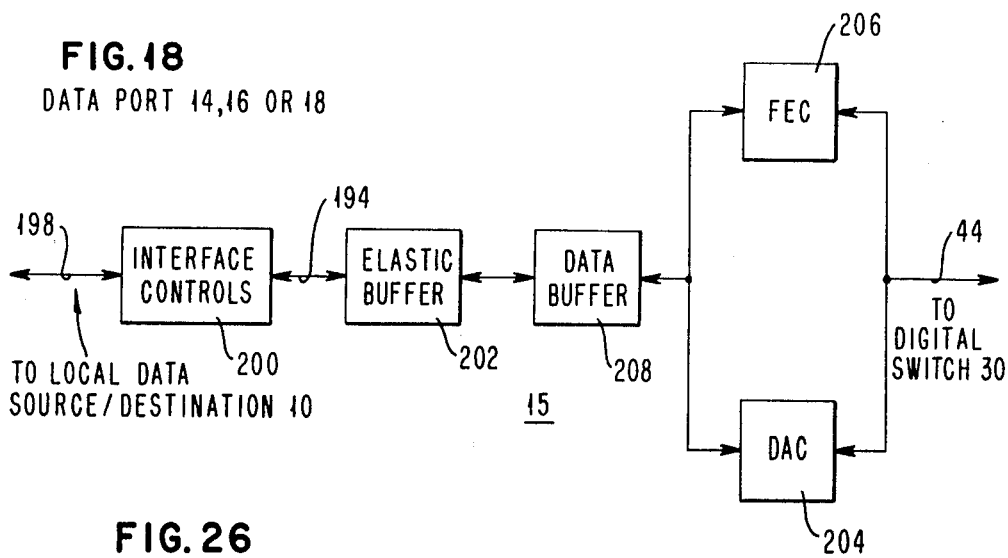
FIG. 18 shows an overall block diagram of the digital data port.

A functional block diagram of a DDPU 15 is shown in FIG. 18. Each DDPU 15 or port 14, 16 or 18 provides interface circuitry and controls 200 to accommodate the interface as specified in Table IV. The elastic buffer 202 manages data buffer read and write pointers in a manner to compensate for the differences between the external interface timing and the internal SCC timing. A minimum separation is maintained between these two pointers to compensate for the worst case asynchronous variation between the rates at which information enters and leaves the elastic buffer 202. A forward error correction code (FEC) mechanism 206 can apply FEC selectively to data ports under control of the SCP 32. For example, for low speed data ports 14 and medium speed data ports 16 having speeds of 224 Kbps or less, FEC can be applied centrally by the encoder 58 in the digital switch 30, thereby allowing the use of shared FEC circuitry. In that case, a quadratic residue code (17,19) shortened to QR (16,18) can be used, for example. For high speed data ports 18 having speeds above 224 Kbps, for example, a (32,28) convolution code can be used. For the high speed case, FEC can be applied on transmission and data corrected on reception in the DDPU 15. A data activity compression (DAC) mechanism 204 is provided for each port within a DDPU 15. DAC is analogous to VAC, as was described above, since information is not transmitted if each byte in a frame is identical to the last byte transmitted in a previous frame. When the destination SCC fails to receive a channel of information as expected, it repeats the last byte previously received for the duration of the channel. This frees the channel's time slot in the transmission burst for use by another port at the transmitting station. The receiving station's data port must be able to recognize that the DAC operation has taken place so that it can replicate the last byte of data received in the last transmitted channel for the intended destination data port. This problem is complicated by data ports having a data rate which is a non-integral multiple of the basic data rate for the transmission of one channel of information per TDMA frame. For example, in a TDMA system where the transmission of one channel (60 bytes) of information per TDMA frame (every 15 milliseconds) is equivalent to a 32 Kbps data rate, if a local data port services a data source having a 48 Kbps data rate, the data source is operating at 1.5 times te basic data rate for the transmitting station. To accommodate the 48 Kbps data port, the transmitting station transmits two channels every even numbered frame and one channel every odd numbered frame. This technique is implemented by the use of a pattern generator in the transmitting station which controls the transmission of two channels of information on even frames and one channel of information on odd frames, giving a net data transmission rate of 48 Kbps, as desired.

However the use of a repetitive pattern of channels in succeeding frames creates another problem for the receiving station as to how to distinguish between those TDMA frames wherein fewer than the maximum number of expected channels is to be received, from a situation where no information has been sent by the transmitting station because of the DAC operation. This problem is addressed and solved by employing a synchronizing signal in the form of a special reference burst sent by the reference station in the TDMA network once every 40 TDMA frames, to all participating stations in the network. This special reference burst synchronizes a local data port clock in every earth station participating in the network. Each data port has a pattern generator which is connected to the synchronizing mechanism, for establishing a pattern for a particular data rate type of data port, which pattern is uniformly synchronous throughout the satellite communication system. Corresponding pattern generators for that particular pattern type are in synchronous operation for every data port in the system.

A receive burst buffer in every receiving station accepts the incoming channels of information and, through a digital switching mechanism, directs them to the intended data port. Each data port has a receive RAM which is one byte wide and 256 bytes long, thereby capable of storing four channels' worth of information. When the receive burst buffer (RBB) receives a full channel of information (60 bytes), the RBB sends consecutive bytes of information from that channel to the data port, for storage at a location in the receive RAM indicated by a write pointer. The receive RAM is operated as a wrap-around memory. A read pointer points to the location in the receive memory where one byte of data is ready to be transmitted from the data port to the local data user. The write pointer is indexed in synchronism with the system synchronized pattern generator. The read pointer is indexed in synchronism with an external clock provided by the local data user. It can be seen that the distance between the write pointer and the read pointer varies with the relative rates of reception from the satellite and retransmission to the local data user, so that the receive RAM can be viewed as an elastic buffer in the data port. The location in the receive memory accessed by the read pointer is output to an eight-bit wide shift register to enable serialization of the byte of information for retransmission to the local data user.

Each byte of data received from the RBB by the data port is stored in the receive memory at the position indicated by the write pointer, along with a DAC bit position. The DAC bit will be "off" because data has actually been received by the receiving station as receive burst buffer. As the read pointer accesses each byte of information in the receive memory, it transfers that byte of information to the output shift register only if the DAC bit is in its "off" state. Whenever a byte of information stored in the receive memory is transferred by the read pointer to the output shift register, that byte is rewritten into the receive memory at the same location with the DAC bit turned to the "on" state. Later, if the read pointer ever accesses a byte in the receive memory having the DAC field in its "on" state, then no alteration is made to the contents of the one byte wide output shift register, so that the contents remain the same as the last byte received from the last frame.

During the course of transmitting 48 Kbps data stored from the transmitting station to the receiving station, a consecutive pair of channels of data (60 bytes each) can have each of the bytes in the second occurring channel identical to the last byte in the first occurring channel. This is the circumstance which is compared for in the data port at the transmitting station and which satisfies the DAC requirement. Assume that the circumstance occurs in a TDMA frame where ordinarily two channels of information for the 48 Kbps data port would have been sent. The data port transmits the first channel of information but omits transmitting the second channel of information. The transmitting station allocates a time slot of only one channel during this TDMA frame, instead of the expected two channel time slot. A single channel of information is transmitted via the satellite transponder and is received at the receiving station and stored in the receive burst buffer. The synchronized pattern generator in the receive station has been synchronized so as to operate in step with the pattern generator at the data port in the transmitting station. Thus as the bytes from the first channel received in the receive burst buffer are consecutively passed to the data port in the receive station, they are stored at consecutive locations in the receive memory pointed to by the write pointer, as usual. However as the last of the bytes in the first channel are passed to the data port, the synchronous pattern generator detects that there is no second channel stored in the receive burst buffer, as expected. The write pointer for the receive memory is continuously indexed as during normal operation, but no information is written into the byte field pointed to in the receive memory. However, the DAC bit field is written with the "on" state for each of the 60 null bytes written in the receive memory, corresponding to the second channel whose transmission was omitted by the DAC operation.

As the wrap-around receive memory is indexed by the rhythm established by the synchronized pattern generator, the read pointer points to the first null byte position and detects that the DAC bit is in its "on" state. Thus for this null byte and all of the other 59 succeeding null bytes stored in the receive RAM, the eight-bit wide output shift register does not have its contents changed. Thus a block of 60 bytes of data, with each byte identical to the last received byte in the preceding frame, is output to the local data user at the external clock rate.

By synchronizing the transmission and reception pattern generators for all data ports operating at the same data rate throughout the entire TDMA system, a necessity for bit stuffing to accommodate non-integral multiple data rate data ports is eliminated and yet data activity compression operations can be carried out.

Overview of the Signal Path From a Transmitting Data Port to a Receiving Data Port Via the Satellite Transponder FIG. 19 is a functional block diagram showing the signal path from a transmitting data port X at station 1 to a receiving data port Y at station 2 via the satellite transponder 5. Data is input to the transmit RAM 214 from the input 194 shown in FIG. 18, through the input registers 195 and 196 shown in FIG. 25. The transmit RAM 214 carries out the elastic buffering and data buffering functions for the input data, as will be described later. Data is read out of the transmit RAM 214 into the transmit register 216 under the control of the transmit pattern generator 224, shown in greater detail in FIG. 20. Each byte of data from the transmit RAM 214 is sequentially passed from the transmit register 216 to the port register 220 and the data in registers 216 and 220 are compared in a comparator 218 to establish whether the DAC bit on output 85 is to be a zero if they are not equal or is to be a one if they are equal. A DAC bit for each byte of data read from the transmit RAM 214 is output over line 85 to the enqueue control ROS 88, as previously described. The corresponding byte of data in register 216 is output over line 44a to the transmit burst buffer 54. The SCM slot in the SCM 50 which has selected over line 78, the transmit pattern generator 224 of the data port X, also contains the TBB address on line 82 for the particular byte of data output on line 44a is to be loaded in the TBB 54, as previously described. The port activity memory 96 has as many one-bit storage positions as there are separate SCM slots in the SCM 50 and those one-bit positions in the port activity memory 96 are accessed in the same sequential manner and simultaneously with the accessing of the slots in the SCM 50 by the slot count 75. The enqueue control ROS 88 has an output 131 to the port activity memory 96 which resets all of the bits in the port activity memory 96 at the beginning of each frame to a DAC value of one. During each of the 60 SCM scans through the SCM 50, the enqueue control ROS 88 simultaneously accesses the corresponding bit location in the port activity memory 96 for each SCM slot and sets any one-bit location in the port activity memory 96 to a DAC value of zero indicating activity, when the corresponding DAC bit on the line 85 from the comparator 218 in the data port 15 being selected over line 78 by the SCM 50, indicates a zero value. That zero value stored in the correspondingly accessed location of the port activity memory 96 is never again reset to the no-activity value of one during the rest of the frame. In this manner, at the beginning of a particular frame, if the last byte of data from the preceding frame, which is stored in the register 220, is equal to the first byte of data for the data port 15 in the present frame, stored in register 216, and is equal to all of the other 60×N (where N is an integer) stored in the transmit RAM 214 for the present frame, then the comparator 218 will issue DAC bits having a value of one on line 85 for all of the bytes transferred on line 44a to the TBB 54. This will cause the enqueue control ROS 88, which had reset the corresponding one-bit slot of the port activity memory 96 to a no-activity value of one at the beginning of the present frame, to never set that corresponding one-bit value to zero during the entire present frame.

As was previously described, the burst priority mechanism 74 compiles threaded lists of each category of data ports during each TDMA frame in preparation for bursting during the next frame. As was previously described, during a particular byte scan through the SCM 50, for example the 60th scan where the 56 Kbps data ports are enqueued, as the slot count 75 increases accessing consecutive SCM slots in the SCM 50, a particular SCM slot for a 56 Kbps data port will be encountered in the SCM 50 and the corresponding one-bit activity indication in the port activity memory 96 will be output to the enqueue control ROS 88. If that activity indication in the port activity memory 96 shows that the particular data port has been DACed, that is that all the bytes of data in the present frame are identical to the last byte in the preceding frame for this data port, then the enqueue control ROS 88 will not transmit an enabling signal over line 94 to the burst priority mechanism 74 and thus the TBB address on line 82 from the SCM slot accessed in the SCM 50 will not be enqueued for transmission during the next frame.

On the other hand, if any byte accessed from the transmit RAM 214 and loaded into the register 216 is not identical to the next preceding byte of data in the register 220, the comparator 218 will output a DAC bit value of zero on line 85 to the enqueue control ROS 88. The enqueue control ROS 88 will then issue a signal over line 131 to the correspondingly accessed one-bit location in the port activity memory 96, setting that location to a zero value indicating that the corresponding SCM slot in the SCM 50 associated with the data port being selected on line 78, does have port activity and thus that the TBB partition associated with the TBB address on line 82 from that SCM slot will be enqueued in the burst priority mechanism 74 for bursting during the next TDMA frame.

This DAC operation can be more fully appreciated with reference to Table V which shows the operation of the data port and digital switch for a 32 Kbps data rate. The 32 Kbps data rate of the data port 15 is identical to the basic data rate of one 60 byte channel of eight-bit bytes each TDMA frame of 15 milliseconds duration.

This is the minimum continuous data transmission speed for the digital switch 30 connected to the data port 15 and serves as the simplest illustration of the DAC operation. Table V shows transmit frame 1 through 4 during each of which 60 bytes of data are accumulated in the transmit RAM 214 of the transmitting data port 15. The pattern generator 224 enables over line 227 a transfer of one byte of data for each of the 60 SCM scans in a frame, to register 216. Each of these 60 bytes of data is sequentially transmitted during each of the corresponding, succeeding SCM scans, over line 44a to the TBB 54.

The A side of the TBB 54 shown in FIG. 19 has its partitions shown as horizontal rows of 60 bytes each, the rows being organized so that corresponding byte locations in succeeding rows are vertically juxtaposed as in a matrix. To facilitate describing the storage pattern for the TBB 54, the byte locations in the TBB will be referred to in conventional matrix notation as is shown in FIG. 19. The byte locations for the first horizontal row will be referred to as matrix elements $a_{1,1}$; $a_{1,2} \ldots a_{1,60}$. The second horizontal row in the TBB 54 will have its byte locations respectively juxtaposed beneath the corresponding byte locations in the first row and will be referred to as $a_{2,1}$; $a_{2,2}$; $\ldots a_{2,60}$. In the preferred embodiment, the TBB 54 has 384 partitions of 60 bytes each and therefore the last row in the A side of the TBB 54 would have 60 byte locations, each juxtaposed with the corresponding 60 byte locations in the preceding partitions and referred to as $a_{384,1}$; $a_{384,2}$; $\ldots a_{384,60}$.

During each scan of the SCM 50 by the slot count 75, when the SCM slot corresponding to the data port X is encountered, the TBB partition address output over line 82 from the SCM 50 accesses the horizontal row partition in the TBB 54 corresponding to the data port X identified on the port select line 78. The particular byte location within the horizontal partition row accessed over line 82, is designated by the byte scan count 77 which is input to the TBB 54 and indexes the byte locations 1 through 60 corresponding to the byte scan count 77. Thus it is seen that for a 32 Kbps data port as is used in this example, the 60 bytes of data transmitted from the data port over line 44a to the TBB 54 will be loaded in a single row partition from location $a_{1,1}$ through $a_{1,60}$, for example.

During each SCM scan of the SCM 50, as the SCM slot corresponding to the data port X is encountered in the SCM 50, the data port is selected over line 78 from the SCM 50 with a signal which is input to the transmit pattern generator 224. The enabling signal from the pattern generator 224 over line 227 to the register 216 accesses one of the 60 bytes of data stored in transmit RAM 214 and causes the comparator 218 to compare that accessed byte of data in register 216 with the next preceding byte of data in register 220 accessed from the transmit RAM 214. The comparator 218 then outputs the appropriate DAC bit on line 85 to the enqueue control ROS 88, as was previously described. During the 60th scan of the SCM 50, all 32 Kbps data ports will have their TBB partition addresses output on line 82 from the SCM's 50, enqueued by the burst priority mechanism 74 if the cumulative DAC bit in the port activity memory 96 indicates there is activity for that port.

In the following TDMA frame, the burst priority mechanism 74 accesses selected ones of the horizontal row of partitions in the TBB 54 based upon the prioritized threaded lists of TBB partition addresses compiled in the preceding frame, as has been previously described. When the burst priority mechanism 74 accesses the TBB 54 for bursting, the entire row partition $a_{i,1}$ through $a_{i,60}$ is burst out over the output line 45 to the transmit time division switch where a 32 bit destination address is appended to the 60 byte channel's worth of data and is transmitted via the burst modem 24 to the satellite transponder 5, as has been previously described. This transmit operation is summarized in Table V for a 32 Kbps data port where, in transmit frame number 1, there is at least one DAC bit indicating non-replication and therefore the cumulative DAC bit in the port activity memory indicates activity and therefore the corresponding TBB partition is enqueued and transmitted.

TABLE V

| 32 Kbps | | | | |
|---|---|---|---|---|
| Transmit Frame | 1 | 2 | 3 | 4 |
| Bytes Accumulated at Port | 60 | 60 | 60 | 60 |
| Transmit Pattern Generator | 1 | 1 | 1 | 1 |
| Channels Output from Port to Digital Switch | $A_1...A_{60}$ | $A_{60}...A_{60}$ | $A_{60}A_{60}B_3,...B_{58}$ | $C_1C_2C_2C_3...C_{59}$ |
| DAC Bits (1 = no activity) | 0......0 | 1.......1 | 1 1 0...0 | 0 0 1 0...0 |
| PAM Bit (1 = no activity) | 0 | 1 | 1→0 | 0 |
| TBB-A | $A_1...A_{60}$ | | $A_{60}A_{60}B_3...B_{58}$ | |
| TBB-B | | $A_{60}....A_{60}$ | | $C_1C_2C_2C_3...C_{59}$ |
| Enqueue | Yes | No | Yes | Yes |
| Transmit | TBB-A | No | TBB-A | TBB-B |
| Receive Frame | 1 | 2 | 3 | 4 |
| Receiver RBB-A | $A_1...A_{60}$ | | $A_{60}A_{60}B_3...B_{58}$ | |
| Receive RBB-B | | Empty | | $C_1C_2C_2C_3...C_{59}$ |
| RBB Loaded Bit | 0 | 1 | 0 | 0 |
| Receive Pattern Generator | 1 | 1 | 1 | 1 |
| Receive Data Port | $A_1...A_{60}$ | $A_{60}...A_{60}$ | $A_{60}A_{60}B_3...B_{58}$ | $C_1C_2C_2C_3...C_{59}$ |

The second transmit frame in Table V illustrates the operation when a 60 byte channel output from the data port X to the digital switch 30 has each byte equal to the last byte in the preceding frame 1. In this circumstance, all of the DAC bits produced by the comparator 218 are equal to one, causing the enqueue control ROS 88 to maintain a cumulative value of one in the corresponding one-bit position of the port activity memory 96, indicating complete replication by all of the 60 bytes in the present frame, of the last transmitted byte in the preceding frame. Thus, during frame 2, when the burst priority mechanism 74 compiles the list of 32 Kbps data ports to be transmitted during the next frame, the indication of no activity stored in the port activity memory 96 for the data port X will cause the enqueue control ROS 88 to omit transmitting an enabling signal over line 94 to the burst priority mechanism 74, so that the corresponding TBB partition address on line 82 for the data port X will not be included in the list of 32 Kbps data ports to be transmitted during the next frame. This is illustrated by frame number 2 in Table V.

The transmit frames 3 and 4 in Table V illustrate the circumstance that there is some replication of the bytes in the frame to the last byte in the preceding frame but that whenever a non-replicating byte is encountered in the frame, the cumulative activity value stored in the port activity memory 96 corresponding to the data port will show activity, thereby causing the 60 byte channel produced during that frame to be enqueued in the burst priority mechanism 74 for transmission in the next frame.

Transmission operations for the data port 15 and digital switch 30 are synchronized to the instant the frame reference burst from the reference station 3 is transponded from the satellite 5. The local transmit frame synchronization pulse on line 91 is locally timed at the local SCC station 1 to occur at the instant in time so that a pulse transmitted from station 1 would arrive at the satellite transponder 5 simultaneously with the frame reference burst from the reference station 3. The actual instant of transmission of bursts from the local station 1 are delayed with respect to the instant of the transmit frame synchronization pulse at the local station 1 by a duration specified by the position in the TDMA frame assigned to the local station for its burst, as has been previously discussed with reference to FIG. 2. The receive frame begins at an instant called the receive frame synchronization time which is signaled on line 93 at each local station. The receive frame synchronization pulse occurs at an instant which is delayed with respect to the transmit frame synchronization pulse at a local station by a duration equal to the round trip path delay between the transmission and reception of a given signal by the local station. Since all of the SCCs in the TDMA network have their receive frame synchronization pulses synchronized with respect to the instant of reception of the frame reference burst transmitted from the reference station 3 through the satellite transponder 5, if SCCs 1, 2 and 3 were to transmit an integral number of channels to a fourth SCC during the transmit frame 0, that same number of channels will be received by the fourth SCC on the receive frame 0. This operation is called out by the timing and acquisition mechanism 34 connected in the SCC 22 as is shown in FIG. 3.

The TDMA burst transmitted from station 1 and transponded through the satellite 5 is received at station 2 where the destination address is decoded in the receive address interpretation mechanism 60 to determine whether the associated 60 byte channel of traffic information is intended for station 2. If the channel of traffic information is intended for the local station, it is passed through the elastic buffer 62 to the receive burst buffer (RBB) 64 and loaded into either the A side or the B side of the RBB 64 depending upon whether the frame during which the burst was received was odd or even.

The RBB 64 shown in FIG. 19 is organized in the same manner as the organization of the TBB 54, as previously described. Each horizontal row partition in the RBB 64 is loaded with a channel partition's worth of the 60 bytes of data transmitted from a 60 byte channel partition in the TBB 54 at station 1. Prior to the commencement of data transmission from station 1 to station 2, the satellite communications processor 32 at station 1 initiated the call to station 2 by communicating with the satellite communications processor 32 at station 2, transmitting the intended destination data port Y at station 2. The satellite communications processor 32 at station 2 responded by selecting a particular channel partition in the RBB 64 in station 2 which would be associated with the destination data port Y at station 2 for the duration of the cell. The identity of the selected partition in the RBB 64 was transmitted by the satellite communications processor 32 at station 2 to the satellite communications processor 32 at station 1. The SCP 32 at station 1 then defines the destination address which was to be stored in the transmit space signaling buffer 126 at station 1 as the identity of the receiving station 2 and the identity of the partition in the RBB 64 in station 2 corresponding to the data port Y at station 2. Thus, as has been previously described, when the burst priority mechanism 74 at station 1 accesses the TBB 54 during TDMA bursting in a frame, the partition address is also transferred over line 123 to the transmit space signaling buffer so that the correct destination address can be appended to the corresponding partition in the TBB 54 which is being transmitted from station 1 to station 2.

Thus, during every TDMA frame, the 32 Kbps data port X at the transmitting station 1 has a channel partition's worth of information stored in a horizontal row partition of the TBB 54 which can be appended to the destination address for the station 2 and transmitted in the station 1's TDMA burst for that frame. During the corresponding receive frame at station 2, all of the channels of information whose destination addresses indicate that station 2 is the intended recipient, are loaded in the horizontal row channel partitions in the RBB 64 which are designated by the corresponding destination addresses. When the call was initially being set up by the satellite communications processor 32 in station 2, an SCM slot was selected in the SCM 50, into which was written the RBB partition address for the horizontal row partition which was to receive the channels of information during this call, and the identity of the data port Y. During the receive frame following that during which the channel partitions are loaded in the A side of the RBB 64, the A side of the RBB 64 is accessed by the SCM 50 in the same manner as the TBB 54 for that station. The local slot count 75' at station 2 is derived from the local transmit frame synchronization pulse at station 2 in the same manner as is the slot count 75 derived from the transmit frame synchronization pulse in station 1. Similarly, the byte scan count 77' in station 2 corresponds to the local timing in station 2 in the same manner as does the byte scan count 77 in station 1, as previously discussed. During each byte scan count 77', the SCM 50 in station 2 sequentially accesses the SCM slots and each time it encounters the SCM slot corresponding to the data port Y, the corresponding RBB partition address is output on line 82 to the A side of the RBB 64, reading out the next byte of data in the accessed channel partition, corresponding to the value of the byte scan count 77', sequentially indexing from location $a_{j,1}$ through $a_{j,60}$. In this manner, the 60 bytes of data are transferred over line 44b to the data port Y during the receive frame following the frame in which the data was loaded into the RBB 64 from the received TDMA burst.

Whenever data is loaded into a particular horizontal row partition in the RBB 64, a bit is turned on in the RBB load memory 266 indicating that information has in fact been received in the corresponding RBB partition. As each byte of data in a horizontal row partition in the RBB 64 is read out on line 44b to the data port, a corresponding bit from the RBB load memory 226 is transferred over line 208 to the data port and is located as the DAC indication in the register 230 in association with the byte of data also loaded in the register 230. If data is present in the RBB partition accessed by the SCM slot, then the RBB load bit on line 208 will be a zero indicating that data has in fact been received. If there is no data in the RBB partition accessed by the SCM slot corresponding to the data port Y, then when that slot is accessed in the SCM 50 during each scan of the slot count 75', the RBB load memory 226 will output a binary 1 on line 208 indicating this condition. This DAC bit is then sequentially loaded in the receive RAM 232 and will serve to indicate to the DAC logic 234 that the last received byte of data during the last receive frame for the accessed RBB partition, must be replicated and output on the output line 241 for the data port Y. This operation is shown in Table V. It is seen that during receive frame 1, the channel's worth of information transmitted from station 1 during transmit frame 1 is received in the A side of the RBB 64 at station 2 and the RBB loaded bit corresponding to that partition is indicated as a zero indicating the partition is loaded. All 60 bytes of data are then sequentially loaded into the receive RAM 232 and output over the output line 241.

During receive frame 2 of Table V, the DACed channel of information which was not transmitted from station 1 results in there being an empty partition in the RBB 64 during receive frame 2 at station 2. The RBB load memory 226 then has a binary 1 output on line 208 which causes the DAC bit to be turned on for 60 byte positions in the receive RAM 232. This causes the DAC logic 234 to replicate the last byte in the last partition location $a_{j,60}$ for 60 times and output the 60 replicated bytes on the output line 241. In this manner, the desired replicated channel's worth of data is produced at the receiving data port Y without having consumed the bandwidth required for its transmission through the satellite transponder 5.

Receive frames 3 and 4 in Table V are handled in a manner similar to that for receive frame 1. The functional block diagram for the receive part of the data port is shown in FIG. 27. The operation of the receive portion of the data port is under the control of the receive pattern generator 244 which is shown in greater detail in FIG. 21.

Overview of Pattern Generator Operation

For data rates which are not multiples of the basic 32 Kbps data rate of the digital switch, the transmit pattern generator 224, shown in greater detail in FIG. 20, and the receive pattern generator 244, shown in greater detail in FIG. 21, are synchronized with one another through the transmit frame sync pulse and the receive frame sync pulse, so that channels of data can be periodically omitted from transmission in order to equalize the effective transmission rate of the SCC to that of the data source.

This operation can be illustrated with reference to Table VI which shows the operation of the pattern generators, in conjunction with the DACing logic, to create data patterns which are 2.4 Kbps, 4.8 Kbps, 9.6 Kbps, 19.2 Kbps, 56 Kbps, 112 Kbps, and 224 Kbps.

It should be noted that the 2.4 Kbps pattern repeats every 40 frames whereas the 224 Kbps pattern is a constant seven channels per frame.

TABLE VI

TRANSMISSION PATTERN CYCLE
IN FRAMES/CHANNEL ≦ 19.2 Kbps
IN CHANNELS/FRAME ≦ 56 Kbps

| DATA RATE | | POINTER OFFSET (BYTES) |
|---|---|---|
| 2400 bps | 14-13-13 | 57 |
| 4800 bps | 7-7-6 | 54 |
| 9600 bps | 4-3-3 | 48 |
| 19200 bps | 2-2-1 | 36 |
| 56.0 Kbps | 1-2-2-2 | 15 |
| 112.0 Kbps | 3-4 | 30 |
| 224.0 Kbps | 7 | 0 |
| 1.344 mbps* | 48 | 48 |
| 1.344 mbps** | 42 | 0 |
| 1.544 mbps* | 55-55-55-55-55-56 | 52 |
| 1.544 mbps** | 48-48-48-49 | 45 |

LOW SPEED

OFFSET = 60[(Data Rates bytes) NF]F

Frame

NF = Maximum number of frames before buffer full
F = Number of times NF occurs per pattern cycle
RF = Number of bytes read by Digital SW at Buffer full time.
      this number equals 60 bytes for rates ≦ 19.2Kbps

HIGH SPEED

OFFSET = 60[(Data Rate (bytes) - MF (bytes)) X1 Frame] f
                     Frame      Frame MF = Minimum digital switch read rate
f = Number of contiguous times MF occurs per pattern cycle.

*Transmission pattern for these rates is adjusted for ¼ rate FEC code
**No ¼ FEC code applied As was mentioned above, the digital switch 30 reads data from the data port 15 in N×60 byte blocks per frame where N depends upon the data rate. Each select to the data port from the digital switch reads one byte of data from the data port to the TBB and loads one byte of data from the RBB or INB back to the data port. The description of the digital switch operation above includes a description of the operation of the data port selection mechanism. The digital switch presents a given data port with the same number of selects every 250 microsecond scan of the SCM 50. A data port is scanned 60 times per TDMA frame. As is shown in Table VI, which is a simplified version of Table III, a 56 Kbps port is selected two times per SCM scan since two SCM slots correspond to each 56 Kbps data port. However in one out of every four frames, the 56 Kbps data port is selected only once. The transmit pattern generator 224 of FIG. 20 applies the pattern shown in Table VI to control this periodic withholding of one of the two channels every fourth frame.

As is shown in FIG. 20, a byte counter 217 is driven by the SCC byte clock 215 associated with a given port rate. For example, for a 56 Kbps data port, the SCC byte clock produces $56 \times 10^3$ bits per second times 0.015 seconds per frame divided by eight bits per byte which equals 105 bytes per frame. In other words, 105 pulses per frame are provided on the SCC byte clock line 215 for a 56 Kbps data port. The output of the counter 217 drives a channel counter 219 which counts the number of 60 byte channels of data accumulated by the data port in one 15 millisecond frame. Actual discrepancies between the SCC byte clock and the external clock associated with the external data source are corrected in an elastic buffering operation which will be described later in conjunction with FIG. 26. Every 15 milliseconds the transmit frame sync pulse on line 91 turns on the gate 221 connecting the output of the counter 219 to the transmit status register 229 so that the contents of the channel counter 219 are loaded into the status register 229. Simultaneously, the transmit frame sync pulse on line 91 controls the gate 231 to transfer the contents of the counter 219 to the transmit selects counter 233. Every time the data port is selected by means of an input signal on line 78 from the SCM 50, the selects counter 233 is decremented by one until it is zero at which time no more selects on line 78 are accepted for that scan. Every 250 microseconds, the gate 239 receives a control pulse for the byte scan counter on line 77, enabling the transfer of the contents of the transmit status register 229 to the transmit selects counter 233. Thus every 250 microseconds, the selects counter 233 is preset with the value in the status register 229. The value in the status register will vary every frame according to the pattern shown in Table VI.

At data rates equal to or lower than 19.2 Kbps, the trasmit pattern generator 224 is synchronized every 40 frames with the transmit frame synchronization pulse on line 91. Forty frames is chosen because at 2.4 Kbps, the pattern repeats every 40 frames and the 60 byte counter 217 will have a value of zero. The counter is reset to zero every 40 frames with the transmit frame sync pulse on line 91.

When the transmit selects counter 233 has been decremented by the select signal 78 down to zero, the zero detector 237 outputs a pulse on line 222 which forces a DAC bit value of one out of the comparator 218 on the DAC bit line 85 to the enqueue control ROS 88. For example, reference can be made to Table VII for a 56 Kbps data port to illustrate the operation of the transmit pattern generator 224. During frame 1, if 120 bytes of data had been accumulated in the data port, this corresponds to two 60 byte channels and therefore the counter 217 will have transferred the value of two to the transmit channel counter 219 at the beginning of frame 1. The transmit frame sync pulse on line 91 will have caused the gate 221 and the gate 231 to transfer the value of two to the transmit status register 229 and the transmit selects counter 233. Since the 56 Kbps data port will have two SCM slots in the SCM 50, during each 250 microsecond scan of the SCM 50, two select signals will be input from the SCM 50 on line 78 to the transmit selects counter 233. Since the contents of the transmit selects counter 233 is not zero, the output of the zero detector 237 on line 222 will be a binary zero so that the inverter 223 will apply a binary one signal to one of the two inputs of the AND gate 225. The other input of the AND gate 225 is connected to the select line 78 so that when each of the two select pulses during each 250 microsecond scan of the first frame is input on line 78, the AND gate 225 will output each of two enabling signals on line 227 to the register 216, thereby transferring two bytes of data from the transmit RAM 214 to the output line 44a to the TBB 54. Thus it is seen that during the first frame in Table VII, two complete channels of 120 bytes of data are transferred from the transmit RAM 214 over the line 44a to the TBB 54.

TABLE VII

| 56 Kbps | | | | |
|---|---|---|---|---|
| Transmit Frame | 1 | | 2 | |
| Bytes Accumulated at Port | 120 | | 105 | |
| Selects from Digital Switch | 60 | 60 | 60 | 60 |
| Transmit Pattern Generator | 1 | 1 | 1 | 0 |
| Channels Output from Port to Digital Switch | $A_1A_2...A_{60}$ | $B_1B_2...B_{60}$ | $B_{60}B_{60}...B_{60}$ | |
| DAC Bits PAM Bit → | 0 0 ... 0 | 0 0 ... 0 PAM Bit | 1 1 ... 1 | 1 1 ... 1 PAM Bit |
| TBB-A1 | $A_1A_3...A_{59}B_1B_3...B_{59}$ | 0 | | |
| TBB-A2 | $A_2A_4...A_{60}B_2B_4...B_{60}$ | 0 | | |
| TBB-B1 | | | $B_{60}B_{60}B_{60}...B_{60}$ | 1 |
| TBB-B2 | | | | 1 |
| Enqueue Transmit | Yes-Both TBB-A | | No No | |

| 56 Kbps | | | | |
|---|---|---|---|---|
| Transmit Frame | 3 | | 4 | |
| Bytes Accumulated at Port | 150 | | 135 | |
| Selects from Digital Switch | 60 | 60 | 60 | 60 |
| Transmit Pattern Generator | 1 | 1 | 1 | 1 |
| Channels Output from Port to Digital Switch | $B_{60}B_{60}...B_{60}$ | $C_1C_2...C_{60}$ | $C_{60}C_{60}...C_{60}$ | $C_{60}C_{60}...C_{60}$ |

TABLE VII-continued

| | | | | |
|---|---|---|---|---|
| DAC Bits | 1 1 ... 1 | 0 0 ... 0 | 1 1 ... 1 | 1 1 ... 1 |
| PAM Bit → | | PAM Bit | | PAM Bit |
| TBB-A1 | $B_{60}B_{60}...B_{60}C_1C_3...C_{59}$ | 0 | | |
| TBB-A2 | $B_{60}B_{60}...B_{60}C_2C_4...C_{60}$ | 0 | | |
| TBB-B1 | | | $C_{60}C_{60}...C_{60}C_{60}C_{60}...C_{60}$ | 1 |
| TBB-B2 | | | $C_{60}C_{60}...C_{60}C_{60}C_{60}...C_{60}$ | 1 |
| Enqueue | | Yes-Both | | No |
| Transmit | | TBB-A | | No |

56 Kbps

| | | | | |
|---|---|---|---|---|
| Receive Frame | | 1 | | 2 |
| RBB Load Bit → | | RBB Load Bit | | RBB Load Bit |
| Partition 1 Rec. RBB-A | $A_1A_3...A_{59}B_1B_3...B_{59}$ | 0 | | |
| Partition 2 | $A_2A_4...A_{60}B_2B_4...B_{60}$ | 0 | | |
| Partition 1 Rec. RBB-B | | | | 1 |
| Partition 2 | | | | 1 |
| Selects From Digital Switch | 60 | 60 | 60 | 60 |
| Receive Pattern Generator | 1 | 1 | 1 | 0 |
| Receive Data Port | $A_1A_2...A_{60}$ | $B_1B_2...B_{60}$ | $B_{60}B_{60}...B_{60}$ | |

56 Kbps

| | | | | |
|---|---|---|---|---|
| Receive Frame | | 3 | | 4 |
| RBB Load Bit → | | RBB Load Bit | | RBB Load Bit |
| Partition 1 Rec. RBB-A | $B_{60}B_{60}...B_{60}C_1C_3...C_{59}$ | 0 | | |
| Partition 2 | $B_{60}B_{60}...B_{60}C_2C_4...C_{60}$ | 0 | | |
| Partition 1 Rec. RBB-B | | | | 1 |
| Partition 2 | | | | |
| Selects From Digital Switch | 60 | 60 | 60 | 60 |
| Receive Pattern Generator | 1 | 1 | 1 | 1 |
| Receive Data Port | $B_{60}B_{60}...B_{60}$ | $C_1C_2...C_{60}$ | $C_{60}C_{60}...C_{60}$ | $C_{60}C_{60}...C_{60}$ |

The pattern of loading the TBB 54 will now be described. This will be done in conjunction with Table VII. As was mentioned before, each 56 Kbps data port has two separate SCM slots associated with it in the SCM 50. The first SCM slot contains a first TBB partition address, for example $a_{1,1}$ through $a_{1,60}$ and the second SCM slot specifying a second (not necessarily contiguous) TBB partition, for example, $a_{2,1}$ through $a_{2,60}$. Beginning with the first SCM scan, the first select from the first SCM slot will cause the first byte accessed from the transmit RAM 214 in the register 216 to be transferred to the position $a_{1,1}$ in the TBB 54. As the scan continues, the second SCM slot is encountered causing the second byte accessed from the transmit RAM 214 to be loaded in the second partition location $a_{2,1}$ in the TBB 54. During the second scan of the SCM 50, the first SCM slot corresponding to this 56 Kbps data port will cause the third byte accessed from the transmit RAM 214 to be loaded into the first TBB partition's location $a_{1,2}$. As the second scan continues, the second SCM slot will be encountered which causes the fourth byte accessed from the transmit RAM 214 to be loaded in the second TBB partition's location $a_{2,2}$. As the scan is continued, the 30th SCM scan is achieved. When the first SCM slot for this 56 Kbps data port is encountered in the 30th SCM scan, the 59th byte accessed from the transmit RAM 214 is loaded in the first TBB partition's location $a_{1,30}$. As the 30th SCM scan continues and the second SCM slot is encountered for this 56 Kbps data port, the 60th byte is accessed from the transmit RAM 214 and is loaded in the second TBB partition's location $a_{2,30}$. Thus it is seen that the first 60 byte channel of data accessed from the transmit RAM 214 occupies the first half of two TBB partitions. As the SCM scans continue and the 31st commences, the first SCM slot corresponding to this 56 Kbps data port is encountered which accesses the first byte of the second channel of information to be transmitted from the transmit RAM 214 to the TBB 54. This first byte is loaded into the first TBB partition's location $a_{1,31}$. As the 31st scan continues in the SCM 50, the second SCM slot for this 56 Kbps data port is encountered which loads the second byte of the second channel of information into the second TBB partition's location $a_{2,31}$. As the SCM scans continue and the 60th scan is achieved, the 59th byte for the second channel is loaded in the first partition's location $a_{1,60}$ and the 60th byte of the second channel is loaded in the second partition's location $a_{2,60}$. Thus it is seen that the second channel of information accessed from the transmit RAM 214 has half of it loaded in the second half of the first partition and the other half of it loaded in the second half of the second partition in the TBB 54.

During the next frame when the TBB-A side is burst to the satellite transponder 5, the first partition is burst and then the second partition is burst. The first partition and the second partition are loaded in the previously designated recipient partitions of the RBB 64 at the receive station 2 and are read from the RBB 64 at the receive station 2 in the reverse order of their having been written into the TBB 54 at station 1. Thus, the interleaved pattern is unscrambled as the data is loaded into the receive RAM 232 at the receiving station 2.

In the second frame as shown in Table VII, only 105 bytes of data will be stored in the transmit RAM 214 of the data port, and thus only one full channel of data is available for transfer to the TBB 54. The byte counter 217 therefore transfers a value of one to the transmit channel counter 219 at the beginning of the frame. The transmit frame sync pulse transfers the value of one through the gates 221 and 231 to the transmit status register 229 and the transmit selects counter 233. As before, during each 250 microsecond scan, the SCM 50 will transmit two select pulses on line 78 to the transmit selects counter 233. At the time of arrival of the first select pulse on line 78, the transmit selects counter 233 has the value of one stored in it and therefore the zero detector 237 has a binary output of zero, and thus the inverter 223 supplies a binary one enabling pulse to one of the inputs of the AND gate 225, the other input of which is enabled by the first select signal on line 78, thus outputting an enabling pulse on line 227 to the register 216, as previously described. This enables the transfer of one byte of data over line 44a to TBB 54 partition $a_{1,1}$. The first select signal on line 78 decrements the value stored in the transmit selects counter 233 to zero. Thus, when the second select signal is input on line 78, the value stored in the transmit selects counter 233 is detected as being zero by the zero detector 237 and the zero detector outputs a binary one value on line 222 which applies a binary zero value through the inverter 223 to the one input of the AND gate 225. Thus when the second select appears on the line 78, the AND gate 225 is not satisfied and no enabling pulse is transmitted over line 227 to the register 216. However the line 222 transfers an enabling pulse to the comparator 218 which forces a binary one value for the DAC bit on line 85 to the enqueue control ROS 88. During the second SCM scan, the gate 239 resets the value of one in the transmit selects counter 233 and when the first of the two SCM slots is encountered for the 56 Kbps data port, an enabling pulse is output on line 227 to the register 216 transferring a second byte from the transmit RAM 214 over line 44a to partition location $a_{1,2}$. As the SCM scan continues, and the second SCM slot is encountered for the 56 Kbps data port, no enabling pulse is output over the line 227 to the register 216, and in the same manner, another DAC bit having a binary value of one is output on line 85 to the enqueue control ROS 88. This process continues for all 60 scans through the SCM 50 and thus it is seen that the single-bit location in the port activity memory 96 corresponding to the first SCM slot and the first partition $a_{1,1}$ through $a_{1,60}$ of the TBB 54 will have a port activity indication whereas the second single-bit location in the port activity memory 96 corresponding to the second SCM slot of the 56 Kbps data port in which DAC bits having a value of one have been forced by the pattern generator 224 to be entered into the enqueue control ROS 88, the cumulative activity value in the port activity memory 96 for that second SCM slot location will be a no activity or binary one value. This corresponds to the second partition in the TBB 54 of $a_{2,1}$ through $a_{2,60}$. It is therefore seen that when the 60th SCM scan occurs during which the 56 Kbps data ports have their TBB partitions enqueued in the burst priority mechanism 74, that the active condition for the port activity memory 96 corresponding to the first partition $a_{1,1}$ through $a_{1,60}$ will cause that first partition to have its address enqueued in the burst priority mechanism 74. However the no activity condition of the second location in the port activity memory 96 corresponding to the second SCM slot for the second partition $a_{2,1}$ through $a_{2,60}$, will cause that second partition to be ignored during the burst list formation sequence in the burst priority mechanism 74. Thus it is seen that during the next frame when the burst from the station 1 is carried out, only the contents of the first partition $a_{1,1}$ through $a_{1,60}$ will be burst and the contents of the second partition (which is empty) of $a_{2,1}$ through $a_{2,60}$ will not be burst since its partition address is not present in the burst list. Thus it is seen how the operation of the pattern generator, in conjunction with the DAC bit generation, makes a non-integral multiple rate for a data port, such as the 56 Kbps data port, compatible with the basic 32 Kbps data rate of the digital switch 30. Table VIII shows how the operation of DACing occurs when the single channel to be transmitted during the second frame has all of its bytes replicating the last byte transmitted in the last frame number one. This operation is analogous to that described for the 32 Kbps data port DACing operation which was illustrated in Table V. Table VIII further illustrates the DACing operation for the 56 Kbps data port when in frame 4 all of the bytes in both channels which would have been transmitted, instead are identical to the last byte transmitted during the third frame. This operation is also analogous to that described for the 32 Kbps data port discussed in conjunction with Table V.

The receive pattern generator 244 is shown in more detail in FIG. 21. It generates in a pattern in a manner very similar to that generated by the transmit pattern generator 224 of FIG. 20, as was discussed above. The byte counter 217' operates in a manner similar to the byte counter 217 of the transmit pattern generator 224, having as an input the SCC byte clock 215 for the particular type of data port being employed. The other input to the byte counter is the receive frame sync pulse 93 which resets the byte counter 217' every 40 frames in a manner similar to the resetting of the byte counter 217, as discussed above. The channel counter 219' counts the number of 60 byte channels which should be received over the satellite transponder 5 during each 15 millisecond frame. Every 15 milliseconds, the receive frame synchronization signal on line 93 transfers the contents of the channel counter 219' through the gate 221' to the satellite status register 229' and through the gate 231' to the satellite selects counter 233'. Every time the data port is selected over line 78 from the SCM 50, value in the satellite selects counter 233' is decremented by one until it is zero, at which time no more selects are accepted for that scan. This is achieved by the AND gate 254 having a first input connected through the inverter 252 to the output 251 of the zero detect 237', and having a second input connected to the select line 78. As long as the satellite selects counter 233' has a non-zero value in it, every select signal on the line 78 will satisfy the AND gate 254, since the zero output of the zero detect 237', will be inverted to a binary one value which is input to the AND gate 254. The output of the AND gate on line 246 is connected to the write pointer 256 of the receive RAM 232, shown in FIG. 27. When the SCM slot corresponding to the port is scanned in the SCM 50, the contents of the RBB partition accessed over line 82 is transferred over line 44b and is loaded into the data portion of the register 230 and the corresponding contents of the RBB load memory 226 is loaded as the activity bit in the DAC portion of the register 230. When the contents of the satellite selects counter 233' is zero, the output on line 251 from the zero detector 237' is a binary one which, when inverted by the inverter 252, disables the AND gate 254. Thus, when a next select signal comes in over line 78, it will not be passed through the AND gate 254 and therefore, no enabling pulse is output over the line 246 to the receive RAM 232. Thus, in this position when the SCM slot for the data port is encountered in the SCM 50, the contents of the correspondingly accessed partition in the RBB, accessed over line 82, (which should be empty) will not be loaded into the receive RAM 232 since the write pointer 256 is not incremented. This is illustrated in Table VII, frame 2 where the second channel was intentionally omitted from transmission by the sending station 1 and, by virtue of the synchronized operation of the receive pattern generator 244 with respect to the operation of the transmit pattern generator 224, a receive pattern generator 244 inhibits the storage of any new information in the receive RAM 232. When the value stored in the satellite selects counter 233' is not zero, the AND gate 254 is satisfied every time a select pulse is input on the line 78 and this is a circumstance which obtains in frames 1 and 3 of Table VII. In frame 1, both channels were intentionally sent from the transmitting station 1 to the receiving station 2 and thus the DAC bit indication loaded from the RBB load memory 226 into the DAC portion of the receive RAM 232 indicates that an active byte has been loaded and need not be replicated by the DAC logic 234 when read out on line 241. In frame 3, although the receive pattern generator 244 indicates that data should have been received from the satellite transponder and loaded into the RBB 64, the RBB load memory 226 indicates that no information was in fact so loaded, as is signified by the DAC bit loaded over line 208 into the receive RAM 232, under the control of the receive pattern generator 244, by virtue of its enabling pulse over line 246 to the write pointer 256. The presence of the DAC bit on line 236 output from the receive RAM 232 to the DAC logic 234 will cause a replication of the last received byte in the last frame on the output line 241. This corresponds to the circumstance which obtains in frame 3 of Table VII for the 56 Kbps data port. In this frame, although two channels were supposed to have been received in the RBB 64, as is indicated by the receive pattern generator 244 with its enabling output on line 246 to the write pointer 256 of the receive RAM 232, instead two consecutive DAC values of one indicating no reception are loaded from the RBB load memory 226 into the receive RAM 232. As is shown in FIG. 27, when the receive RAM 232 is read out to the DAC register 240, the DAC bit is monitored. If the DAC bit is off indicating no replication is necessary, the DAC register 240 is loaded with the information. If instead, the DAC bit is on or a binary one, the DAC register 240 is not updated and the information that had been previously loaded in the DAC register 240 is repeated to the output register 242. This corresponds to frame 4 in Table VII. Every reaccess of the receive RAM 232 is followed by a write cycle into the same location forcing the DAC bit on. The state of the DAC bit will be turned off into a binary zero position by new data being written from the receive bus register 230 into the receive RAM 232 from the digital switch 30. If the byte accessed has the DAC bit off, it is transferred to the recipient data output over line 241 and the state of the DAC bit associated with that location in the receive RAM 232 is turned on so that when that location is read again, the DAC bit will be on if no new information was loaded from the digital switch 30, and the last byte received will be continuously loaded on the output line 241 until new data is received.

In order to share the pattern generators 224 and 244 among the two ports supported by one digital data processor unit, it is necessary that the selects for the port 0 and the port 1 alternate as is shown in the timing diagram of FIG. 22. This allows one selects counter 233 to be used by both of the ports. Thus if only the zero port is operational then every select on line 78 is allowed to decrement the selects counter 233. If both the port 0 and the port 1 are operational, the selects counter 233 is decremented by the port 1 select only.

Overview of the Elastic Buffer Function of the Data Port

Figure 26:
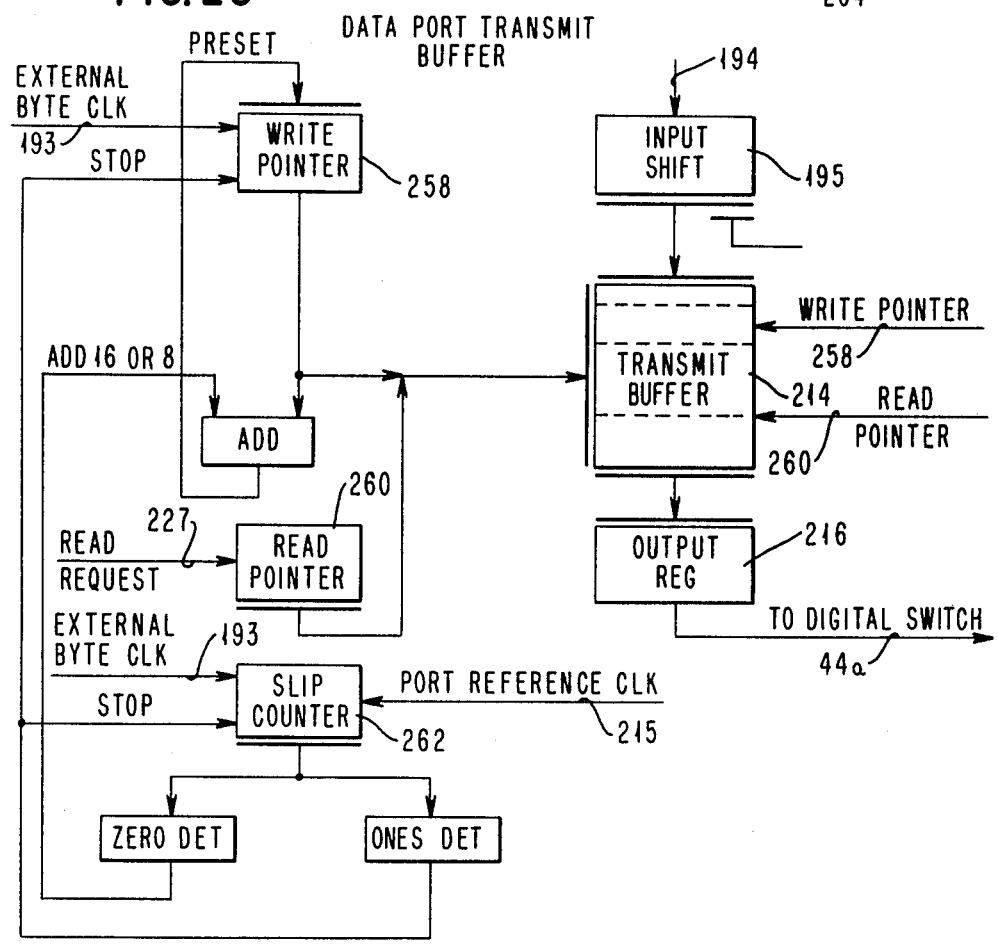
FIG. 26 is a functional block diagram of the data port transmit buffer.

The functional block diagram of the transmit side of the data port is shown in FIG. 25 and a functional block diagram of the data port transmit buffer is shown in FIG. 26. A functional block diagram of the receive side of the data port is shown in FIG. 27. In FIG. 25, two data input lines 194 and 194' can be serviced by the transmit side of the data port with input shift register 195 having its input connected to input line 194 and the receive clock 193 and the input shift register 195' having its data input connected to line 194' and its receive clock as 193'. As complete eight-bit bytes of information are received each respective input register 195 and 195', they are gated through the select register 196 via the input line 198 to the transmit RAM 214. This is accomplished under control of the write pointer 258 for the input register 195 and the second write pointer 258' for the second input register 195'. Data in the transmit RAM 214 is read out of the transmit RAM 214 into the transmit register 216 with each enabling pulse 227 from the transmit pattern generator 224. The operation of the comparator 218 in conjunction with the transmit register 216 and the output register 200 has been previously described. The logic is capable of handling two data streams and therefore a second output register 220' is also connected in a similar fashion as is the output register 220, between the transmit register 216 and the output line 44a to the digital switch 30.

The relationship between the read pointer 260 and the write pointer 258 or both the transmit RAM 214 and the receive RAM 232 is non-linear requiring that an offset between the pointers be introduced at the frame synchronization time. Table VI describes the transmission pattern for all the rates supported, and FIG. 24 describes a pattern for a 9.6 Kbps data port. Table VI and FIG. 24 show that the pattern repeats every 10 frames, or four times between the frame sync pulses at 9.6 Kpbs. FIG. 24 also shows that at the end of the 10th frame, the port will have developed a channel's worth of information for transmission, allowing the data to be loaded into the TBB 54 on frame O. In a similar manner, the channel's worth of data will be developed at the end of the 39th frame to be loaded in the TBB 54 on the following frame. This implies that at the transmit frame synchronization pulse time, the transmit status register 229 and the selects counter 233 previously described, must be set to a value of one when the port is switched on, so as to synchronize them to the value they will have on the following transmit frame sync pulse. Since the digital switch 30 will increment the transmit RAM read pointer 260 by 60 bytes during frame 0 and the write pointer 258 will be incremented by 12 bytes, an offset of 48 bytes is required. At a data rate of 2.4 Kbps, the offset would be 57 bytes. An offset of 64 bytes is required for all rates up to 224 Kbps. The offsets associated with the different rates are described in the Table VI. At every frame sync pulse, the relationship between the pointers is checked to verify that synchronization between the port and the digital switch is maintained.

On the receive side of the data port, the satellite status register 229' and the satellite selects counter 233' are synchronized at the satellite receive frame sync time and set to the same value as the transmit status register 229 and the transmit selects counter 233.

In addition to the read and write pointer offset described above, an additional offset is required to account for a slip between the external clock on input line 193 and the port clock as represented on input line 215 to the pattern generator 224. This offset is equal to eight bytes for rates below or equal to 19.2 Kbps and 16 bytes for rates between 56 Kbps and 224 Kbps.

With reference to FIG. 25, data from the line 194 is accumulated in the input shift register 195 which generates a transmit RAM write request when full, and drops the shift register contents into the RAM 214 when a write cycle becomes available. The appropriate write pointer 258 is then incremented. In addition to data and parity information, the entry to the transmit RAM 214 defines the port identification associated with that entry as being either the zero or the one port on the DDPU and also the state of the receive line signal detect (RLSD) at the time the data byte was loaded into the transmit RAM 214. The state of the RLSD is required by the digital switch 30 in multi-point operation. When the RLSD turns off, the input to the shift register 195 is set to mark hold insuring that the slip control logic loads the transmit RAM 214 with the mark hold. In addition, the slip counter 262 is set for a maximum elasticity. The effects of filling the transmit RAM 214 with the mark hold indication after the RLSD turns off are to turn the DAC bit on and to set the transmit data circuit at the receive station 2 to mark hold.

Every select on the input line 78 that is passed by the pattern generator 224 carries a read request to the transmit RAM 214 and the appropriate read pointer 260 is then incremented.

FIG. 26 is an illustration of the operation of the data port as in the elastic buffer. The elastic buffer feature is provided on the data port to synchronize data from modems that cannot be clocked by the SCC as well as to correct for phase shift variations in the transmission medium on the input line 194.

The transmit buffer 214 shown in FIG. 26 incorporates the elasticity required to compensate for frequency variations between the external clock and the SCC clock in the following way.

At the system reset time, the slip counter 262 which is an up/down counter, is set to a binary value 10000 for a 32 byte elastic buffer or 01000 for a 16 byte elastic buffer. The external clock is a byte clock which is generated every time a byte of external data is accumulated in the input shift register 195. Every transition of the external clock causes:

A. The data to be loaded into the transmit RAM 214 at the address indicated by the write pointer 258.

B. The write pointer 258 is incremented to the next sequential location in the transmit buffer 214.

C. The slip counter 262 is incremented.

The port reference clock 215 is the SCC clock against which the external clock is measured and it decrements the slip counter 262 every transition. All external devices of the same data rate that attach to the SCC are measured against a port reference clock of the same nominal rate. The port reference clock 215 determines the number of channels the digital switch will read from the transmit RAM 214 in every frame.

If the external clock and the port reference clock 215 are in synchronism, the slip counter 262 remains constant and the relationship between the read pointer 260 and the write pointer 258 is maintained.

If the external clock is slower than the port reference clock 215, the slip counter 262 will eventually reach the value of a binary 00000 indicating a slip of the elastic buffer. At this point, the write pointer 258 is incremented by a value of 16 or eight depending on the elastic buffer size desired and the slip counter 262 is set to 10000 or 01000. Normal operation can now resume.

If the external clock is faster than the port reference clock 215, the slip counter 262 will eventually reach the binary value 11111 indicating a slip of the elastic buffer. At this point, incrementation of the write pointer 258 and of the slip counter 262 are prevented so as to enable the port reference clock 215 to decrement the slip counter 262 until it reaches its sync value of 01000. At this point, the incrementation of the write pointer 258 and of the slip counter 262 are enabled and normal operation can resume.

Loss of the external clock, as would occur where the receive line signal detector associated with the external modem turns off, does not prevent the write pointer 258 and read pointer 260 from maintaining synchronism, since loss of the external clock would be equivalent to the situation described above where the external clock is slower than the port reference clock 215.

As is illustrated in FIG. 27, data from the receive bus 44b from the digital switch is loaded directly into the receive bus register 230 and the DAC bit is loaded from the line 208. For speeds below 32 Kbps, the bus is not allowed to load data into the receive bus register 230 at its basic scan rate of 32 Kbps, but only on the frame boundaries as shown in Table VI. The receive pattern generator 244 equalizes the rate at which data is written into the receive RAM 232 with the rate at which data is fetched from the receive RAM 232 and directed to the destination external user. The write pointer 256 for the receive RAM 232 is incremented by selects on the input line 246 gated by the receive pattern generator 244 as described above, without regard for whether data is received in the RBB 64. The DAC bit is loaded with the data in the receive RAM 232. When reading the RAM 232, the DAC bit is monitored. If the DAC bit is off, the DAC register 240 is loaded with the new information. If the DAC bit is on, the DAC register 240 is not updated and the information that was previously loaded in the DAC register 240 is repeated to the output shift register 242. The receive RAM 232 operates as an elastic buffer to compensate for the differences in data rates between the external destination for the data and the data port 15. The implementation is different from the transmit RAM 214 because the read pointer 264 in the receive RAM 232 is shared by both ports serviced by the RAM, whereas in the transmit RAM 214, each of the two input lines 194 and 194' has its own write pointer, 258 and 258', respectively. As is shown in FIG. 27, a slip counter 266 is associated with the read pointer 264 for the first output line 194 and a second slip counter 266' is associated with the second output line 194'.

The slip counter 266 or 266' is used to calculate the effective read address so that the effective read address is equal to the read pointer value minus the slip counter value. The external byte clock decrements the slip counter 266 or 266'. The port reference clock increments the slip counter 266 of 266'. The read pointer 264 is incremented every port reference clock cycle. If the external clock is faster than the port reference clock, the slip counter 266 or 266' value approaches zero at which time the external clock is prevented from decrementing the slip counter and the port byte clock is allowed to increment the slip counter until it reaches the value of eight or 16, depending upon the elastic buffer size. Then normal operation resumes. If the external clock is slower than the port reference clock, the slip counter 266 or 266' value approaches the maximum, at which time the port byte clock is prevented from incrementing the slip counter until the slip counter is back to the value of eight or 16. Then normal operation resumes. The read pointer 264 is always incremented at the port reference clock rate thereby allowing the same receive RAM 232 with the same read pointer 264 to be used by both of the output lines 194 and 194' operating asynchronously to each other. The effective read address for the two ports will be different.

Operation of the Data Port with Deferred Data

In the deferrable data mode which applies to data rates accumulating less than one channel's worth of data per frame, the computation of the state of the DAC bit for the channel is determined by the port. This is achieved by storing the 60th byte selected by the digital switch 30 in frame N and comparing it with the 60 bytes selected during frame (N+1). If no compare occurs during the (N+1) frame, the DAC bit is turned off and is not allowed to turn on again until a compare occurs between the 60th byte of frame (N+P−1) and the first byte of frame (N+P) where P equals 2, 3, 4, . . . ,X where X is a total number of frames transmitted during the call. The enqueue control ROS 88 need monitor only the DAC bit associated with the 60th byte of any given frame to determined whether or not that frame should be transmitted.

At rates equal to or lower than 19.2 Kbps, the transmit pattern generator 224 is synchronized every 40 frames with the transmit frame sync signal. Forty frames is employed because the 2.4 Kbps pattern repeats every 40 frames and the 60 byte counter 217 will have a value of zero. The counter is reset to zero every 40 frames with the transmit frame sync pulse over line 91.

In the deferred mode, the management of the internodal write pointer differs from what it is in the normal mode because a transmitted channel of data can be received in more than one receive frame. FIG. 24 illustrates the operation for 9.6 Kbps ports. Table VIII gives an example of a 9.6 Kbps data port operation. As was previously mentioned, the data port passes the same channel of data to the digital switch in two consecutive frames for low speed data ports having rates of 19.2 Kbps or less. Thus, channel $0_a$ in FIG. 24 is loaded into the TBB on frames 0 and 1. The TBB 54 has the option of transmitting this channel on transmit frames 1, 2, 3 or 4 which means that the port must be able to receive data on the corresponding receive frames. The internodal write pointer 256 instead of being incremented only on the receive frame Y01 as is normally the case, is set to the value it had at the beginning of the frame Y01 for frames Y02, Y03 and Y04, in FIG. 24. Since data is actually transmitted only on one frame, the DAC bit accompanying the data received from the digital switch 30 in the receiving station will be off only on the receive frame corresponding to the one frame when data was transmitted. Thus if data was transmitted on the transmit frame X03, it will be received, that is (DAC bit off) on receive Y03, at which time data is written into the receive RAM 232. At the beginning of frame Y11, the internodal write pointer 256 is allowed to operate in the next 60 byte section of the receive RAM 232. To take into account the additional delay introduced by deferring the transmission of data, an additional offset of 60 bytes is introduced between the internodal write pointer 256 and the read pointer 264 at the satellite frame sync time.

TABLE VIII

| 9.6 Kbps | | | | | | | |
| --- | --- | --- | --- | --- | --- | --- | --- |
| Transmit | 0 | 1 | 2 | 3 | 4 | 5 | 6 |
| Bytes Accumulated in Data Port | 60 | 18 | 36 | 54 | 72 | 30 | 48 |
| Selects From Digital Switch | 60 | 60 | 60 | 60 | 60 | 60 | 60 |
| Transmit | 1 | 0 | 0 | 0 | 1 | 0 | 0 |

TABLE VIII-continued 9.6 Kbps

| Pattern Generator Channels Output (B) to Digital Switch | $A_1...A_{60}$ | | | | $A_{60}...A_{60}$ | | |
|---|---|---|---|---|---|---|---|
| DAC Bits | 0...0 | 1...1 | 1...1 | 1...1 | 1...1 | 1...1 | 1...1 |
| PAM Bits | 0 | 1 | 1 | 1 | 1 | 1 | 1 |
| TBB-A | $A_1...A_{60}$ | | | | $A_{60}...A_{60}$ | | |
| TBB-B | | $A_1...A_{60}$ | | | | $A_{60}...A_{60}$ | |
| Enqueue | YES | YES | | | NO | NO | |
| Transmit | DEFER | DEFER | Burst TBB-A | | NO | NO | NO |

| Receive Frame | 0 | 1 | 2 | 3 | 4 | 5 | 6 |
|---|---|---|---|---|---|---|---|
| Receive RBB | | | $A_1...A_{60}$ | | | | EMPTY |
| RBB Loaded Bit | 1 | 1 | 0 | 0 | 1 | 1 | 1 |
| Receive Pattern Generator | 0 | 0 | 0 | 1 | 0 | 0 | 1 |
| Receive Data Port on Last Available Frame | | | | $A_1...A_{60}$ | | | $A_{60}...A_{60}$ |

Intranodal Operation

On the receive side of the data port, the internodal and intranodal pattern generator are implemented. The operation of the pattern generators is as described above except that in the intranodal case, the intranodal status register 245 in FIG. 20 is preset with the value in the transmit status register 229 at the transmit frame switch time plus 250 microseconds, labeled 91' in FIG. 20. The signal in 91' operates the gate 243 which transfers the contents of the transmit status register 229 to the intranodal status register 245. The duration of 250 microseconds is the path delay for a byte traveling from the transmit side of the port via the intranodal buffer (INB) 56 to the receive side of the data port. For the internodal pattern generator, the 60 byte counter 217' is reset to zero every 40 frame times and the satellite status register 229' is preset with the value in the channel counter 219' every receive satellite frame switch time. The channel counter is then set to zero. The relationship between the transmit frame sync pulse and the satellite frame sync pulse is described with respect to FIG. 23. The transmit frame sync pulse occurs every other superframe. The receive frame sync pulse is synchronized to a byte time of the transmit frame.

The intranodal and internodal pattern generators are separately synchronized and independent from each other. Likewise, the intranodal write pointer 256' in the FIG. 27 is incremented independently of the internodal write pointer 256. This enables the port to service an intranodal connection for one port and an internodal connection for the other port. If both ports are part of the same type of connection, they will use the same write pointer in FIG. 27. The port ID which is presented to the port by the SCM 50 when the port is port 0 is the location 0 through 225 of the receive RAM 232 and when the port is port 1 the corresponding locations are 256 through 511 of the receive RAM 232. The port ID represents the high order bit of the write address to the receive RAM 232.

Thus it is seen by synchronizing the transmission and reception pattern generators for all data ports operating at the same data rate throughout the entire TDMA system, the necessity for bit stuffing to accommodate non-integral multiple data rate data ports is eliminated and yet data activity compression operations can be carried out.

Integral Multiple Data Rate Feature

The integral multiple data rate feature finds application in a TDMA communications controller having a plurality of input/output ports for transferring $n_i$ channels of m data units each per TDMA frame from respective, local data users to a TDMA transmit burst communications link and transferring $n_i$ of the channels of data from a TDMA receive burst communication link to the respective local users on a time interleaved basis during periodic TDMA frames, each port operating at its own data rate $R_i$.

The digital switch 30 includes a transmit burst buffer 54 having a data input connected to a transmit bus 44a common to the data outputs of all of the ports 14, 16, 18 and 20 and a data output connected to the TDMA transmit burst communication link. The transmit burst buffer has a plurality of addressable storage locations arranged into rows and m juxtaposed columns.

The digital switch further includes a receive burst buffer 64 having a data input connected to the TDMA receive burst communication link 5 and a data output connected to a receive bus 44b common to the data inputs of all of the ports. The receive burst buffer has a plurality of addressable storage locations arranged into rows and m juxtaposed columns.

The digital switch invention further includes a scanner 70 having a periodic cycle of m scans per TDMA frame, there being a frame rate of f frames per second, with a scan count output 77 connected as a column address input to the transmit burst buffer and to the receive burst buffer.

The digital switch further includes a switch control memory 50 having an address input connected to a scan output 75 of the scanner, a port select output 78 connected to a control input to each of the ports and a stored address output 82 connected to a row address input to the transmit burst buffer and to the receive burst buffer. The switch control memory stores $n_i$ control words for each of the ports, each of the $n_i$ control words for the i-th port issuing a port select signal to the i-th port and issuing a distinct row address to the transmit burst buffer and the receive burst buffer when scanned by the scanner. The value of $n_i$ is equal to $R_i$ divided by m times f.

In this manner, geographically remote ports having a variety of data rates can be serviced on a time interleaved basis.

The digital switch further includes an intranodal buffer 56 having a data input connected to the transmit bus and a data output connected to the receive bus, with a plurality of addressable storage locations arranged into rows and two juxtaposed columns. The intranodal buffer has a row address input connected to the stored address output 82 from the switch control memory and a column address input connected to the scan count output 77 from the scanner, for transferring data between the first and second ones of the local ports.

A first and a second one of the local ports having the same data rate $R_i$ will have $n_i$ pairs of the control words in the switch control memory. Each of these pairs will have a first control word in the j-th pair issuing a port select signal to the first port and a row address to the p-th row in the intranodal buffer on even scans of the switch control memory and to the $p+1$ ST row in the intranodal buffer during odd scans. A second control word in the j-th pair will issue a port select signal to the second port and row address to the $p+1$ ST row in the intranodal buffer in even scans of the switch control memory and to the p-th row in the intranodal buffer during odd scans.

During even scans of the switch control memory a read access is made to a first one of the columns and a write access is made to the second one of the columns in the intranodal buffer and during odd scans of the switch control memory a read access is made to the second one of the columns and a write access is made to the first one of the columns of the intranodal buffer.

The low order bit of the byte scan count 77 is input to the intranodal buffer 56, as shown in FIGS. 11 and 12, to alternate the row address access for paired locations in alternate SCM scans and to alternate the writing and reading into the A and B columns of locations in the INB 56 in alternate SCM scans. For example, when the low order bit of the byte scan count 77 is zero, the low order bit of the row address 82 can be inverted so that the p-th INB address stored in the SCM word is converted to the $p+1$ ST location and the $p+1$ ST location is converted to the p-th location. When the low order bit of the byte scan count 77 is a binary one, the low order bit of the row address 82 can pass unchanged to the row address input of the intranodal buffer 56. In a similar manner, when the low order bit of the byte scan count 77 is a zero, the A column can be read and the B column can be written into in the INB 56. When the low order bit of the byte scan count 77 is a binary one, the A column can be written into and the B column can be read from in the INB 56.

The values of $n_i$ can be integral values so that data ports having integral multiple speeds of the basic TDMA transmission rate corresponding to a single SCM word in the SCM 50, can be accommodated.

Non-Integral Multiple Data Rate Feature

The non-integral multiple data rate feature finds application in a TDMA communications controller having a plurality of input/output ports for transferring $n_i$ channels of $(q_i+a_i)m$ data units each per TDMA transmit frame from respective local data sources to a TDMA transmit burst communication link on a time interleaved basis during periodic TDMA transmit frames. Each port operates at its own data rate $R_i$, where $q_i$ is a positive integer or zero, m is a positive integer and $a_i$ is a fraction between zero and one.

An input buffer 214 in one of the ports 14, 16 or 18 has an input connected to a respective local data source 10, for accumulating $(q_i+a_i)m$ data units per TDMA transmit frame.

A mod m transmit counter 217 in the one port has an input connected to the respective local data source, for counting the number of groups of m data units accumulated during each of the TDMA transmit frames.

The transmit output register 216 in the one port, has an input connected to the input buffer and an output connected to the transmit bus, for gatably transferring consecutive data units from the input buffer to the transmit bus.

The transmit burst buffer 54 has a data input connected to the transmit bus and a data output connected to the TDMA transmit burst communication link, with a plurality of addressable storage locations arranged into rows and m juxtaposed columns.

The scanner 70 has a periodic cycle of m scans per TDMA transmit frame, there being a frame rate of f frames per second, with a scan count output 77 connected as a column address input to the transmit burst buffer.

The switch control memory 50 has an address input connected to a scan output 75 of the scanner, a port select output 78 connected to each of the ports, and a stored address output 82 connected to a row address input to the transmit burst buffer, for storing $q_i+1$ control words for the one port, each of the control words issuing a port select signal to the one port and issuing a distinct row address to the transmit burst buffer when scanned by the scanner, where $(q_i+a_i)=R_i/mf$.

A transmit transfer gate 239 in the one port, has a data input connected to the mod m transmit counter, a control input connected to the scan count output of the scanner and an output, for transferring the contents of the mod m transmit counter to the output for each of the m scan counts per TDMA transmit frame.

A transmit selects counter 233 in the one port, has a data input connected to the output of the transmit transfer gate and a control input connected to the port select output of the switch control memory, for receiving the contents of the mod m transmit counter for each of the m scan counts in a TDMA transmit frame and decrementing the received contents by one for every port select signal received from the switch control memory during any one of the scan counts.

A transmit zero detector 237 in the one port, has an input connected to the said transmit selects counter and a control output 227 connected to a gate input of the transmit output register 216, for detecting when the contents of the transmit selects counter is not zero and sending an enabling signal to the transmit output register for transferring one of the data units from the input buffer to the transmit bus, the detector inhibiting the transfer through the transmit output register when the detected contents of the transmit selects counter is zero.

In this manner, data from a local data source having a data rate $R_i$ which is not an integral multiple of the scan count rate mf of the scanner, can be transmitted.

The receive burst buffer 64 has a data input connected to the TDMA receive burst communication link 5 and a data output connected to the receive bus, with a plurality of addressable storage locations arranged into rows and m juxtaposed columns, having a column address input connected to the scan count output of the scanner and a row address input connected to the stored address output of the switch control memory.

A receive output buffer 232 in the one port has a data input connected to the receive bus and an output connected to a respective local data sink 10, for gatably buffering consecutive data units in a data field received from the receive burst buffer for transfer on an output line 241 at the data rate $R_i$ to the respective local data sink.

An output clock 215 in the one port, counts the number $(q_i + a_i)$ m of the data units per TDMA receive frame to be transferred from the TDMA receive burst communication link to the respective local user.

A mod m receive counter 217' in the one port, has an input connected to the output clock, for counting the number of groups of m data units which should be accumulated in the receive output buffer from the TDMA receive burst communication link during each of the TDMA receive frames.

A receive transfer gate 239' in the one port, has a data input connected to the mod m receive counter, a control input connected to the scan count output of the scanner and an output, for transferring the contents of the mod m receive counter to the output for each of m scan counts per TDMA receive frame.

A receive selects counter 233' in the one port, has a data input connected to the output of the receive transfer gate and a control input connected to the port select output of the switch control memory, for receiving the contents of the mod m receive counter for each of the m scan counts in a TDMA receive frame and decrementing the received contents by one for every port select signal received from the switch control memory during any one of the scan counts.

A receive zero detector 237' in the one port has an input connected to the receive selects counter and a control output connected to a gate input of the receive output buffer, for detecting when the contents of the receive selects counter is not zero and sending an enabling signal to the receive output buffer for buffering one of the data units transferred from the receive burst buffer over the receive bus, the receive detector inhibiting the buffering in the receive output buffer when the detected contents of the receive selects counter is zero.

In this manner, data to be transferred to a local data sink having a data rate $R_i$ which is not an integral multiple of the scan count rate mf of the scanner can be received.

An intranodal buffer 56 has a data input connected to the transmit bus and a data output connected to the receive bus common to the data inputs of all of the ports, with a plurality of addressable storage locations arranged into rows and two juxtaposed columns, with a row address input connected to the stored address output from the switch control memory and a column address input connected to the scan count output 77 of the scanner, for transferring data between the first ports and a second port.

The port and the second port have the same data rate $R_i$ having $q_i + 1$ pairs of the control words in the switch control memory, each of the pairs having a first control word in the j-th pair issuing a port select signal to the first port and a row address to the p-th row in the intranodal buffer in even scans of the switch control memory and to the p+1 ST row in the intranodal buffer during odd scans and a second control word in the j-th pair issuing a port select signal to the second port and a row address to the p+1 ST row in the intranodal buffer in even scans of the switch control memory and to the p-th row in the intranodal buffer during odd scans.

The scan count 77 connected to the column address input enabling a read access of the first one of the columns of the intranodal buffer and a write access of a second one of the columns of the intranodal buffer during even numbered ones of the scans of the switch control memory and enabling a read access of the second one of the columns of the intranodal buffer and a write access of the first one of the columns of the intranodal buffer during odd numbered ones of the scans of the switch control memory.

A receive output buffer 232 in the second port has a data input connected to the receive bus and an output connected to a second respective local data sink, for gatably buffering consecutive data units in a data field received from the intranodal buffer for transfer on an output line at the data rate $R_i$ to the second respective local data sink.

An output clock 215 in the second port, counts the number $(q_i + a_i)$ m of the data units per TDMA intranodal frame to be transferred from the intranodal buffer to the second respective local user, the TDMA intranodal frame being delayed by the period of one of the scan counts 77 with respect to the TDMA transmit frames.

A mod m intranodal counter 217 in the second port, has an input connected to the output clock, for counting the number of groups of m data units which should be accumulated in the receive output buffer from the intranodal buffer during each of the TDMA intranodal frames.

An intranodal transfer gate 248 in the second port, has a data input connected to the mod m intranodal counter, a control input connected to the scan count output of the scanner, and an output, for transferring the contents of the mod m intranodal counter to the output for each of m scan counts per TDMA intranodal frame.

An intranodal selects counter 249 in the second port, has a data input connected to the output of the intranodal transfer gate and a control input connected to the port select output of the switch control memory, for receiving the contents of the mod m intranodal counter for each of the m scan counts in a TDMA intranodal frame and decrementing the received contents by one for every port select signal received from the switch control memory during any one of the scan counts.

An intranodal receive zero detector 250 in the second port has an input connected to the intranodal selects counter and a control output connected to a gate input to the receive output buffer, for detecting when the contents of the intranodal selects counter is not zero and sending an enabling signal to the receive output buffer for buffering one of the data units transferred from the intranodal buffer over the receive bus, the intranodal detector inhibiting the buffering in the receive output buffer when the detected contents of the intranodal selects counter is zero.

In this manner, data to be transferred to a second local data sink having a data rate $R_i$ which is not an integral multiple of the scan count rate mf of the scanner can be received from another local port of the same data rate.

Port Test Card

Figure 28:
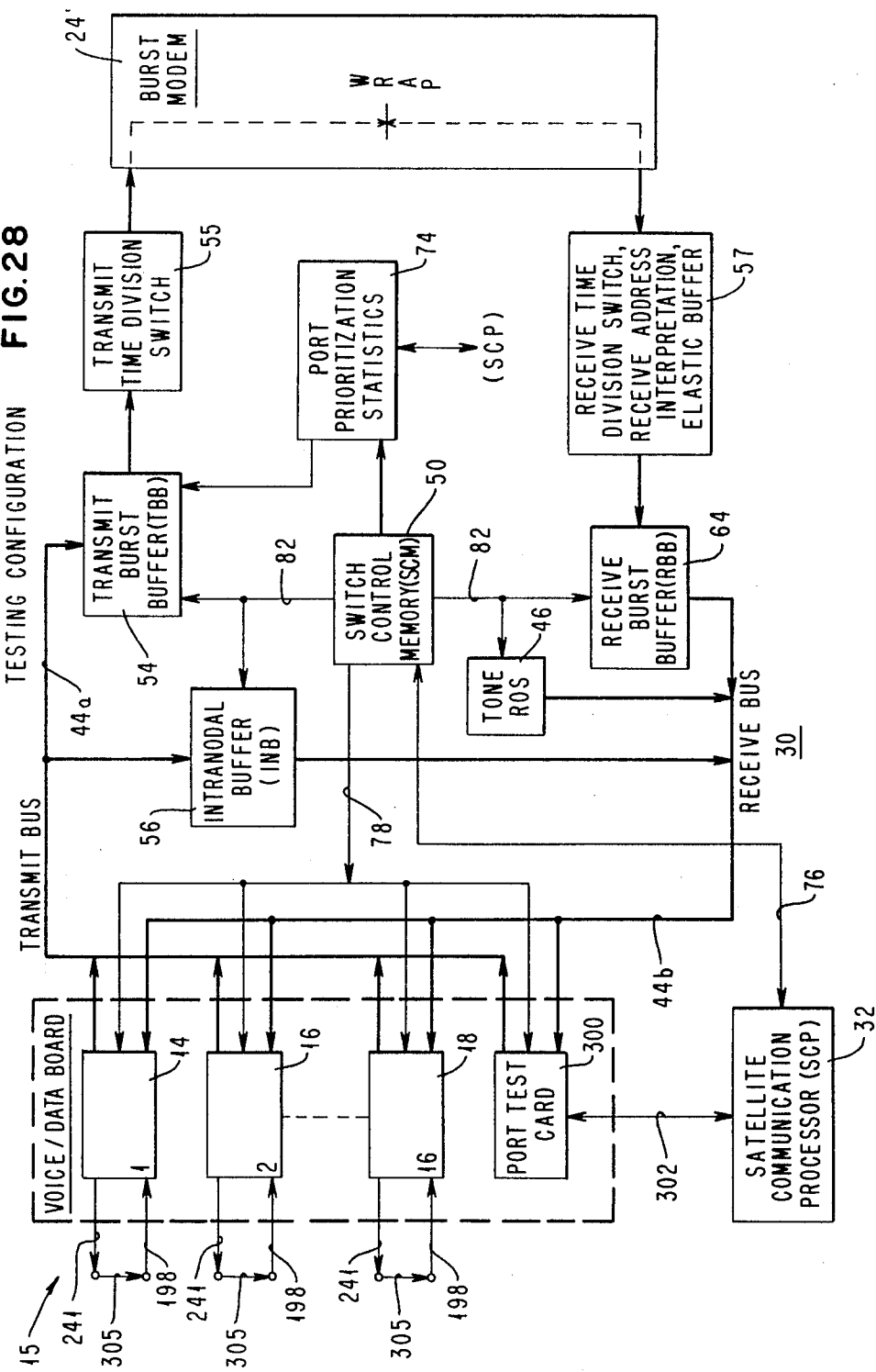
FIG. 28 is a functional block diagram of the satellite communications controller with the port test card.

The relationship of the port test card 300 to the balance of the components in the satellite communications controller is shown in FIG. 28 and a detailed illustration of the functional blocks in the port test card is shown in FIG. 29. There is one port test card 300 per SCC for the purpose of testing any SCC voice port 20 or data port 14, 16 or 18 and for testing certain portions of the digital switch 30. FIG. 28 shows the port test card 300 in its normal working environment. The port test card 300 can physically reside on any voice/data board 27 where it shares the common data transmit bus 44a and receive bus 44b. The test card 300 is addressed by the digital switch 30 in a manner similar to the addressing of any other voice port 20 or data port 14, 16 or 18 within the SCC 22. A voice port 20 or data port 14, 16 or 18 will be logically connected to the test card 300 via an intranodal connection through the intranodal buffer 56. These connections are controlled by entries into the switch control memory (SCM) 50. Other areas of the digital switch 30 can be checked by passing data from the test card 300 through the burst modem wrap 24' and back to the test card 300 for analysis. All tests are under the diagnostic control of the SCP 32. Test patterns may be passed from the diagnostic program in the SCP 32 or they may be generated on the test card 300 and results may be interpreted either by the test card 300 or by the diagnostic program in the SCP 32. Testing of the voice port 20 or of the data ports 14, 16 or 18 can be made in real time during normal traffic. However, the SCC must be in the non-traffic mode to perform tests on the digital switch.

As is seen in FIG. 29, the test port card includes a microprocessor 316, a processor interface module 310 and a processor interface module 314, a programmable timer 322, a random access memory (RAM) 320, and a read-only memory (ROM) 318. A digital switch control adapter (DSCA) stack 312 is a push down stack which is used to transfer over line 302 data and control information between the satellite communications processor 32 and the test card 300. The processor interface module 314 provides the interface between the microprocessor 316 and the stack 312. The processor interface module 314 is also used to interrupt the microprocessor 316 with signals over line 78 from the digital switch 30.

The read-only memory (ROM) 318 can be a 2,000 bit by 9 bit storage device which contains the control program and test program code to execute all of the tests. The random access memory 320 is used for temporary data storage for tests and storage for communications between the test card 300 and the SCP 32.

The programmable timer 322 is used for real time test support and may be programmable by either the microprocessor 316 or the SCP 32.

The processor interface module 310 is used to transfer control information between the microprocessor 316 and the direct memory access (DMA) controller 306. The DMA controller 306, along with the digital switch interface 304, provides the real time capability of the test card 300 to interface over the transmit bus 44a and the receive bus 44b with the digital switch 30. The external interrupt capability of the processor interface module 310 is also used by the digital switch to interrupt the test card 300. The microprocessor 316 can include a clock module to provide the necessary clocks for its operation.

Functionally the port test card 300 operates in one of two modes. It is either in the processing mode or in the direct memory access mode. In the processing mode, the microprocessor 316 is either handling communications with the SCP 32 or is working on data to support a test. The test card 300 will also go into the processing mode via an interrupt from the SCP 32 or from the DMA controller 306. When all work is finished, the microprocessor 316 will put the test card 300 into a wait state.

In the DMA mode, the test card 300 is communicating with the digital switch 30 via the SCC transmit bus 44a and receive bus 44b. Data and controls are being transferred at the rate of one data byte per 595 nanoseconds (that is per each SCM slot access time). Typical operation of the DMA mode would involve a transmission of n bytes where n is less than 384, followed by a reception of n bytes. The DMA operation would then be finished, an interrupt sent to the microprocessor 316, the received data processed, and the results of that processing logged.

A typical test would involve a diagnostic command from the SCP 32 over the line 302 to the DSCA stack 312 asking for a test to be run. The microprocessor 316 would respond by determining how to control the DMA controller 306, how many DMA cycles to run, and how to log the results. Upon completion of this test, the test card 300 will interrupt the SCP 32 and then go into a wait state. The SCP 32 will then retrieve the data from the random access memory 320 in the port test card 300 to determine the results of the test.

In data port tests, all data ports 14, 16 or 18 without regard for their data rates, can be tested for data integrity by establishing a connection between the test card 300 and at the data port 14, 16 or 18. Digital data patterns are sent from the test card 300 to the data port 14, 16 or 18 via the intranodal buffer 56, and return to the test card 300 for comparison with the originally transmitted test patterns. A DAC and deferred data mode test can be conducted by establishing a wrap connection through the TBB 54, the burst modem 24', and the RBB 64. Further, a burst prioritization test can be carried out by the test card generating a mixture of activity representing all possible data port message priorities. In one frame, this mix of data can be sent from the test card 300 and stored in the TBB 54 where a transmit list will be formed in the burst priority RAM 100 based on the priorities. In the following frame, the transmit list created will control the order in which the collected channels of data will be burst through the burst modem wrap 24' to the RBB 64. The correctness of the prioritization list can then be checked by the test card 300 and the SCP 32. While a data port is under test, normal intranodal and internodal traffic can be maintained with other ports and, with locally originated timing 91' and 93, normal intranodal traffic can be maintained during modem wrap tests.

In conducting a data port test, an internal wrap 305 between the data port output line 241 and the data port input line 198 is activated by setting a status byte on that port. Once this wrap 305 has been activated, a stream of data bytes generated by the port test card 300 can be routed through the wrapped port and back to the test card 300 using the intranodal buffer 56. This test verifies the operation of a port of any data rate. The data port wrap connection consists of the transmission of a repetitive, one byte test pattern. The sequence and data flow is from the port test card 300 through the transmit 44a, through the intranodal buffer 56, through the receive bus 44b to the data port under test, either data port 14, 16 or 18. The data port output line 241 is then connected by means of the wrap 305 to the data port input line 198 so that the test pattern is then conducted to the transmit bus 44a, the intranodal buffer 56, and the receive bus 44b, back to the port test card 300, where the transmitted test pattern can be compared with the original test pattern. On completion of the test, the port test card 300 sets a status byte and generates an interrupt to the SCP 32. The SCP 32 can then retrieve the returned data pattern and carry out additional analyses.

The invention finds application in a TDMA communications controller having a plurality of i input/output ports. The input/output ports transfer data from respective, local data users to a transmit bus and transfer data from a receive bus to respective local users on a time interleaved basis during periodic TDMA frames. Each port operates at its own data rate $R_i$, with data ports having different data rates in the controller. The invention includes a test card which had a read-only memory (ROM) for storing test patterns for each of the data rates $R_i$. The test card further includes a random access memory (RAM) having an input connected to the ROM, for storing one of the test patterns from the ROM. The test card further includes a processor having control outputs to the RAM and the ROM for controlling the transfer of one of the test patterns from the ROM to the RAM for the data rate $R_j$ of the data port under test. The test card further includes a direct memory access (DMA) control connected between a data output from the RAM and the transmit bus and connected between a data input to the RAM and the receive bus.

The test card is connected to an intranodal buffer having a data input connected to the transmit bus and the data output connected to the receive bus, the intranodal buffer having a plurality of addressable storage locations for transferring data between the data ports. The controller includes a scanner having a periodic cycle of m scans per TDMA frame, there being a frame rate of f frames per second. A switch control memory (SCM) has an address input connected to the output of the scanner, a port select output connected to a control input to each of the data ports and a control input to the DMA controller in the test card. The switch control memory also has a stored address output connected to an address input to the intranodal buffer. The switch control memory stores a plurality of 2n slots of SCM control words. A first subplurality of n slots will, when scanned by the scanner, issue a port select signal to the port under test and will issue n addresses to the intranodal buffer. A second subplurality of n slots will, when scanned by the scanner, issue a port select signal to the DMA controller in the port test card and will issue n addresses to the intranodal buffer, n equals $R_j$ divided by n times f.

The DMA controller transfers a plurality of test patterns from the RAM in the test card through the accessed storage locations in the intranodal buffer to the port under test at the data rate $R_j$, in response to the outputs from the switch control memory. The data port under test has its user output connected to its user input to transfer the test patterns received on the receive bus to the transmit bus and through the accessed storage locations in the intranodal buffer to the DMA controller in the port test card at the data rate $R_j$, in response to the outputs from the switch control memory.

The test patterns which have been circulated through the port under test can be then be compared by the processor on the port test card with the original test patterns transmitted from the RAM so as to determine the data transmission integrity of the data port under test. In this manner, ports of any data rate $R_i$ in the communications controller can be tested.

Although a specific embodiment of the invention has been described, it will be understood by those with skill in the art that the foregoing and other changes in form and details may be made therein without departing from the spirit and the scope of the invention.

Having thus described our invention, what we claim is new, and desire to secure by Letters Patent is:

1. In a TDMA communications controller having a plurality of i input/output ports for transferring data from respective, local data users to a transmit bus and transferring data from a receive bus to said respective local users on a time interleaved basis during periodic TDMA frames, each port operating at its own data rate $R_i$, an apparatus for testing one of said ports having a data rate $R_j$ while other ones of said ports continue their communication function, comprising:

a test card including a read-only memory (ROM) for storing test patterns for each of said data rates $R_i$, a random access memory (RAM) having an input connected to said ROM, for storing one of said test patterns from said ROM, a processor having control outputs to said RAM and said ROM for controlling the transfer of one of said test patterns from said ROM to said RAM for said data rate $R_j$ and a direct memory access (DMA) control connected between a data output from said RAM and said transmit bus and connected between a data input to said RAM and said receive bus;

an intranodal buffer having a data input connected to said transmit bus and a data output connected to said receive bus, having a plurality of addressable storage locations for transferring data between said ports;

a scanner having a periodic cycle of m scans per TDMA frame, there being a frame rate of f frames per second;

a switch control memory (SCM) having an address input connected to the output of said scanner, a port select output connected to a control input to each of said ports and to a control input to said DMA controller in said test card and a stored address output connected to an address input of said intranodal buffer, for storing a plurality of 2n slots of SCM control words, a first subplurality of n slots, which when scanned by said scanner, issue a port select signal to said one port to be tested and issue n addresses to said intranodal buffer, a second subplurality of n slots, which when scanned by said scanner, issue a port select signal to said DMA controller in said port test card and issue n addresses to said intranodal buffer, where $n = R_j/mf$;

said DMA controller transferring a plurality of said test patterns from said RAM in said test card through said accessed storage locations in said intranodal buffer to said one port to be tested, at said data rate $R_j$, in response to said outputs from said SCM;

said data port under test having its said user output connected to its said user input to transfer said test patterns received on said receive bus to said transmit bus and through the accessed storage locations in said intranodal buffer to said DMA controller in said test card, at said data rate $R_j$, in response to said outputs from said SCM;

whereby ports of any data rate $R_i$ in said communications controller can be tested.

2. The apparatus of claim 1, which further comprises:
a transmit burst buffer having a data input connected to said transmit bus and a data output connected to a TDMA transmit burst communication link, with a plurality of addressable storage locations arranged into rows and m juxtaposed columns, with said scan count output from said sanner connected as a column address input and said stored address output of said switch control memory connected as a row address input, for transmitting $n_i$ units of data from respective, local data users to said TDMA transmit burst communication link;

said transmit burst buffer being accessed by said second subplurality of n slots in said switch control memory for buffering said plurality of test patterns from said RAM in said test card at said data rate $R_j$;

whereby said transmit burst buffer can be tested by said test card.

3. The apparatus of claim 2, which further comprises:
accessing means connected to said row address input of said transmit burst buffer, for reading out selected rows thereof during TDMA transmit bursting to said communication link;

a receive burst buffer having a data input connected to a TDMA receive burst communication link and a data output connected to said receive bus, with a plurality of addressable storage locations arranged into rows of m juxtaposed columns, with said scan count output of said scanner connected as a column address input and said stored address of said switch control memory connected as a row address input for transferring $n_i$ of said units of data from said TDMA receive burst communication link to said respective local users on a time interleaved basis during periodic TDMA frames;

said TDMA transmit burst communication link communicating with said TDMA receive burst communication link;

said receive burst buffer being accessed by said second subplurality of n slots in said switch control memory for buffering said plurality of test patterns transmitted from said RAM in said test card, through said transmit burst buffer, through said transmit communication link, and through said receive communication link at said data rate $R_j$;

whereby said receive burst buffer can be tested by said test card.

4. In a TDMA communications controller having a plurality of i input/output ports for transferring data from respective, local data users to a transmit bus and transferring data from a receive bus to said respective local users on a time interleaved basis during periodic TDMA frames, each port operating at its own data rate $R_j$, an apparatus for testing components of the controller at a data rate $R_j$ comprising:

a test card including a read-only memory (ROM) for storing test patterns for each of said data rates $R_i$, a random access memory (RAM) having an input connected to said ROM, for storing one of said test patterns from said ROM, a processor having control outputs to said RAM and said ROM for controlling the transfer of one of said test patterns from said ROM to said RAM for said data rate $R_j$ and a direct memory access (DMA) control connected between a data output from said RAM and said transmit bus and connected between a data input to said RAM and said receive bus;

a transmit burst buffer having a data input connected to said transmit bus and a data output connected to a TDMA transmit burst communication link, with a plurality of addressable storage locations arranged into rows and m juxtaposed columns;

a receive burst buffer having a data input connected to a TDMA receive burst communication link and a data output connected to said receive bus, with a plurality of addressable storage locations arranged into rows and m juxtaposed columns;

a scanner having a periodic cycle of m scans per TDMA frame, there being a frame rate of f frames per second, with a scan count output connected as a column address input to said transmit burst buffer and to said receive burst buffer;

a switch control memory, having an address input connected to a scan output of said scanner, a port select output connected to a control input to each of said ports and to said test card and a stored address output connected to a row address input to said transmit burst buffer and to said receive burst buffer, for storing n control words for said test card, each said control word issuing a port select signal to said test card and issuing a distinct row address to said transmit burst buffer and said receive burst buffer when scanned by said scanner, where $n = R_j/mf$;

said TDMA transmit burst communication link communicating with said TDMA receive burst communication link;

said DMA controller transferring a plurality of said test patterns from said RAM in said test card through said accessed storage locations in said transmit burst buffer through said transmit link, through said receive link, and through said receive burst buffer to said DMA controller, at said data rate $R_j$, in response to said outputs from said SCM;

whereby said transmit burst buffer and said receive burst buffer can be tested at said data rate $R_j$.

5. The apparatus of claim 4, which further comprises:
an intranodal buffer having a data input connected to said transmit bus and a data output connected to said receive bus, with a plurality of addressable storage locations arranged into rows and two juxtaposed columns, with a row address input connected to said stored address output from said switch control memory and a column address input connected to said scan count output of said scanner, for transferring data between first and second ones of said ports simultaneously with said testing of said transmit burst buffer and said receive burst buffer.

6. In a TDMA communications controller having a plurality of i input/output ports for transferring data from respective, local data users to a transmit bus and transferring data from a receive bus to said respective local users on a time interleaved basis during periodic TDMA frames, each port operating at its own data rate $R_i$, a method for testing one of said ports having a data rate $R_j$ while other ones of said ports continue their communication function, comprising the steps of:

storing test patterns for each of said data rates $R_i$ in a read-only memory (ROM) of a test card;

storing one of said test patterns from said ROM in a random access memory (RAM) of said test card having an input connected to said ROM;

controlling the transfer of one of said test patterns from said ROM to said RAM for said data rate $R_j$ with a processor in said test card having control outputs to said RAM and said ROM;

transferring a plurality of test patterns from a data output of said RAM to a transmit bus and to a data input of said RAM from a receive bus with a direct memory access controller connected between said RAM and said transmit and receive buses;

transferring said test patterns from said transmit bus to an intranodal buffer having a data input connected to said transmit bus and transferring said test patterns from said intranodal buffer to said receive bus, said intranodal buffer having a plurality of addressable storage locations for transferring data between said ports;

storing a plurality of 2n slots of SCM control words in a switch control memory (SCM) having an address input connected to the output of a scanner having a periodic cycle of m scans per TDMA frame, there being a frame rate of f frames per second, a port select output connected to a control input to each of said ports and to a control input to said DMA controller in said test card and a stored address output connected to an address input to said intranodal buffer, a first subplurality of n slots, when scanned by said scanner, issue a port select signal to said one port to be tested and issue n addresses to said intranodal buffer, a second subplurality of n slots, when scanned by said scanner, issue a port select signal to said DMA controller in said port test card and issue n addresses to said intranodal buffer, where $n = R_j/mf$;

transferring a plurality of said test patterns with said DMA controller from said RAM in said test card through said accessed storage locations in said intranodal buffer to said one port to be tested, at said data rate $R_j$, in response to said outputs from said SCM;

connecting said user output of said data port under test to its said user input to transfer said test patterns received on said receive bus to said transmit bus and through the accessed storage locations in said intranodal buffer to said DMA controller in said test card, at said data rate $R_j$, in response to said outputs from said SCM;

whereby ports of any data rate $R_i$ in said communications controller can be tested.

7. In a TDMA communications controller having a plurality of i input/output ports for transferring data from respective, local data users to a transmit bus and transferring data from a receive bus to said respective local users on a time interleaved basis during periodic TDMA frames, each port operating at its own data rate $R_j$, a method for testing components of the controller at a data rate $R_j$ comprising the steps of:

storing test patterns for each of said data rates $R_i$ in a read-only memory (ROM) of a test card;

storing one of said test patterns from said ROM in a random access memory (RAM) of said test card having an input connected to said ROM;

controlling the transfer of one of said test patterns from said ROM to said RAM for said data rate $R_j$ with a processor in said test card having control outputs to said RAM and said ROM;

transferring a plurality of test patterns from a data output of said RAM to a transmit bus and to a data input of said RAM from a receive bus with a direct memory access (DMA) controller connected between said RAM and said transmit and receive buses;

transferring said test patterns from said transmit bus to a transmit burst buffer having a data input connected to said transmit bus and a data output connected to a TDMA transmit burst communication link, with a plurality of addressable storage locations arranged into rows and m juxtaposed columns;

said TDMA transmit burst communication link communicating with a TDMA receive burst communication link;

transferring said test patterns from said transmit burst buffer via said transmit link and said receive link to a receive burst buffer having a data input connected to said TDMA receive burst communication link and a data output connected to said receive bus, with a plurality of addressable storage locations arranged into rows and m juxtaposed columns;

storing a plurality of n slots of SCM control words in a switch control memory (SCM) having an address input connected to the output of a scanner having a periodic cycle of m scans per TDMA frame, there being a frame rate of f frames per second, a port select output connected to a control input to each of said ports and to a control input to said DMA controller in said test card and a stored address output connected to an address input to said transmit burst buffer, and to said receive burst buffer, said n slots, when scanned by said scanner, issue a port select signal to said DMA controller in said port test card and issue n addresses to said transmit burst buffer and said receive burst buffer, where $n = R_j/mf$;

transferring a plurality of said test patterns with said DMA controller from said RAM in said test card through said accessed storage locations in said transmit burst buffer through said transmit link, through said receive link, and through said receive burst buffer to said DMA controller, at said data rate $R_j$, in response to said outputs from said SCM;

whereby said transmit burst buffer and said receive burst buffer can be tested at said data rate $R_j$.

* * * * *